United States Patent [19]

Yamada et al.

[11] Patent Number: 5,589,103
[45] Date of Patent: *Dec. 31, 1996

[54] MESOMORPHIC COMPOUND, LIQUID CRYSTAL COMPOSITION CONTAINING SAME, AND LIQUID CRYSTAL DEVICE USING SAME

[75] Inventors: Yoko Yamada, Isehara; Takao Takiguchi, Tokyo; Takashi Iwaki, Machida; Takeshi Togano, Yokohama; Shinichi Nakamura, Isehara; Ikuo Nakazawa, Atsugi, all of Japan

[73] Assignee: Canon Kabushiki Kaisha, Tokyo, Japan

[ * ] Notice: The term of this patent shall not extend beyond the expiration date of Pat. No. 5,460,749.

[21] Appl. No.: 177,144

[22] Filed: Jan. 4, 1994

[30] Foreign Application Priority Data

Jan. 8, 1993 [JP] Japan ................................. 5-001974
Dec. 14, 1993 [JP] Japan ................................. 5-312924

[51] Int. Cl.$^6$ ........................ C09K 19/34; C09K 19/32; C07D 239/02; G02F 1/13
[52] U.S. Cl. ................ 252/299.61; 252/299.62; 252/299.63; 544/298; 546/339; 548/136
[58] Field of Search .................... 252/299.61, 299.62, 252/299.63; 544/298; 546/369; 548/136; 549/33, 9

[56] References Cited

U.S. PATENT DOCUMENTS

| | | | |
|---|---|---|---|
| 4,069,227 | 1/1978 | Irick, Jr. et al. | 548/269.4 X |
| 4,367,924 | 1/1983 | Clark et al. | 359/56 X |
| 4,627,933 | 12/1986 | Eidenschink et al. | 252/299.6 |
| 4,704,227 | 11/1987 | Krause et al. | 252/299.61 |
| 4,713,197 | 12/1987 | Eidenschink | 252/299.61 |
| 4,752,414 | 6/1988 | Eidenschink et al. | 252/299.61 |
| 4,776,973 | 10/1988 | Bofinger et al. | 252/299.61 |
| 4,808,333 | 2/1989 | Huynh-ba et al. | 252/299.66 |

(List continued on next page.)

FOREIGN PATENT DOCUMENTS

| | | |
|---|---|---|
| 0097033 | 12/1983 | European Pat. Off. . |
| 0336619 | 10/1989 | European Pat. Off. . |
| 0541081 | 5/1993 | European Pat. Off. . |
| 0552658 | 7/1993 | European Pat. Off. . |
| 107216 | 8/1981 | Japan . |
| 66632 | 3/1991 | Japan . |

OTHER PUBLICATIONS

Patent Abstracts of Japan, vol. 15, No. 1 (Jan. 1991) C-0793.
Derwent Publications Ltd., AN 90-352788.
Schadt et al., App. Phys. Lett., vol. 18, No. 4 (1971) 127-8.
Kelly, Mol. Crys. Liq. Crys., vol. 204 (1991) 27-35.

*Primary Examiner*—Cynthia Harris-Kelly
*Attorney, Agent, or Firm*—Fitzpatrick, Cella, Harper & Scinto

[57] ABSTRACT

A mesomorphic compound of the formula (I) according to claim 1 is suitable as a component for a liquid crystal composition providing improved response speed and decreased. The mesomorphic compound of the formula (I) is characterized by having at least one terminal cyclic group free from a side chain and also having a core structure including at least one group

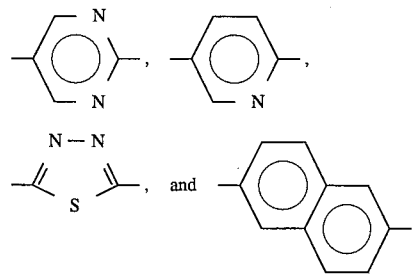

The above liquid crystal composition is useful as an element of a liquid crystal device and a display apparatus providing a good display characteristics.

29 Claims, 4 Drawing Sheets

U.S. PATENT DOCUMENTS

| | | | |
|---|---|---|---|
| 4,812,258 | 3/1989 | Krause et al. | 252/299.61 |
| 4,818,431 | 4/1989 | Eidenschink et al. | 252/299.61 |
| 4,834,904 | 5/1989 | Krause et al. | 252/299.01 |
| 4,834,905 | 5/1989 | Eidenschink et al. | 252/299.61 |
| 4,867,903 | 9/1989 | Nohira et al. | 252/299.61 |
| 4,882,082 | 11/1989 | Eidenschink et al. | 252/299.61 |
| 4,999,130 | 3/1991 | Nohira et al. | 252/299.01 |
| 5,034,151 | 7/1991 | Shinjo et al. | 252/299.61 |
| 5,075,031 | 12/1991 | Nohira et al. | 252/299.61 |
| 5,091,109 | 2/1992 | Takiguchi et al. | 252/299.61 |
| 5,098,600 | 3/1992 | Nakamura et al. | 252/299.61 |
| 5,116,530 | 5/1992 | Togano et al. | 252/299.61 |
| 5,118,441 | 6/1992 | Mori et al. | 252/299.61 |
| 5,143,643 | 9/1992 | Iwaki et al. | 252/299.61 |
| 5,194,177 | 3/1993 | Nohira et al. | 252/299.61 |
| 5,238,600 | 8/1993 | Kelly | 252/299.63 |
| 5,244,595 | 9/1993 | Yamada et al. | 252/299.61 |
| 5,244,596 | 9/1993 | Takiguchi et al. | 252/299.61 |
| 5,288,427 | 2/1994 | Weber et al. | 252/299.61 |

MESOMORPHIC COMPOUND, LIQUID CRYSTAL COMPOSITION CONTAINING SAME, AND LIQUID CRYSTAL DEVICE USING SAME

FIELD OF THE INVENTION AND RELATED ART

The present invention relates to a mesomorphic compound, a liquid crystal composition, a liquid crystal device, a display apparatus and a display method, and more particularly to a mesomorphic compound, a liquid crystal composition containing the mesomorphic compound with improved responsiveness to an electric field, a liquid crystal device using the liquid crystal composition for use in a display device, a liquid crystal-optical shutter, etc., a display apparatus using the device, and a display method of using the composition and device.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of usec, which is too slow for many uses. On the other hand, a simple matrix system of driving is most promising for application to a large-area flat display in view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected (or regions where a scanning electrode is not selected and a signal electrode is selected), which regions are called "half-selected points". If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines are, the smaller is the voltage difference of an effective value applied to a selected point and non-selected points when scanning is repeatedly effected. This leads to unavoidable drawbacks of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect. To overcome these drawbacks, the voltage averaging method, the two-frequency driving method, the multiple matrix method, etc. has been already proposed. However, any method is not sufficient to overcome the above-mentioned drawbacks. As a result, the development of large image area or high packaging density in respect to display elements is delayed because it is difficult to sufficiently increase the number of scanning lines.

To overcome drawbacks with such prior art liquid crystal devices, the use of liquid crystal devices having bistability has been proposed by Clark and Lagerwall (e.g. Japanese Laid-Open Patent Appln. No. 107216/1981; U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric and retaining the resultant state in the absence of an electric field.

In addition to the above-described characteristic of showing bistability, such a ferroelectric liquid crystal (hereinafter sometimes abbreviated as "FLC") has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, previous ferroelectric liquid crystal materials do not sufficiently satisfy characteristics required for a liquid crystal device including low-temperature operation characteristic, high-speed responsiveness, etc. Among a response time $\tau$, the magnitude of spontaneous polarization Ps and viscosity $\eta$, the following relationship exists: $\tau=\eta/(Ps.E)$, where E is an applied voltage. Accordingly, a high response speed can be obtained by (a) increasing the spontaneous polarization Ps, (b) lowering the viscosity $\eta$, or (c) increasing the applied voltage E. However, the driving voltage has a certain upper limit in view of driving with IC, etc., and should desirably be as low as possible. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose many constraints on the device construction giving bistability. Further, an excessively large spontaneous polarization is liable to accompany an increase in viscosity, so that remarkable increase in response speed may not be attained as a result.

Moreover, if it is assumed that the operation temperature of an actual display device is 5°–40° C., the response speed changes by a factor of about 20, so that it actually exceeds the range controllable by driving voltage and frequency.

Thus, as described hereinabove, commercialization of a ferroelectric liquid crystal device requires a liquid crystal composition assuming a chiral smectic phase which has not only a high-speed responsiveness due to a large spontaneous polarization and a low viscosity but also a small temperature-dependence of response speed.

The liquid crystal composition is further required to optimize physical properties such as spontaneous polarization, a helical pitch in a chiral smectic C phase, a helical pitch in a cholesteric phase, a temperature range showing a mesomorphic phase, optical anisotropy, a tilt angle, and dielectric anisotropy in order to realize good characteristics including a uniform switching during display, a good visual angle characteristic, improved low temperature storage properties and alleviation of load imposed on driving IC.

SUMMARY OF THE INVENTION

An object of the present invention is to provide a mesomorphic compound effective for providing high response speed and a decreased temperature-dependence of response speed, a liquid crystal composition, particularly a chiral smectic liquid crystal composition containing the mesomorphic compound for providing a practical ferroelectric liquid crystal device as described above, a liquid crystal device including the liquid crystal composition, a display apparatus including the device, and a display method of using the composition or device.

According to the present invention, there is provided a mesomorphic compound represented by the following formula (I):

$$R^1—A—R^2 \quad (I),$$

wherein $R^1$ and $R^2$ independently denote Q—$Y^1$—(CH$_2$—)$_m$$Y^2$— or $R^3$, at least one of $R^1$ and $R^2$ being Q—$Y^1$—(CH$_2$)$_m$$Y^2$— wherein Q denotes

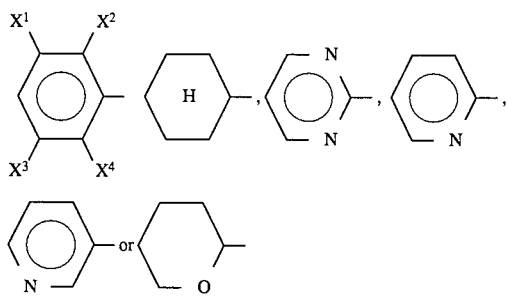

where $X^1$, $X^2$, $X^3$, $X^4$ independently denote H, F, CH$_3$ or CF$_3$; $Y^1$ denotes a single bond, —OCH$_2$—, —COO— or —OCO—; $Y^2$ denotes a single bond, —CH$_2$O—, —COO— or —OCO—; m is an integer of 3–16; and $R^3$ is H, F, —CF$_3$,

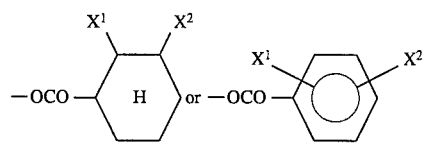

where $X^1$ and $X^2$ each having the above meaning, or a linear, branched, or cyclized alkyl group having 1–18 carbon atoms capable of including at least one —CH$_2$— group which can be replaced with —O—, —S—, —CO—, —CH=CH—, —C≡C—, or

provided that heteroatoms are not adjacent to each other and capable of including at least one H which can be replaced with F; and A denotes —$A^1$—Z—$A^2$— or —$A^1$—$A^2$—Z—$A^3$— wherein $A^1$, $A^2$, $A^3$ independently denote

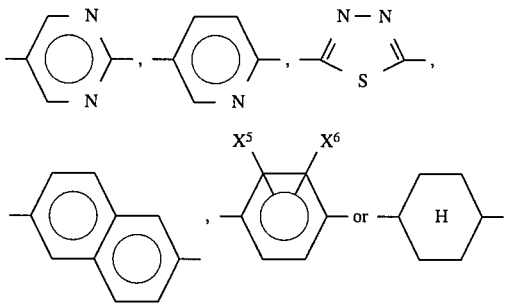

where $X^5$ and $X^6$ independently denote H, F, CH$_3$ or CF$_3$, at least one of $A^1$, $A^2$ and $A^3$ being any one of

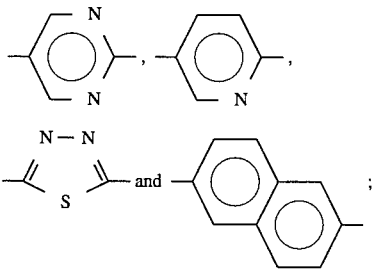

and Z denotes a single bond, —C≡C—, —CH=CH—, —COO—, —OCO—, —COS— or CH$_2$O—.

According to the present invention, there is also provided a liquid crystal composition containing at least one species of the above-mentioned mesomorphic compound of the formula (I).

The present invention provides a liquid crystal device comprising a pair of electrode plates and the liquid crystal composition described above disposed between the electrode plates.

The present invention further provides a display apparatus comprising the liquid crystal device, and voltage application means for driving the liquid crystal device.

The present invention still further provides a display method of using the liquid crystal composition or the liquid crystal device described above and switching the alignment direction of liquid crystal molecules by applying voltages to the liquid crystal composition to effect display.

The mesomorphic compound of the formula (I) according to the present invention is characterized by containing a core structure comprising at least one cyclic group of

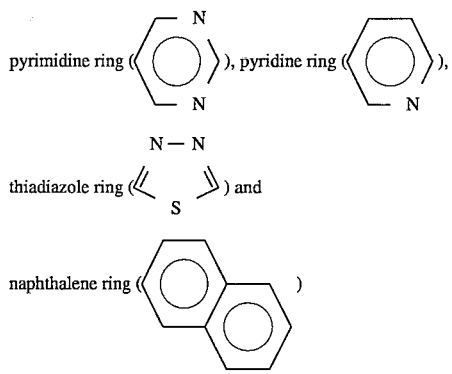

and also containing at least one terminal cyclic group having no side chain (i.e., a group containing carbon atoms).

There have been known mesomorphic compounds having a terminal cyclic group as disclosed in U.S. Pat. Nos. 4,627,933 and 5,238,600; "Mol. Cryst. Liq. Cryst.", 1991, Vol. 204, pp. 27–35 by S. M. Kelly et al; "LIQUID CRYSTALS", 1991, Vol. 10, No. 2, pp. 243–260, pp. 261–272 and pp. 273–287; Japanese Laid-Open Patent Application (JP-A) No. 66632/1991. These compounds, however, fails to disclose the above-mentioned specific core structure and/or $Q—Y^1$—$(CH_2)_m$—$Y^2$— part constituting the above-mentioned formula (I).

We have found that a mesomorphic compound represented by the formula (I) is suitable as a component of a ferroelectric chiral smectic liquid crystal composition and that such a liquid crystal composition and a liquid crystal device including the liquid crystal composition provide good display characteristics based on improvements in various characteristics such as an alignment characteristic, high speed responsiveness, and a temperature-dependence of response speed.

The mesomorphic compound of the formula (I) according to the present invention has a good compatibility with other mesomorphic compound, and it becomes opposite to control spontaneous polarization, a helical pitch in a chiral smectic C phase, a helical pitch in a cholesteric phase, a temperature range showing a mesomorphic phase, optical anisotropy, a tilt angle, and dielectric anisotropy with respect to a liquid crystal composition (or mixture) when the mesomorphic compound of the present invention is used as a component of the liquid crystal composition.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
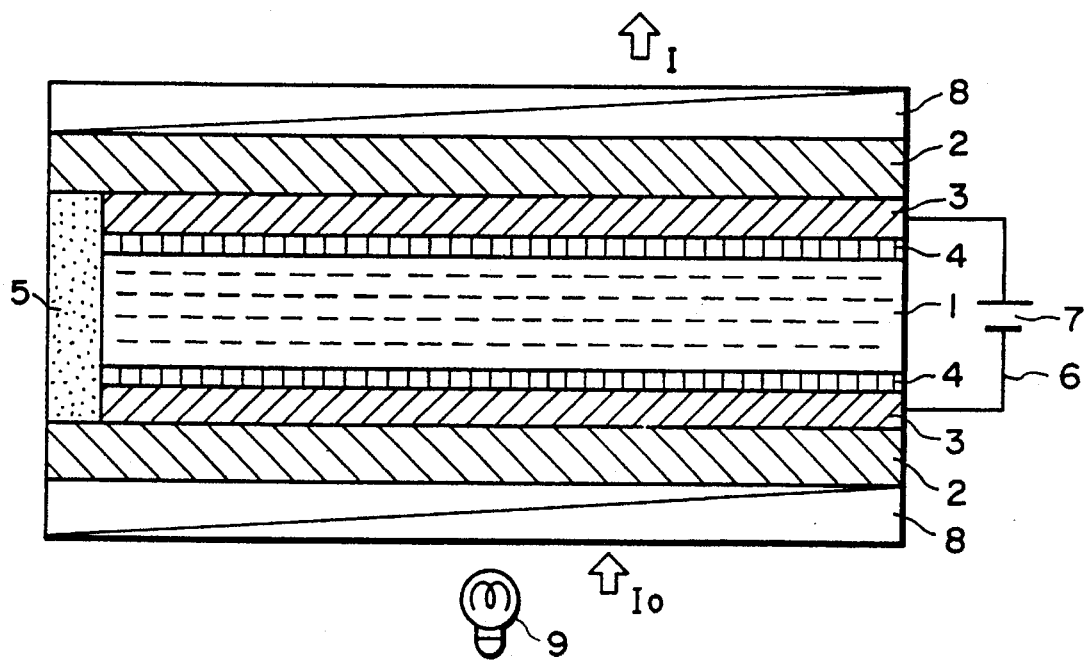
FIG. 1 is a schematic sectional view of a liquid crystal display device using a liquid crystal composition assuming a chiral smectic phase.

Preferred examples of the mesomorphic compound of the formula (I) may include those of the formulas (Ia) to (Iz) below in view of improvements in responsiveness depending upon a viscosity, temperature-dependence of response speed, a mesomorphic temperature range, compatibility, alignment characteristic, etc.

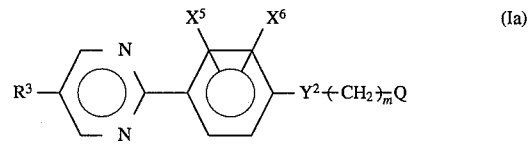

(Ia)

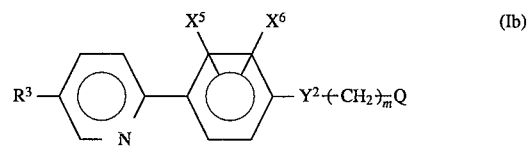

(Ib)

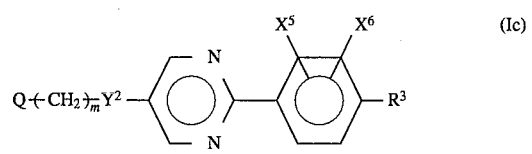

(Ic)

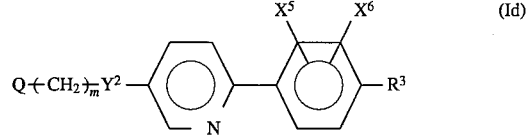

(Id)

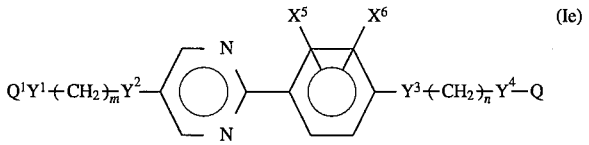

(Ie)

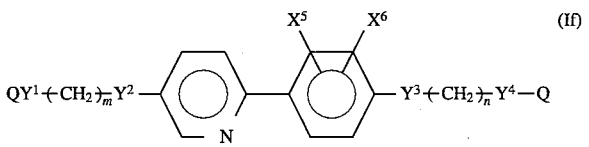

(If)

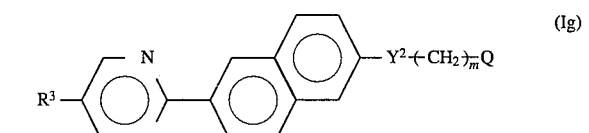

(Ig)

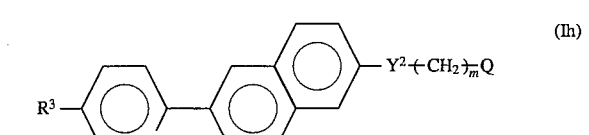

(Ih)

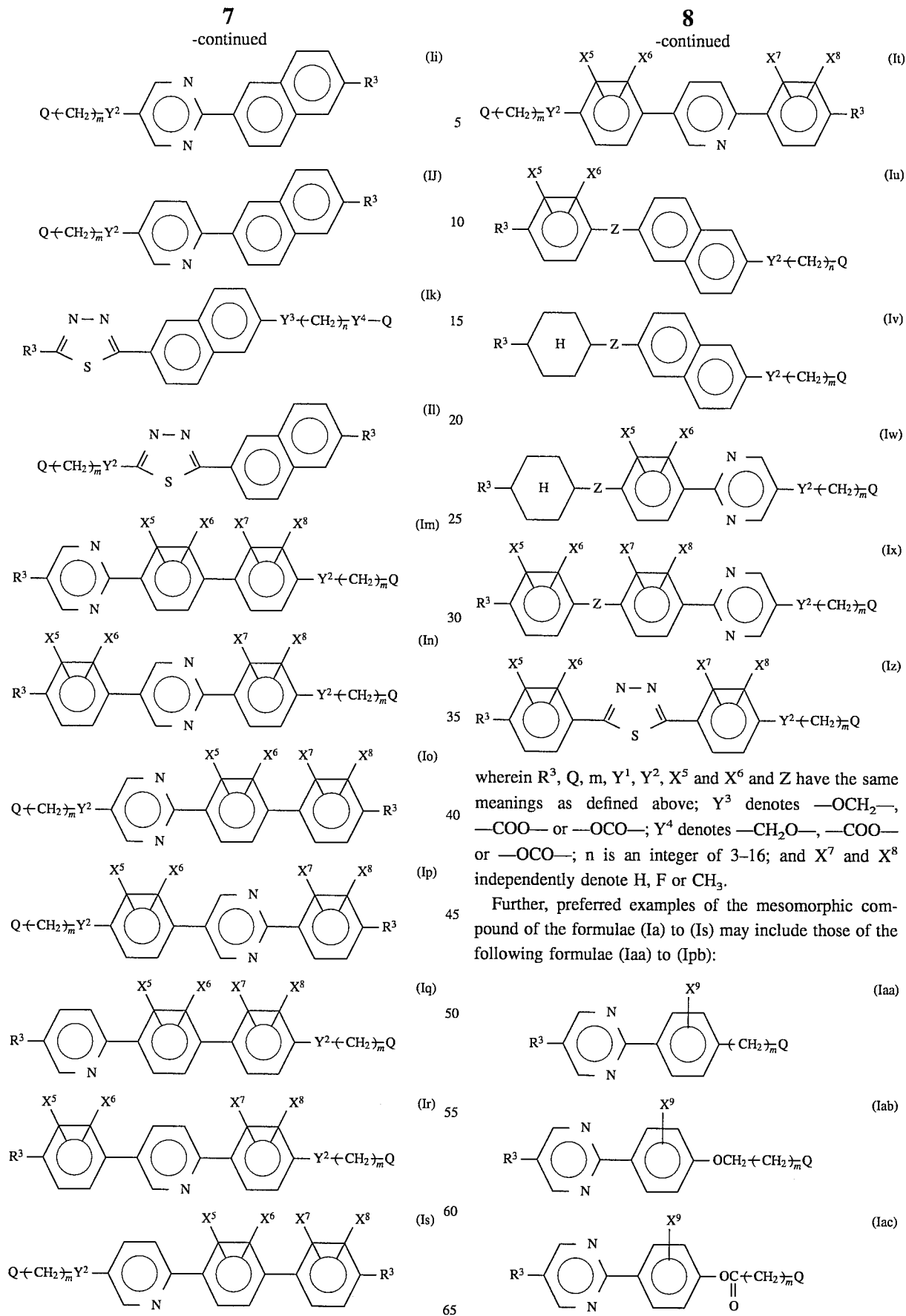
wherein $R^3$, Q, m, $Y^1$, $Y^2$, $X^5$ and $X^6$ and Z have the same meanings as defined above; $Y^3$ denotes —OCH$_2$—, —COO— or —OCO—; $Y^4$ denotes —CH$_2$O—, —COO— or —OCO—; n is an integer of 3–16; and $X^7$ and $X^8$ independently denote H, F or CH$_3$.
Further, preferred examples of the mesomorphic compound of the formulae (Ia) to (Is) may include those of the following formulae (Iaa) to (Ipb):

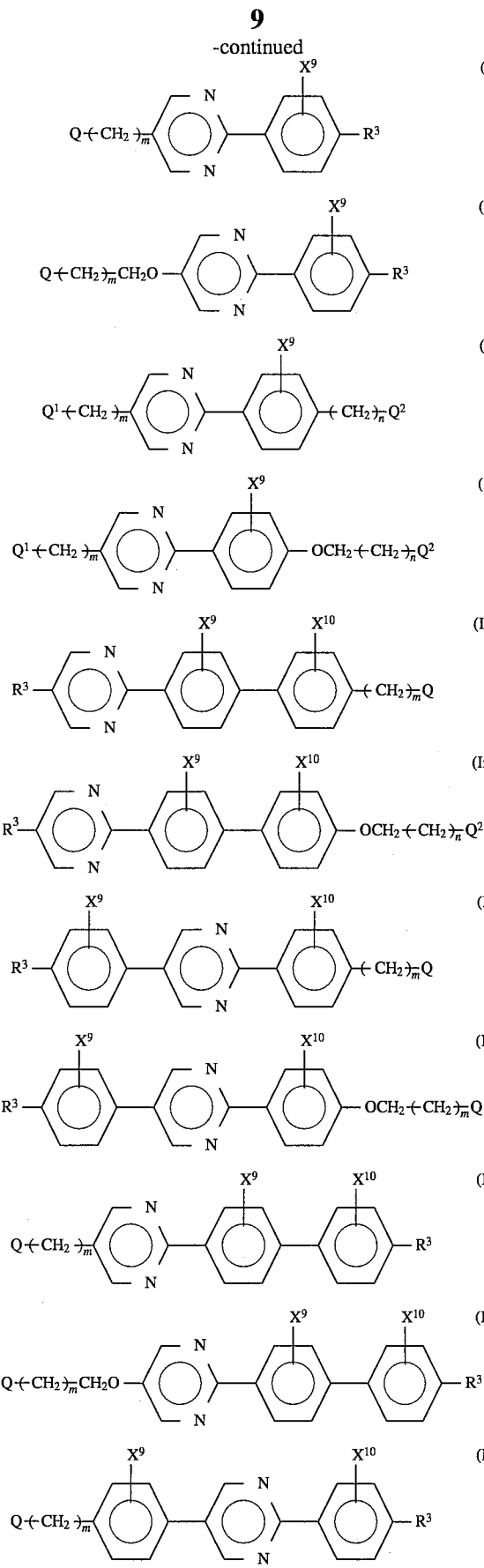

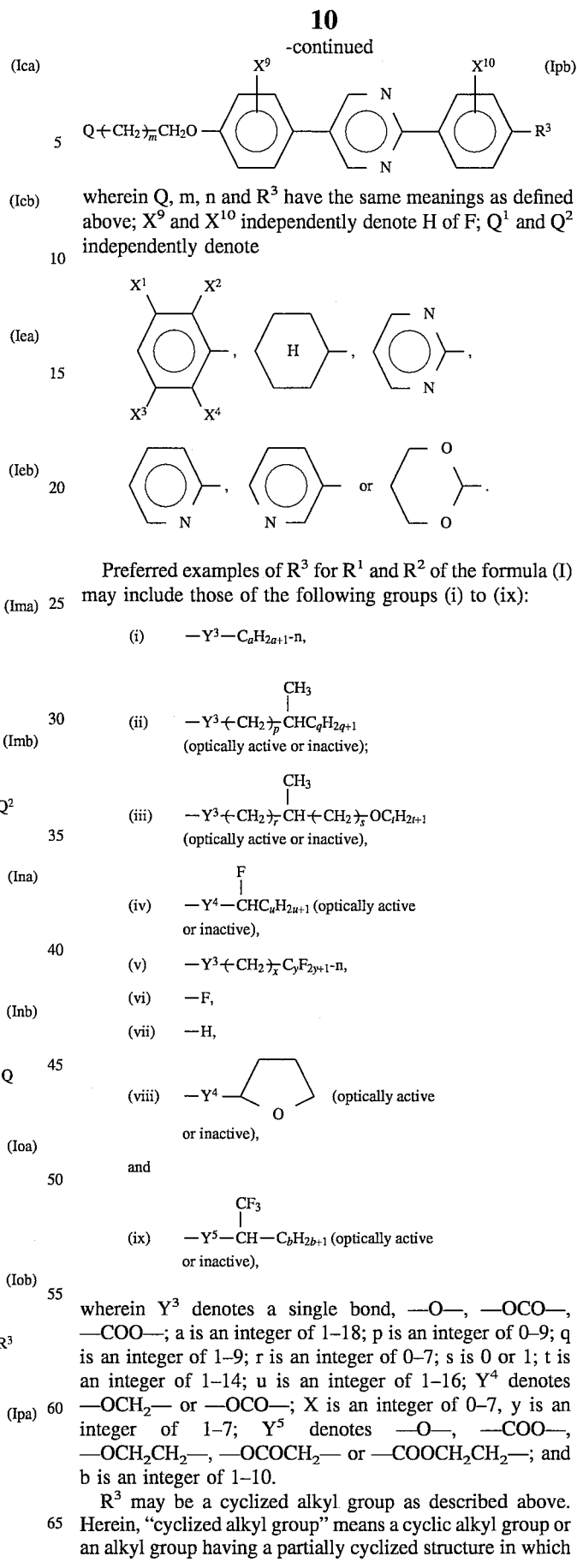

wherein Q, m, n and $R^3$ have the same meanings as defined above; $X^9$ and $X^{10}$ independently denote H of F; $Q^1$ and $Q^2$ independently denote Preferred examples of $R^3$ for $R^1$ and $R^2$ of the formula (I) may include those of the following groups (i) to (ix):

(i) $-Y^3-C_aH_{2a+1}$-n, (ii) $-Y^3+CH_2)_p^-CHC_qH_{2q+1}$
      with $CH_3$ branch
      (optically active or inactive);

(iii) $-Y^3+CH_2)_r^-CH+CH_2)_s^-OC_tH_{2t+1}$
       with $CH_3$ branch
       (optically active or inactive), (iv) $-Y^4-CHC_uH_{2u+1}$ (optically active or inactive),
      with F branch (v) $-Y^3+CH_2)_x^-C_yF_{2y+1}$-n, (vi) $-F$, (vii) $-H$, (viii) $-Y^4-$ (tetrahydrofuranyl) (optically active or inactive), and (ix) $-Y^5-CH-C_bH_{2b+1}$ (optically active or inactive),
      with $CF_3$ branch wherein $Y^3$ denotes a single bond, $-O-$, $-OCO-$, $-COO-$; a is an integer of 1–18; p is an integer of 0–9; q is an integer of 1–9; r is an integer of 0–7; s is 0 or 1; t is an integer of 1–14; u is an integer of 1–16; $Y^4$ denotes $-OCH_2-$ or $-OCO-$; X is an integer of 0–7, y is an integer of 1–7; $Y^5$ denotes $-O-$, $-COO-$, $-OCH_2CH_2-$, $-OCOCH_2-$ or $-COOCH_2CH_2-$; and b is an integer of 1–10.

$R^3$ may be a cyclized alkyl group as described above. Herein, "cyclized alkyl group" means a cyclic alkyl group or an alkyl group having a partially cyclized structure in which the cyclized structure can be constituted by methylene group and/or at least one heteroatom (e.g., oxygen).

Preferred examples of $Q-Y^1-(CH_2)_m-Y^2-$ for $R^1$ and $R^2$ of the formula (I) may include those of the following groups (x) to (xv):

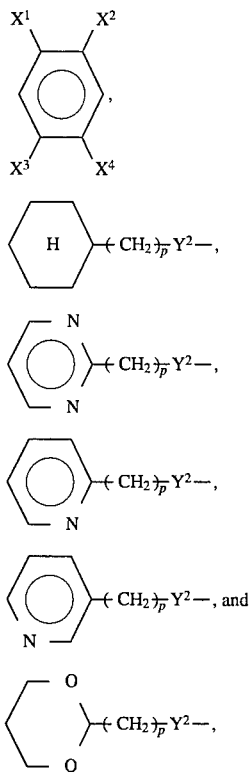

(x), (xi), (xii), (xiii), (xiv), (xv)

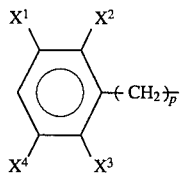

wherein $X^1$, $X^2$, $X^3$, $X^4$ and $Y^2$ have the same meanings as defined above; and p is an integer of 3–12.

In the above groups (x) to (xv), the following groups (x-a) to (x-c) may more preferably be used.

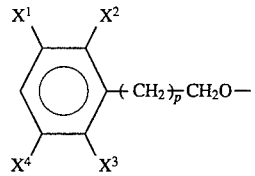

(x-a), (x-b), (x-c)

In the above groups (x-a) to (x-c), $X^1$, $X^2$, $X^3$, $X^4$ and p have the same meanings as defined above.

As the group of $Q-Y^1-(CH_2)_m-Y^2-$, the following group may particularly be preferred.

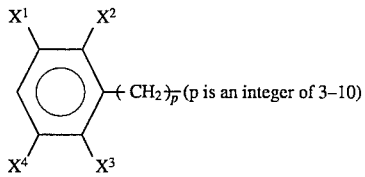

(p is an integer of 3–10)

In the above group, $X^1$, $X^2$, $X^3$, and $X^4$ have the same meanings as defined above.

In the group of $Q-Y^1-(CH_2)_m-Y^2-$, the linkage $Y^1$ may preferably be a single bond. Further, Q may preferably be

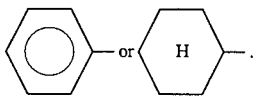

The mesomorphic compound of the above-mentioned formula (I) may generally be synthesized through the following reaction schemes (i) to (iv).

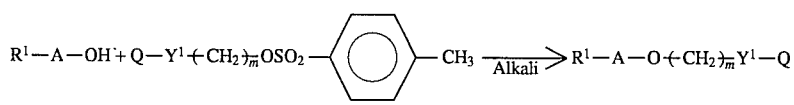 (i)

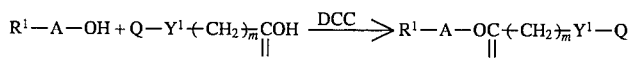 (ii)

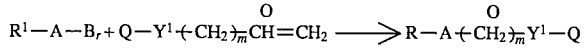 (iii)

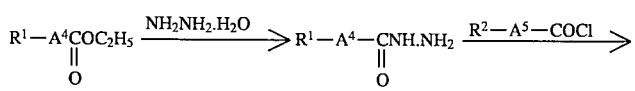 (iv)

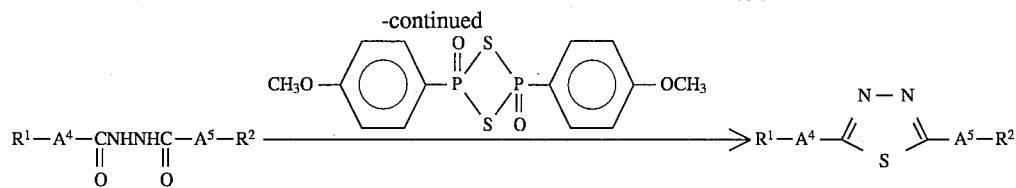
In the above, $A^4$ and $A^5$ are a single bond or $A^1$ or $A^2$ as defined above, respectively.
Specific examples of the mesomorphic compound represented by the formula (I) or (II) may include those shown in the following structural formulas.
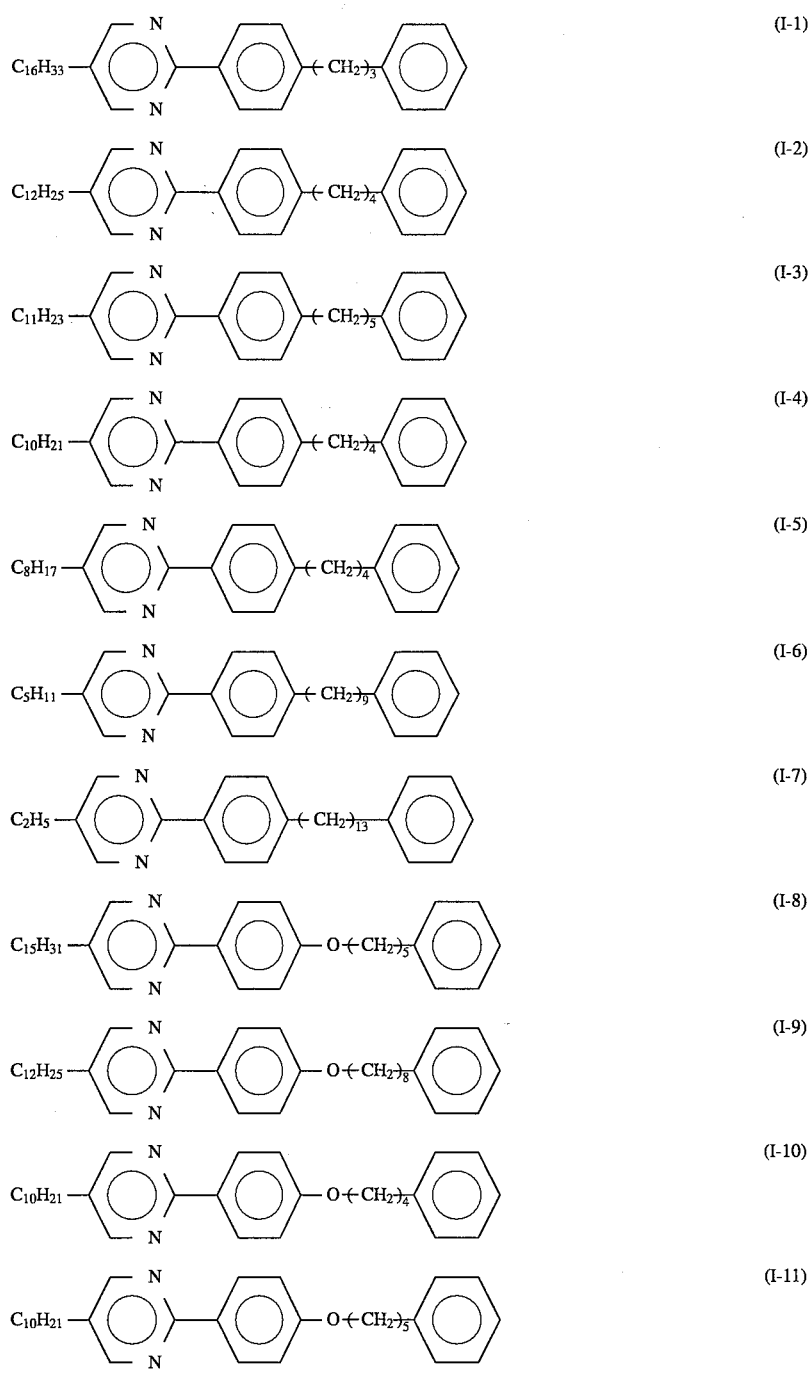

-continued
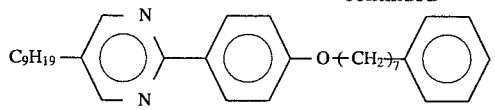(I-12)
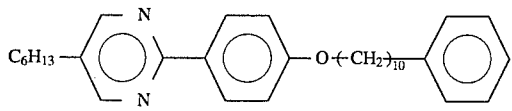(I-13)
(I-14)
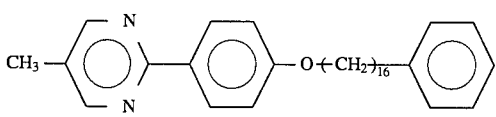(I-15)
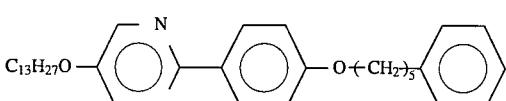(I-16)
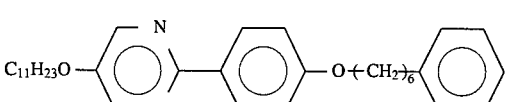(I-17)
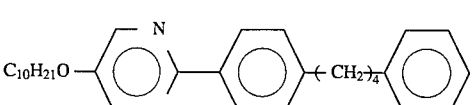(I-18)
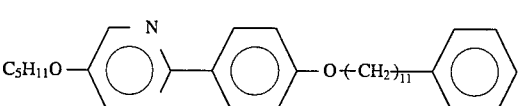(I-19)
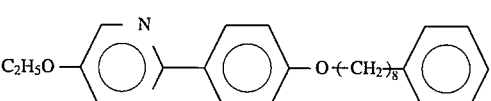(I-20)
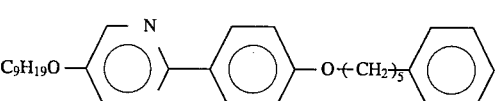(I-21)
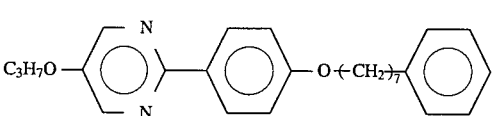(I-22)
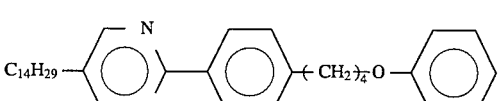(I-23)
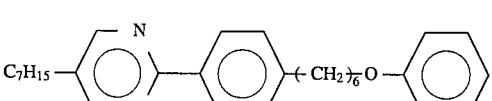(I-24)
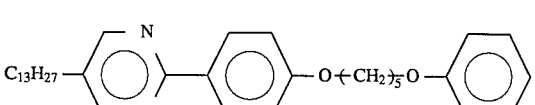(I-25)

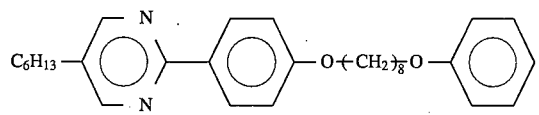 (I-26)
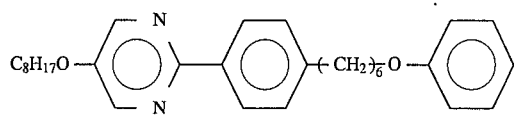 (I-27)
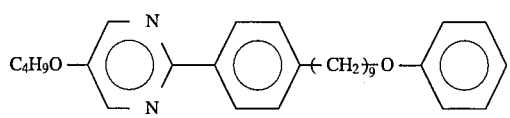 (I-28)
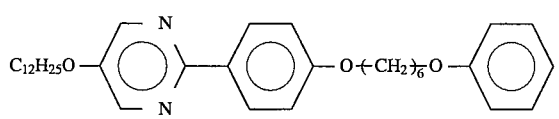 (I-29)
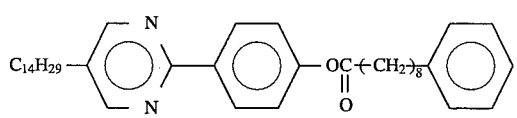 (I-30)
 (I-31)
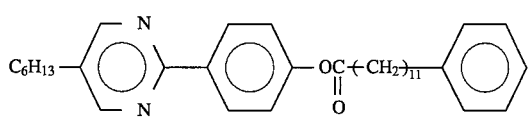 (I-32)
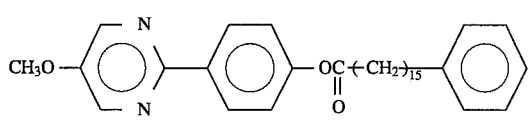 (I-33)
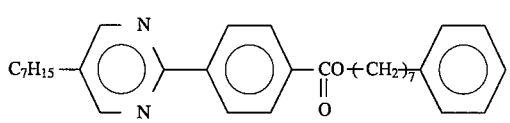 (I-34)
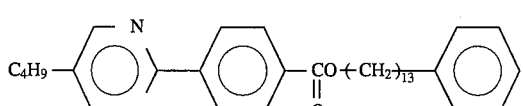 (I-35)
 (I-36)
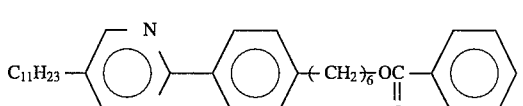 (I-37)
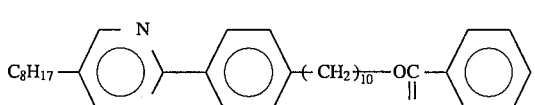 (I-38)

-continued
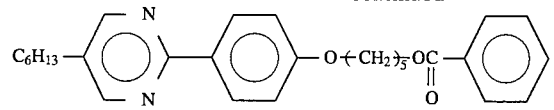 (I-39)
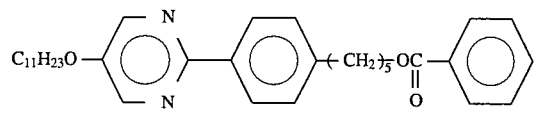 (I-40)
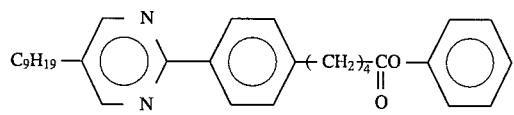 (I-41)
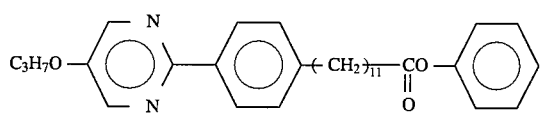 (I-42)
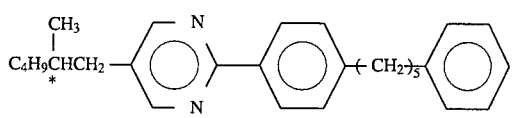 (I-43)
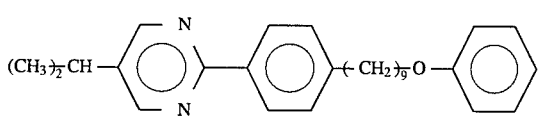 (I-44)
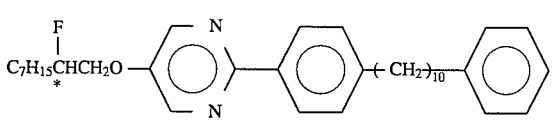 (I-45)
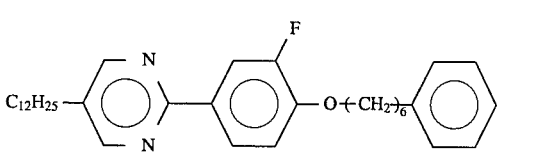 (I-46)
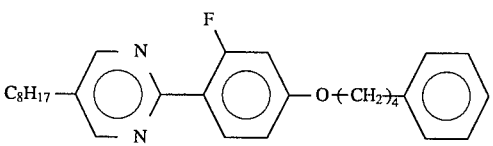 (I-47)
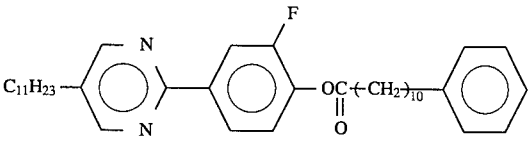 (I-48)
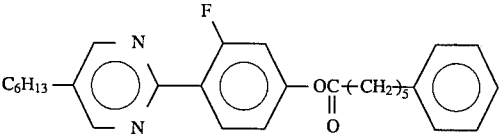 (I-49)
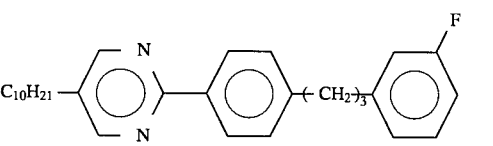 (I-50)

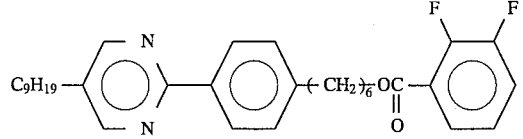 (I-51)
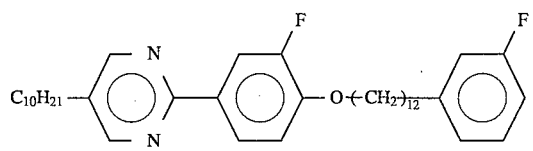 (I-52)
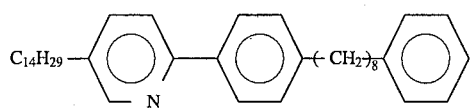 (I-53)
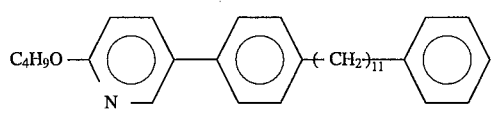 (I-54)
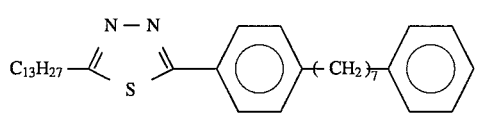 (I-55)
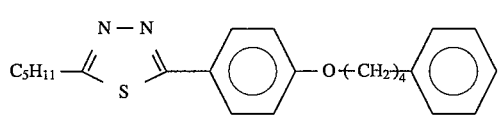 (I-56)
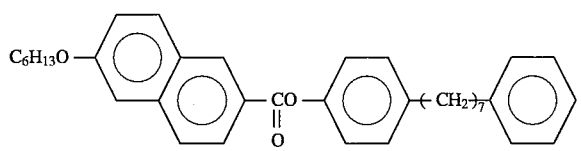 (I-57)
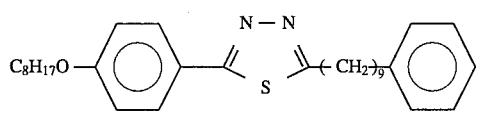 (I-58)
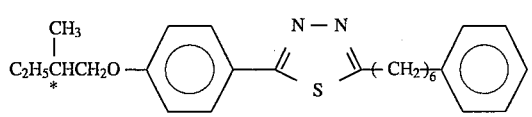 (I-59)
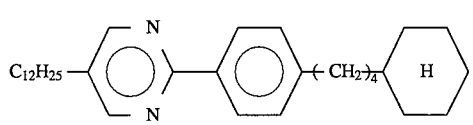 (I-60)
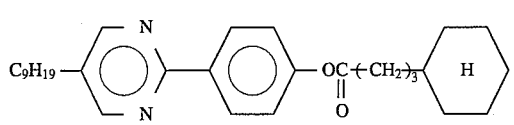 (I-61)
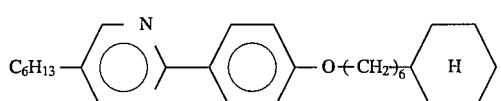 (I-62)
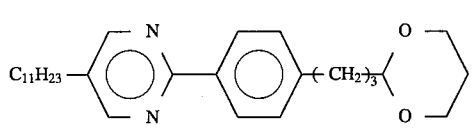 (I-63)

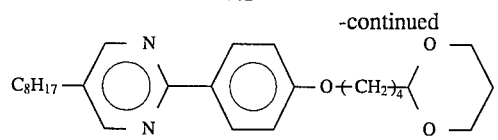 (I-64)
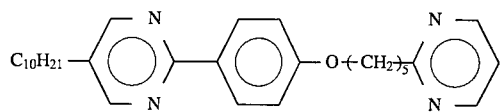 (I-65)
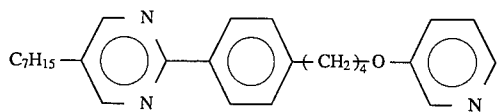 (I-66)
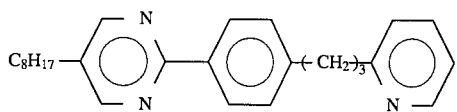 (I-67)
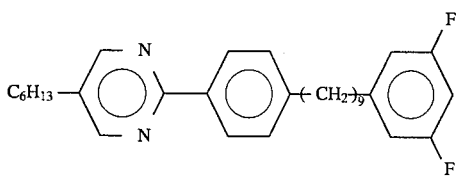 (I-68)
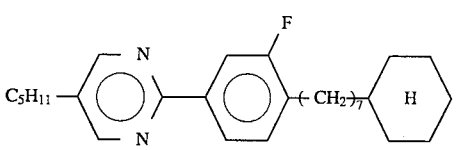 (I-69)
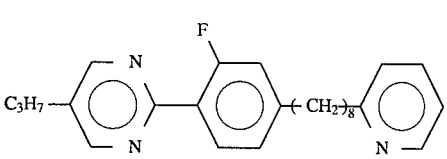 (I-70)
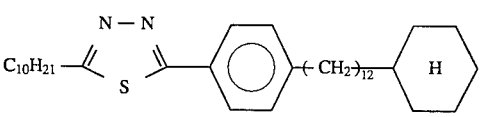 (I-71)
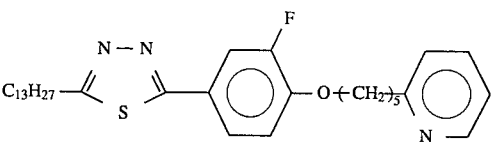 (I-72)
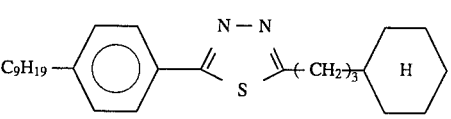 (I-73)
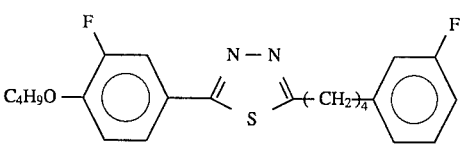 (I-74)
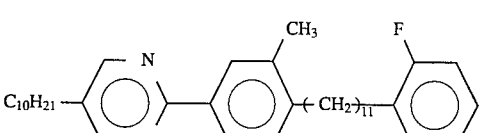 (I-75)

-continued
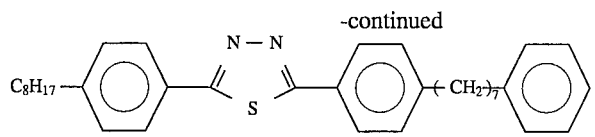 (I-76)
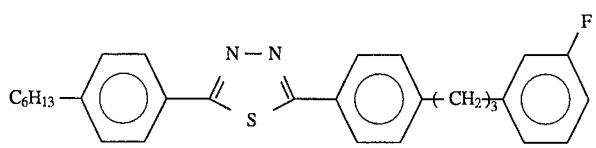 (I-77)
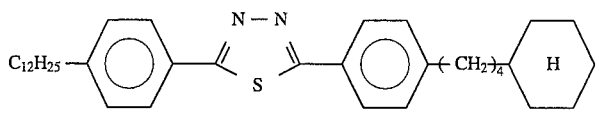 (I-78)
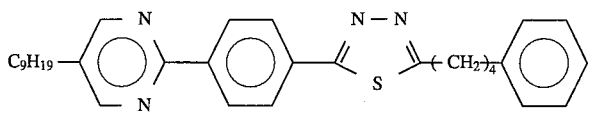 (I-79)
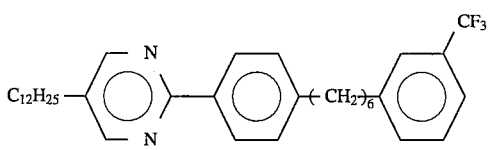 (I-80)
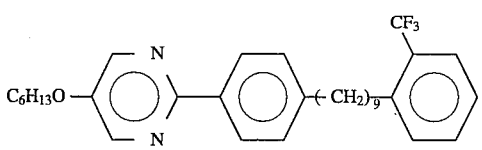 (I-81)
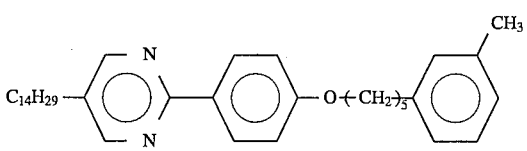 (I-82)
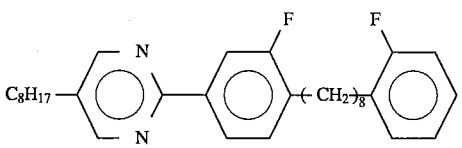 (I-83)
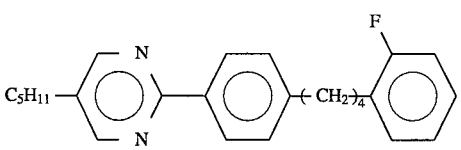 (I-84)
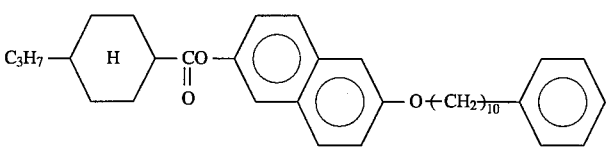 (I-85)
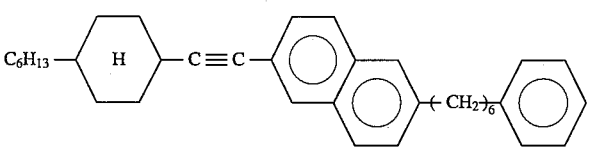 (I-86)
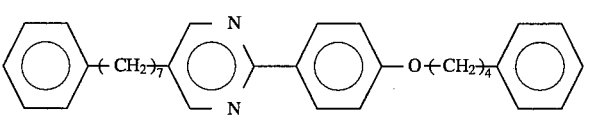 (I-87)

-continued
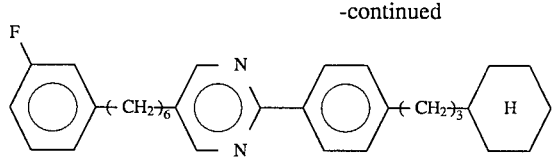 (I-88)
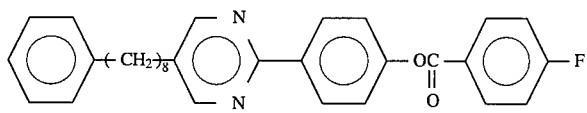 (I-89)
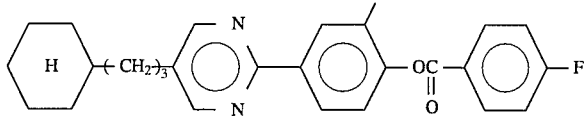 (I-90)
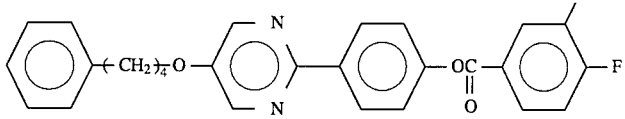 (I-91)
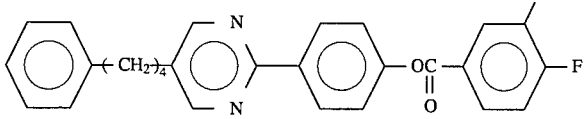 (I-92)
 (I-93)
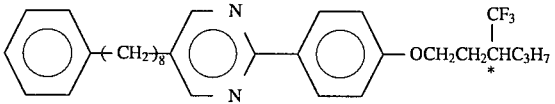 (I-94)
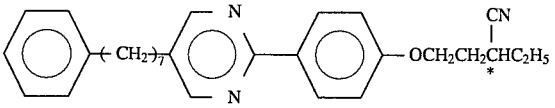 (I-95)
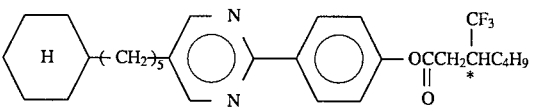 (I-96)
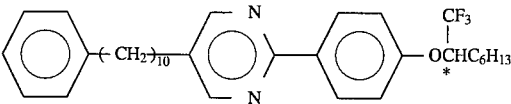 (I-97)
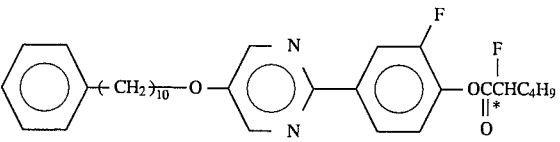 (I-98)
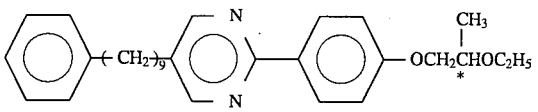 (I-99)

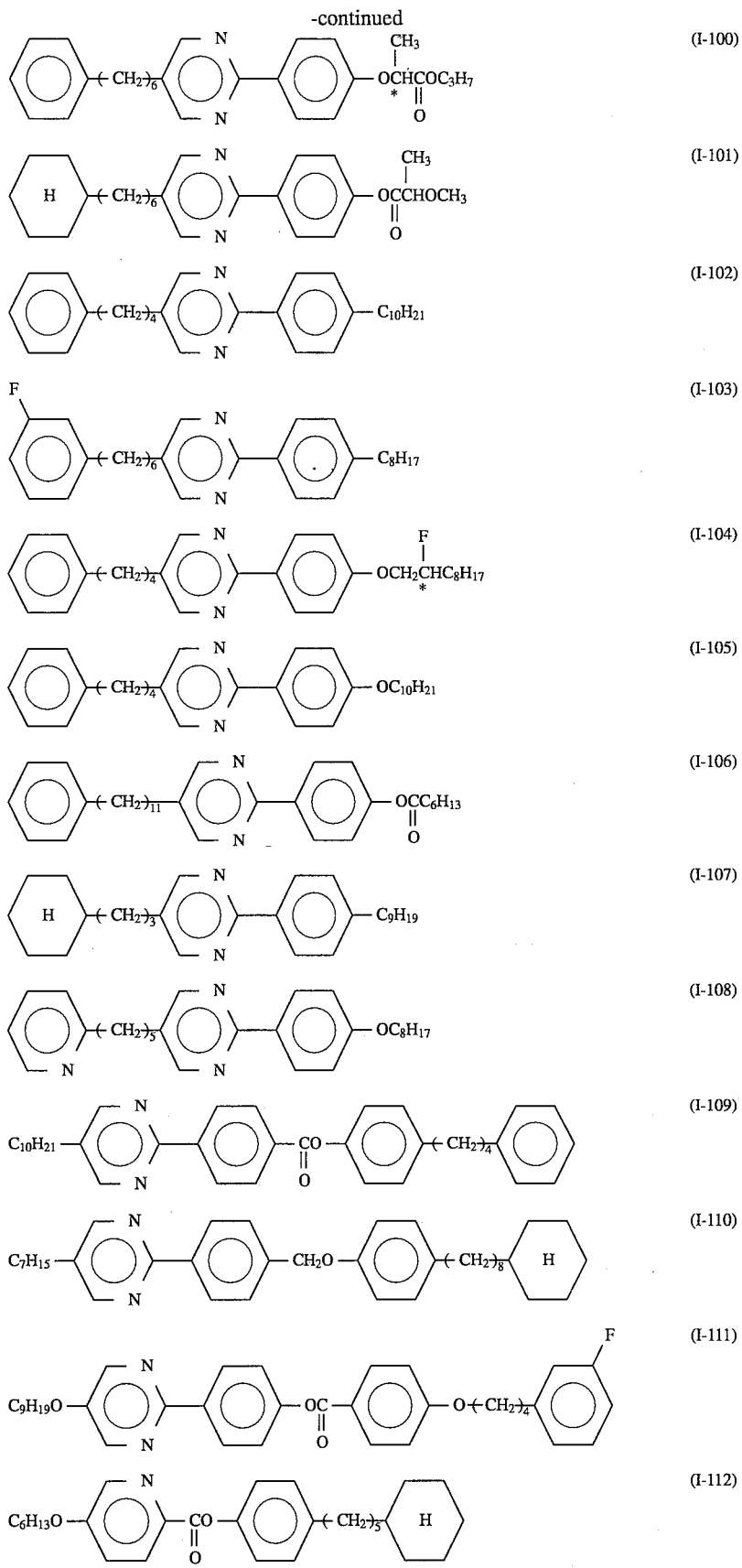

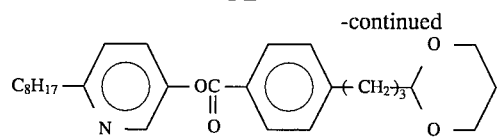 (I-113)
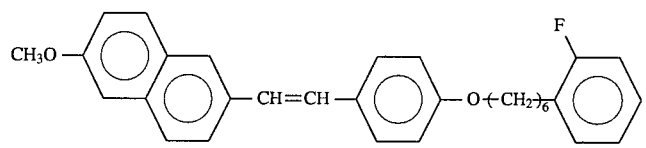 (I-114)
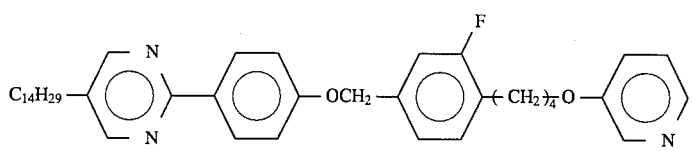 (I-115)
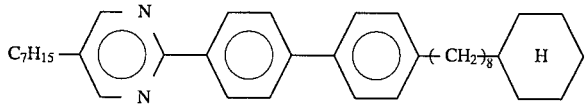 (I-116)
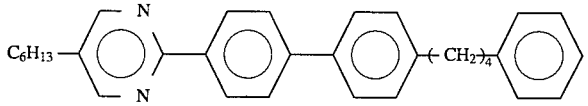 (I-117)
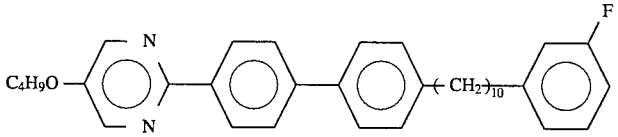 (I-118)
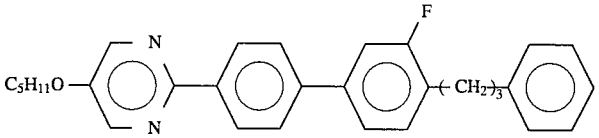 (I-119)
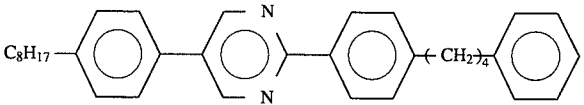 (I-120)
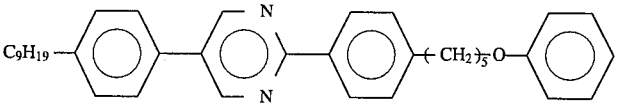 (I-121)
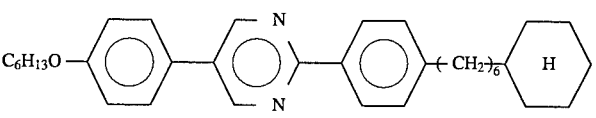 (I-122)
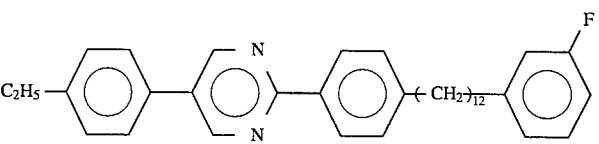 (I-123)
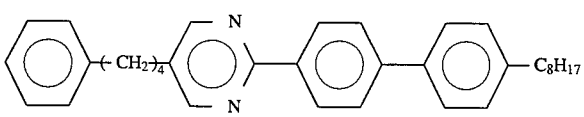 (I-124)

-continued
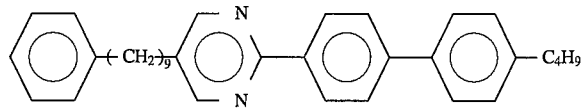 (I-125)
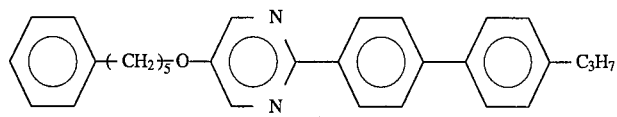 (I-126)
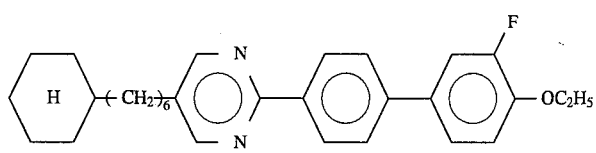 (I-127)
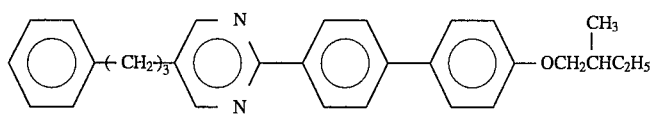 (I-128)
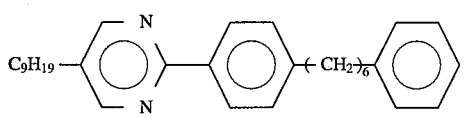 (I-129)
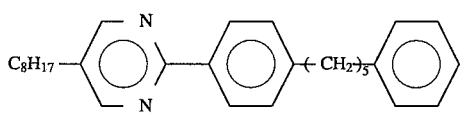 (I-130)
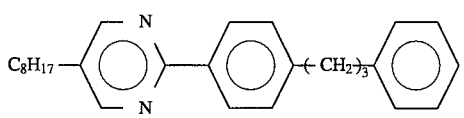 (I-131)
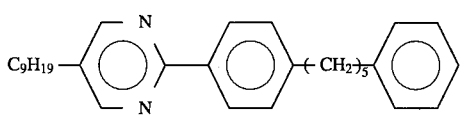 (I-132)
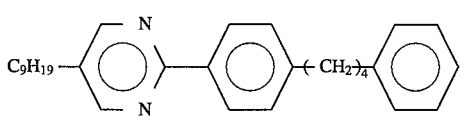 (I-133)
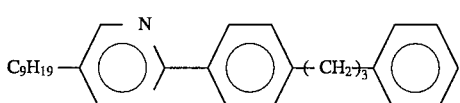 (I-134)
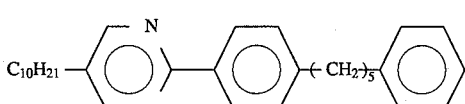 (I-135)
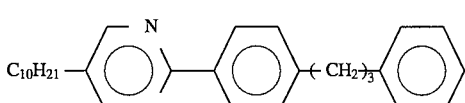 (I-136)
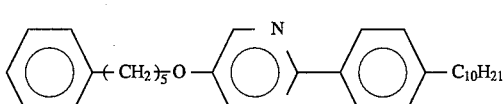 (I-137)

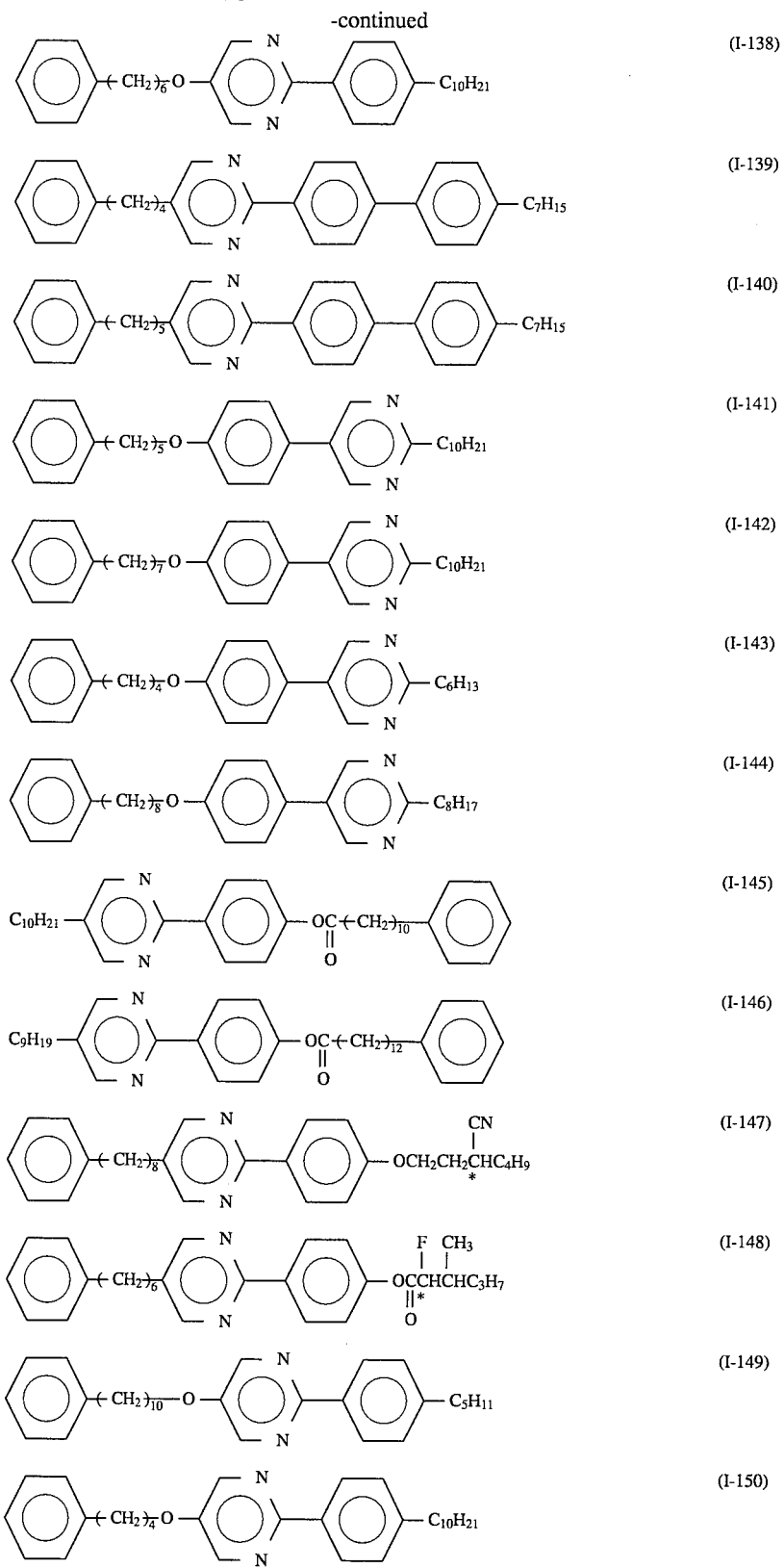

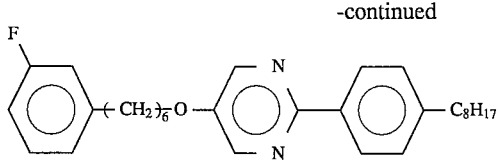 (I-151)
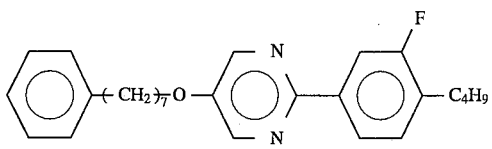 (I-152)
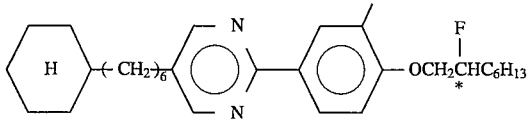 (I-153)
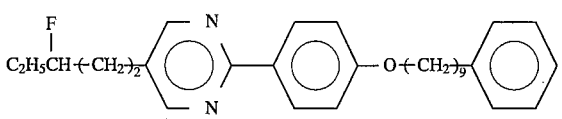 (I-154)
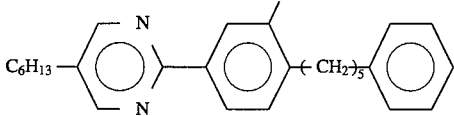 (I-155)
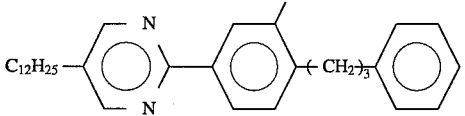 (I-156)
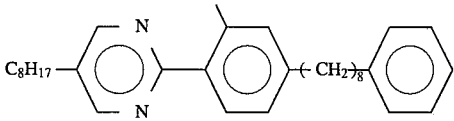 (I-157)
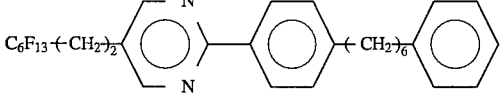 (I-158)
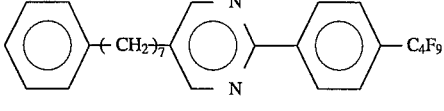 (I-159)
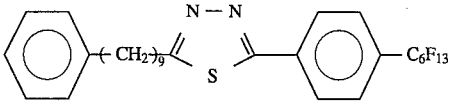 (I-160)
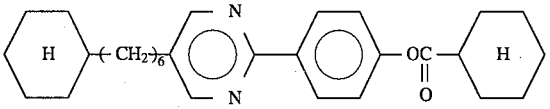 (I-161)
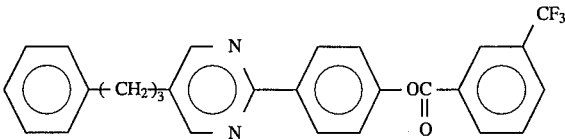 (I-162)

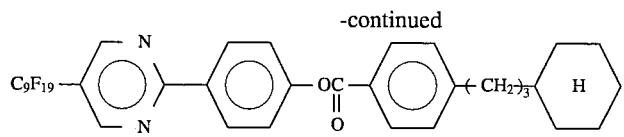 (I-163)
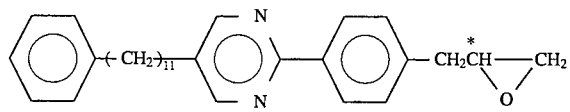 (I-164)
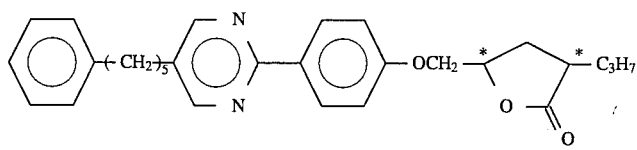 (I-165)
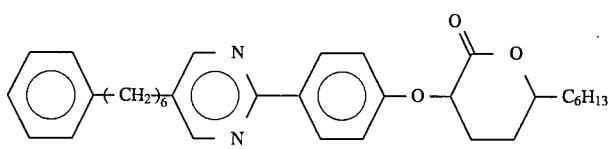 (I-167)
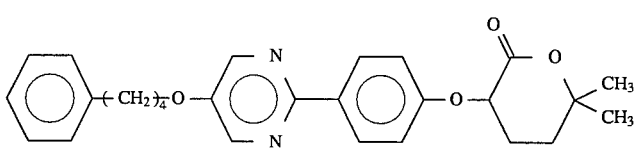 (I-168)
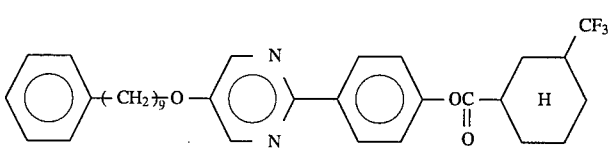 (I-169)
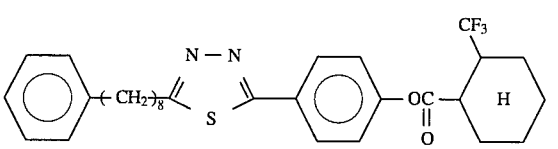 (I-170)
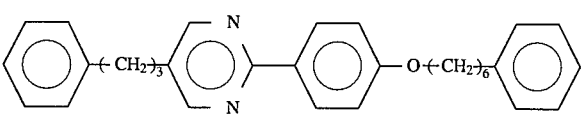 (I-171)
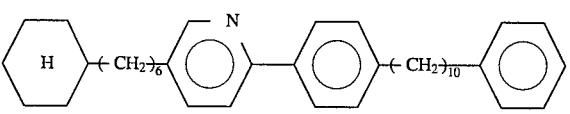 (I-172)
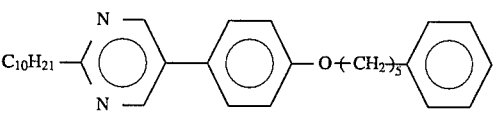 (I-173)
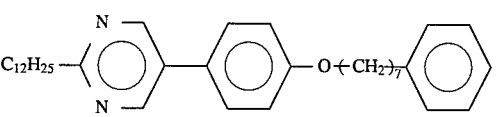 (I-174)
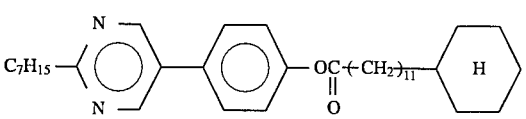 (I-175)

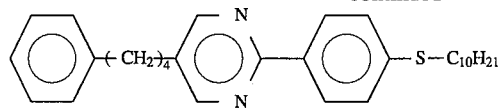 (I-176)
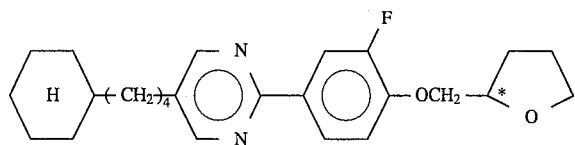 (I-177)
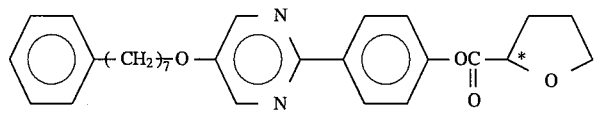 (I-178)
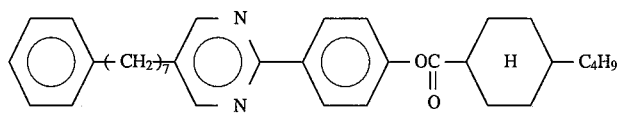 (I-179)
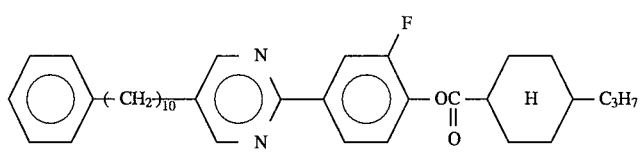 (I-180)
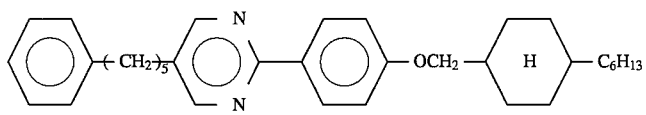 (I-181)
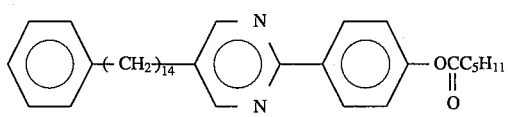 (I-182)
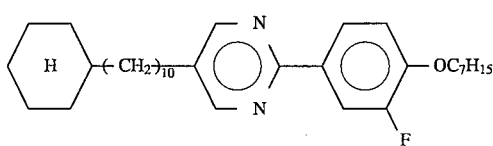 (I-183)
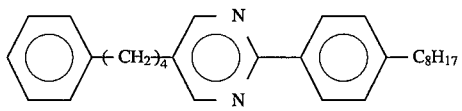 (I-184)
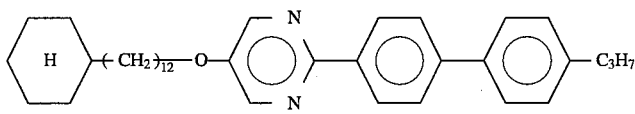 (I-185)
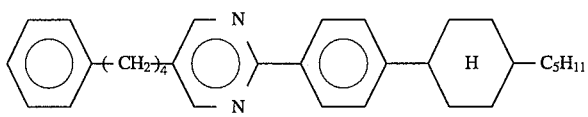 (I-186)
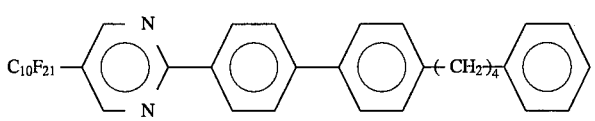 (I-187)
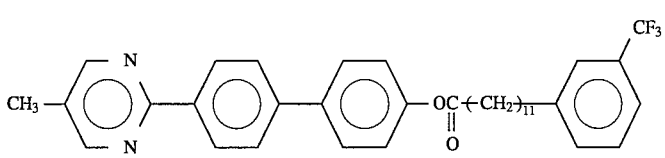 (I-188)

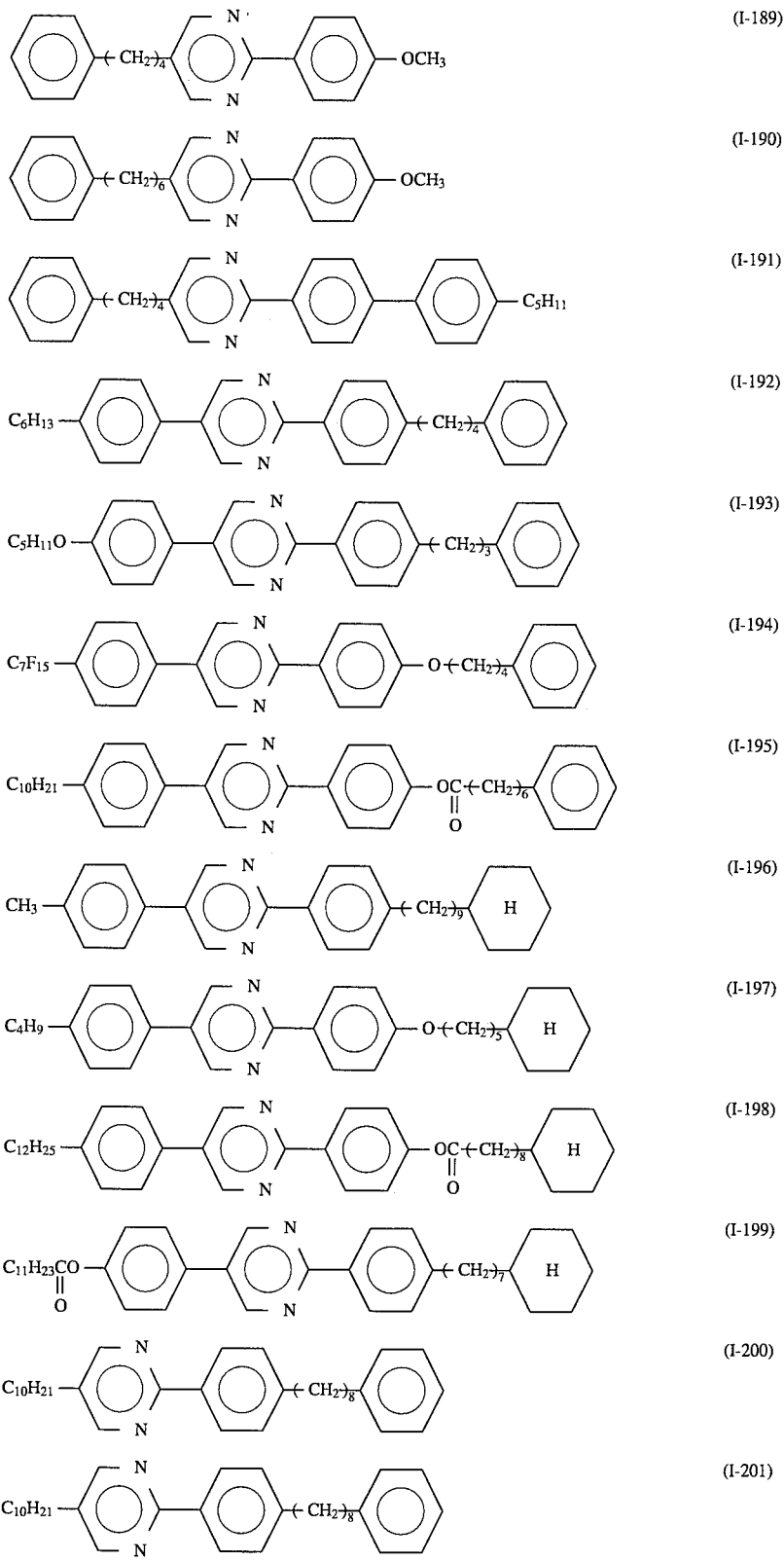

-continued
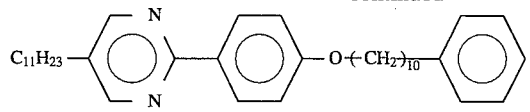 (I-202)
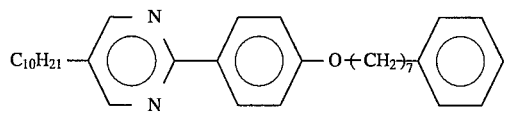 (I-203)
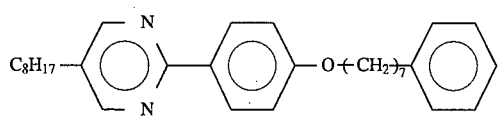 (I-204)
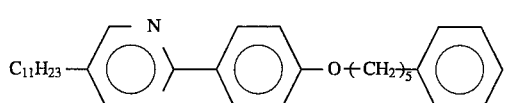 (I-205)
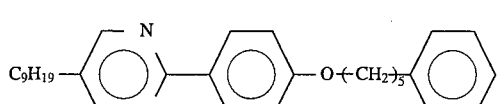 (I-206)
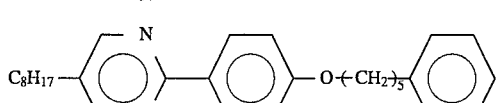 (I-207)
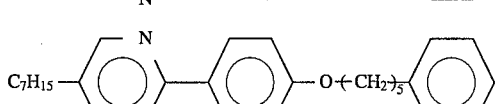 (I-208)
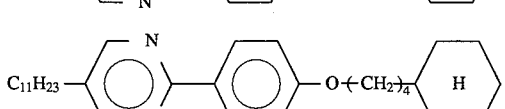 (I-209)
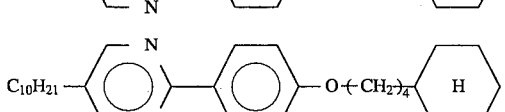 (I-210)
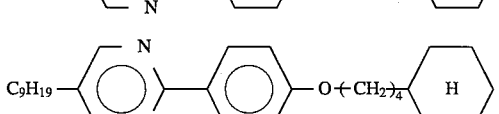 (I-211)
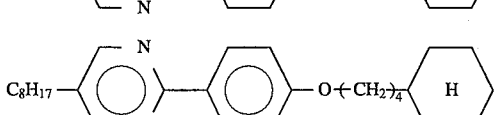 (I-213)
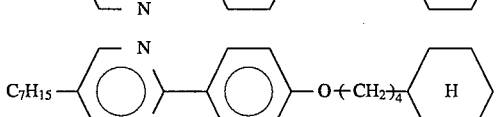 (I-214)
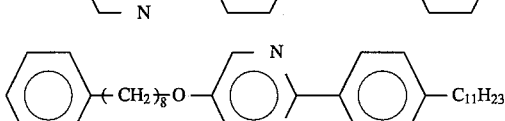 (I-215)
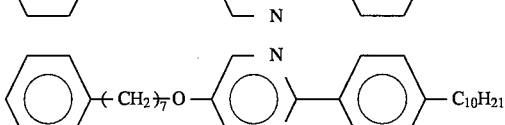 (I-216)

-continued

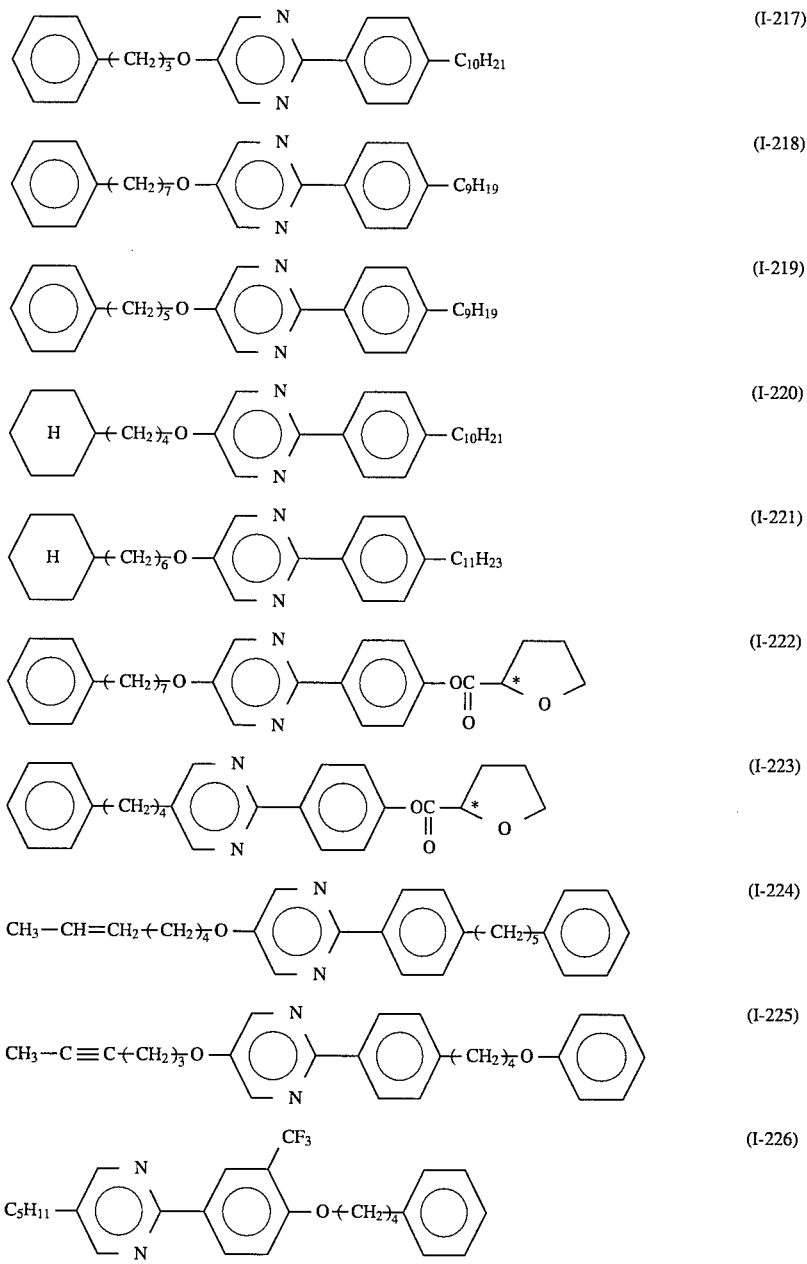

The liquid crystal composition according to the present invention may be obtained by mixing at least one species of the mesomorphic compound represented by the formula (I) and at least one species of another mesomorphic compound in appropriate proportions.

The liquid crystal composition according to the present invention may preferably be formulated as a liquid crystal composition capable of showing ferroelectricity, particularly a liquid crystal composition showing a chiral smectic phase.

Specific examples of another mesomorphic compound described above may include those denoted by the following formulas (III) to (XIII).

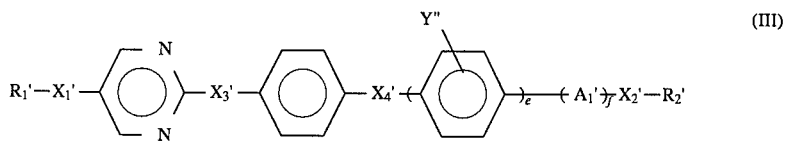

wherein e denotes 0 or 1 and f denotes 0 or 1 with proviso that e+f=0 or 1; Y" denotes H, halogen, CH$_3$ or CF$_3$; X$_1$' and X$_2$' respectively denote a single bond,

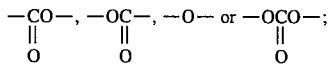

X$_3$' and X$_4$' respectively denote a single bond,

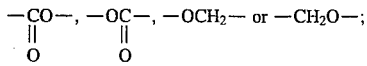

and A$_1$' denotes 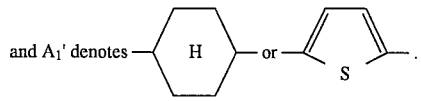.

In the formula (III), preferred compounds thereof may include those represented by the following formulas (IIIa) to (IIIe):

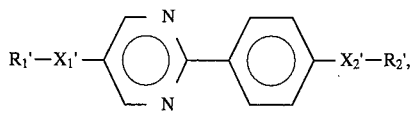 (IIIa)

 (IIIb)

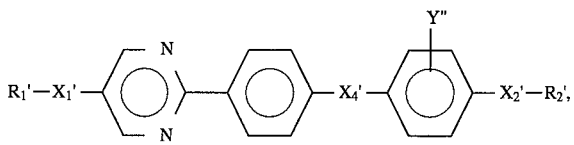 (IIIc)

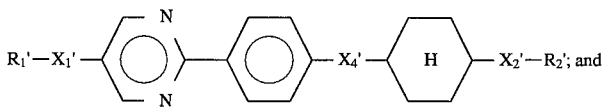 (IIId)

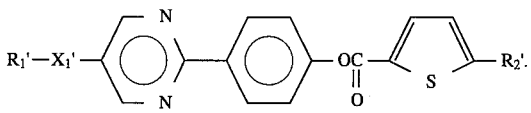 (IIIe)

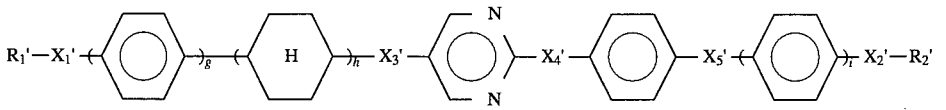 (IV)

wherein g and h respectively denote 0 or 1 with proviso that g+h=0 or 1; i denotes 0 or 1; X$_1$' and X$_2$' respectively denote a single bond,

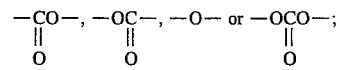

and X$_3$', X$_4$' and X$_5$' respectively denote a single bond,

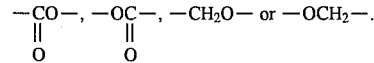

In the formula (IV), preferred compounds thereof may include those represented by the following formulas (IVa) to (IVc):

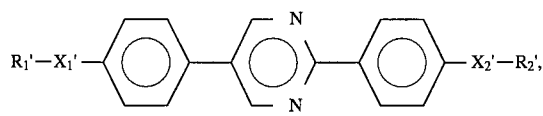 (IVa)

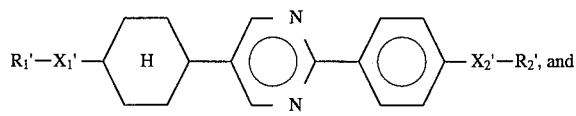 (IVb)

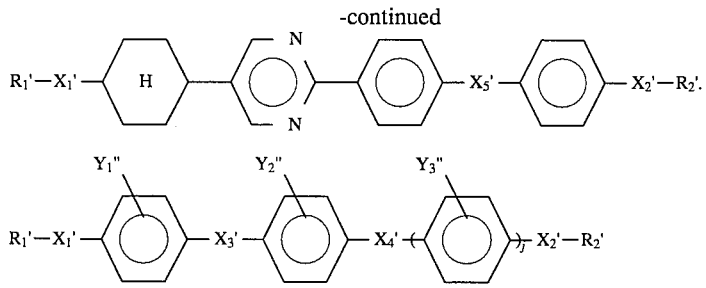
(IVc)

(V)
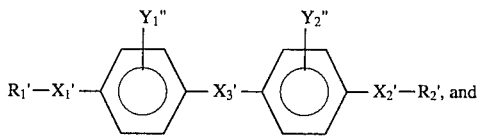

wherein j denotes 0 or 1; $Y_1''$, $Y_2''$ and $Y_3''$ respectively denote H, halogen, $CH_3$ or $CF_3$; $X_1'$ and $X_2'$ respectively denote a single bond,

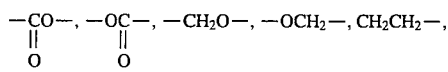

and $X_3'$ and $X_4'$ respectively denote a single bond,

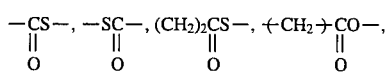

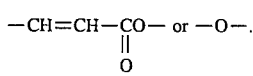

—CH=CH—CO— or —O—.
             ‖
             O

In the formula (V), preferred compounds thereof may include those represented by the following formulas (Va) and (Vb):

(Va)
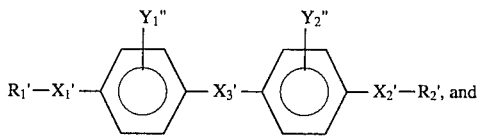

(Vb)
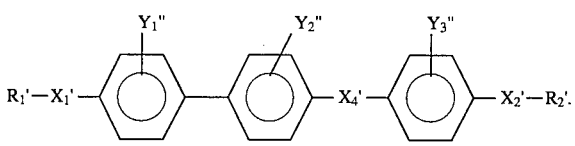

(VI)
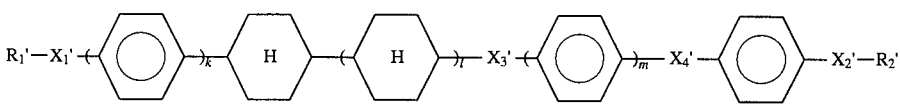

wherein k, l and m respectively denote 0 or 1 with proviso that k+l+m=0, 1 or 2; $X_1'$ and $X_2'$ respectively denote a single bond,

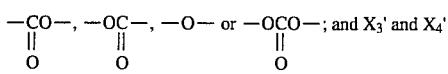

respectively denote a single bond,

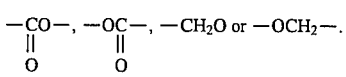

In the formula (VI), preferred compounds thereof may include those represented by the following formulas (VIa) to (VIf):

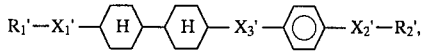 (VIa)

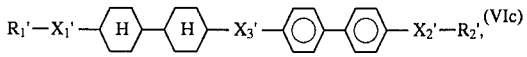 (VIb)

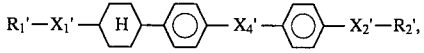 (VIc)

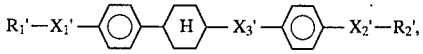 (VId)

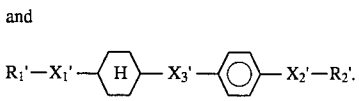 (VIe)

and

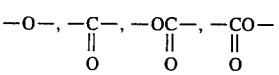 (VIf)

Herein, $R_1'$ and $R_2'$ respectively denote a linear or branched alkyl group having 1–18 carbon atoms capable of including one or non-neighboring two or more methylene groups which can be replaced with —CH halogen- and capable of further including one or two or more non-neighboring methylene groups other than those directly connected to $X_1'$ or $X_2'$ which can be replaced with at least one species of

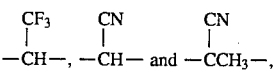

with proviso that $R_1'$ and $R_2'$ respectively do not connect to a ring structure by a single bond when $R_1'$ and $R_2'$ respectively denote a halogenated alkyl group containing one methylene group replaced with —CH halogen- or —CH($CF_3$)—.

Further, preferred examples of $R_1'$ and $R_2'$ may respectively include those represented by the following groups (i) to (xi):

i) a linear alkyl group having 1–15 carbon atoms;

ii) 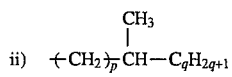

wherein p denotes an integer of 0–5 and q denotes an integer of 2–11 (optically active or inactive);

iii) 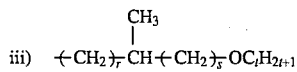

wherein r denotes an integer of 0–6, s denotes 0 or 1, and t denotes an integer of 1–14 (optically active or inactive);

iv) 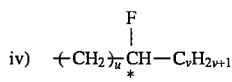

wherein u denotes 0 or 1 and v denotes an integer of 1–16;

v) 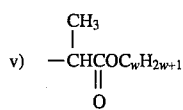

wherein w denotes an integer of 1–15 (optically active or inactive);

vi) 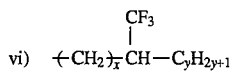

wherein x denotes an integer of 0–2 and y denotes an integer of 1–15 (optically active or inactive).

vii) 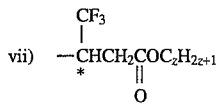

wherein z denotes an integer of 1–15.

viii) 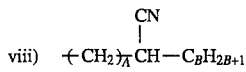

wherein A denotes an integer of 0–2 and B denotes an integer of 1–15 (optically active or inactive); and ix) 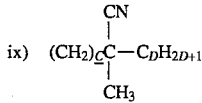

wherein C denotes an integer of 0–2 and D denotes an integer of 1–15 (optically active or inactive).

x) hydrogen (H), and xi) fluorine (F).

In the above-mentioned formulas (IIIa) to (IIId), more preferred compounds thereof may include those represented by the formulas (IIIaa) to (IIIdc):

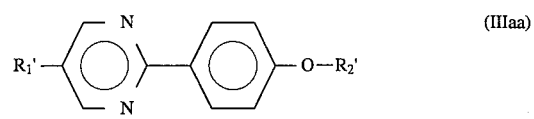 (IIIaa)

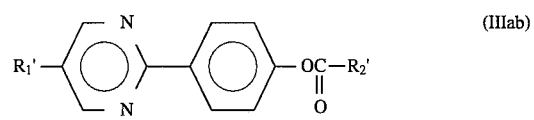 (IIIab)

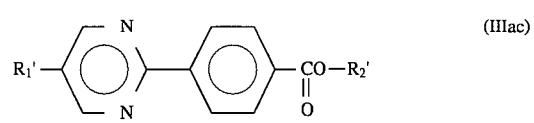 (IIIac)

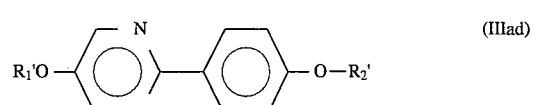 (IIIad)

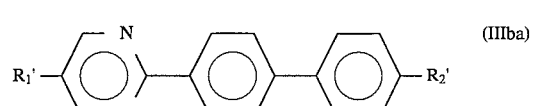 (IIIba)

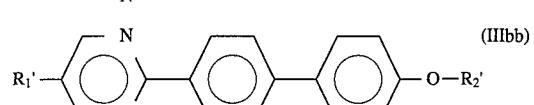 (IIIbb)

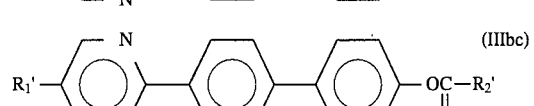 (IIIbc)

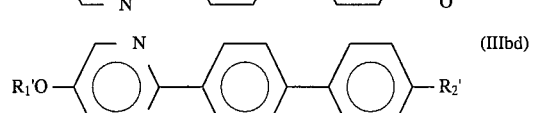 (IIIbd)

 (IIIca)

 (IIIcb)

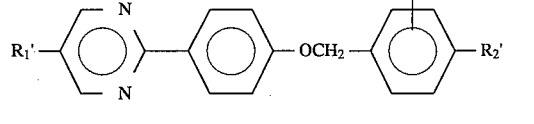 (IIIcc)

 (IIIcd)

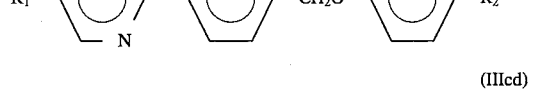

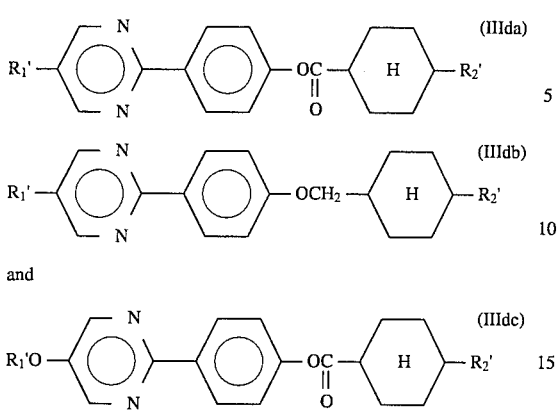
In the above-mentioned formulas (IVa) to (IVc), more preferred compounds thereof may include those represented by the formulas (IVaa) to (IVcd):
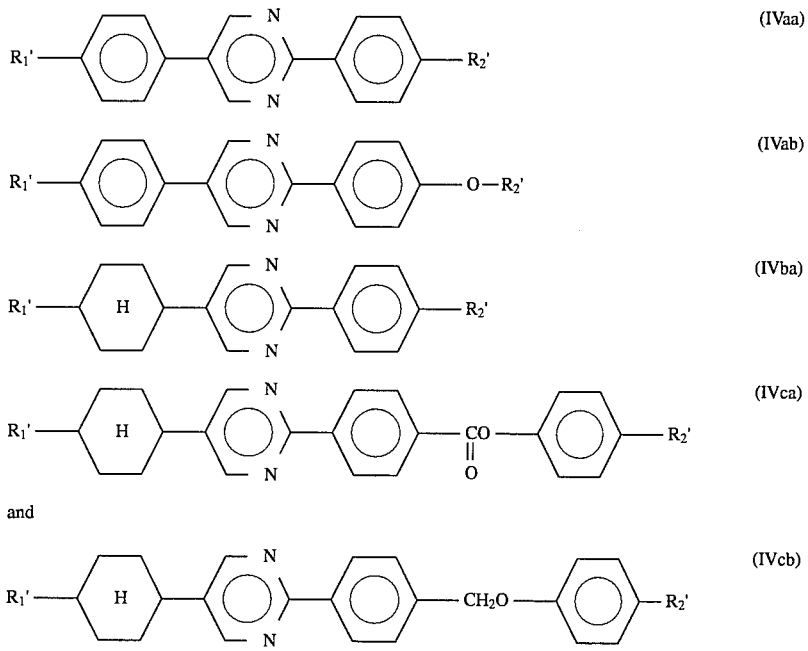
In the above-mentioned formulas (Va) to (Vd), more preferred compounds thereof may include those represented by the formulas (Vaa) to (Vbf):
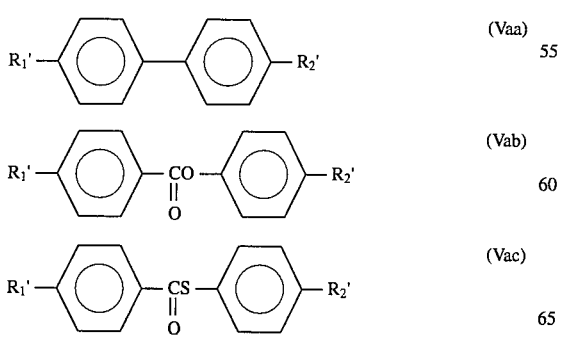
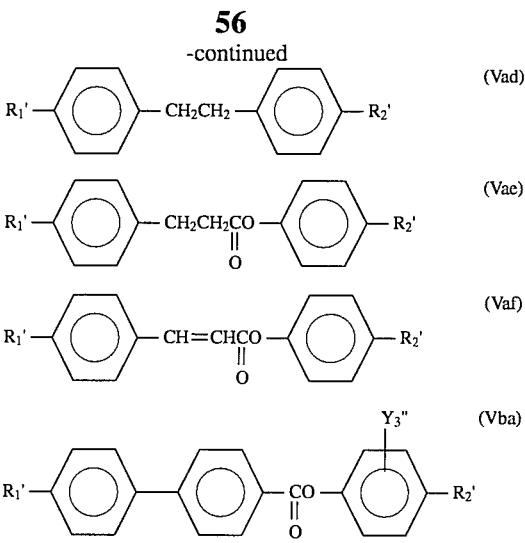
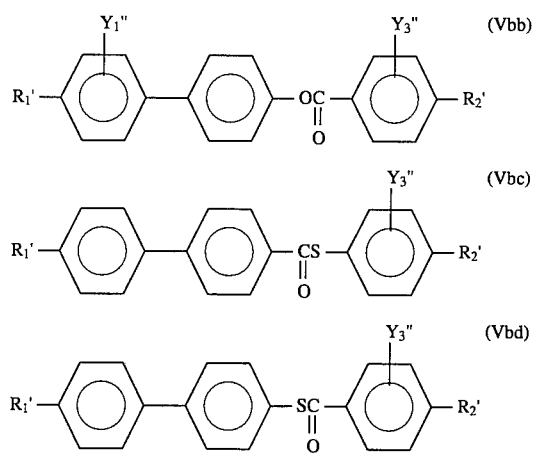

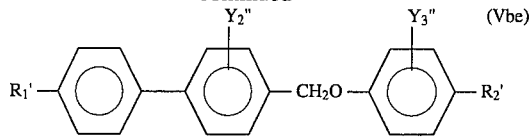 (Vbe)

and

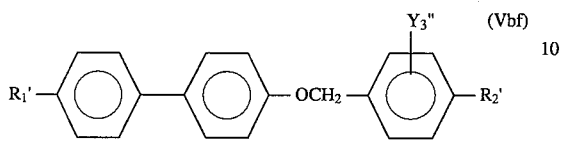 (Vbf)

In the above-mentioned formulas (VIa) to (VIf), more preferred compounds thereof may include those represented by the formulas (VIaa) to (VIfa):

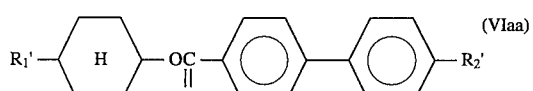 (VIaa)

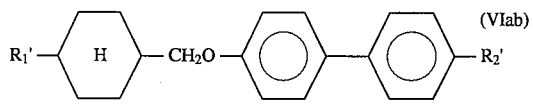 (VIab)

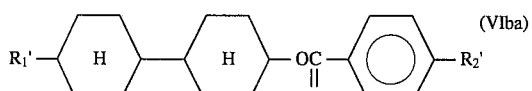 (VIba)

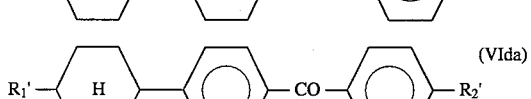 (VIbb)

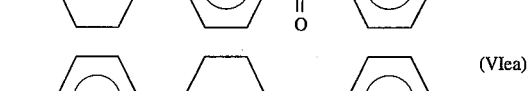 (VIda)

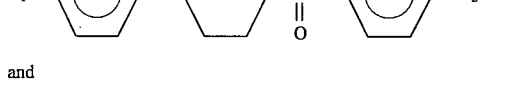 (VIea)

and

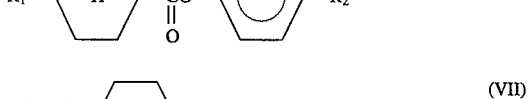 (VIfa)

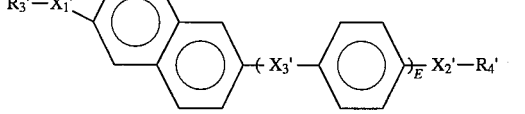 (VII)

wherein E denotes 0 or 1; $X_1'$ and $X_2'$ respectively denote a single bond, $$-\underset{\underset{O}{\|}}{C}O-,\quad -O\underset{\underset{O}{\|}}{C}-,\quad -O-\quad \text{or}\quad -O\underset{\underset{O}{\|}}{C}O-;$$

and $X_3'$ denotes a single bond, $$-\underset{\underset{O}{\|}}{C}O-,\quad -O\underset{\underset{O}{\|}}{C}-,\quad -CH_2O-\quad \text{or}\quad -OCH_2-.$$

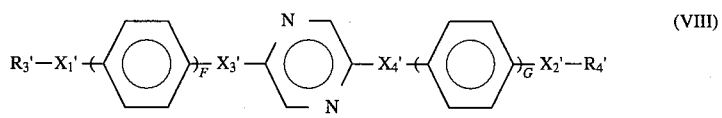 (VIII)

wherein F and G respectively denote 0 or 1; $X_1'$ and $X_2'$ respectively denote a single bond, $$-\underset{\underset{O}{\|}}{C}O-,\quad -O\underset{\underset{O}{\|}}{C}-\quad \text{or}\quad -O-;$$

and $X_3'$ and $X_4'$ respectively denote a single bond, $$-\underset{\underset{O}{\|}}{C}O-,\quad -O\underset{\underset{O}{\|}}{C}-,\quad -CH_2O-\quad \text{or}\quad -OCH_2-.$$

In the above formula (VII), preferred compounds thereof may include those represented by the following formulas (VIIa) and (VIIb):

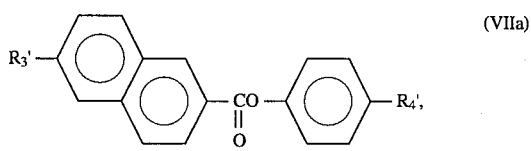 (VIIa)

and

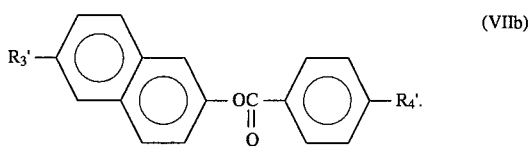 (VIIb)

In the above formula (VIII), preferred compounds thereof may include those represented by the following formulas (VIIIa) and (VIIIb).

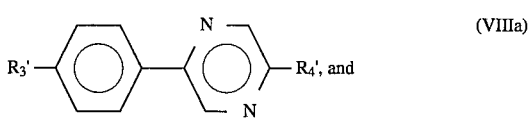 (VIIIa)

-continued

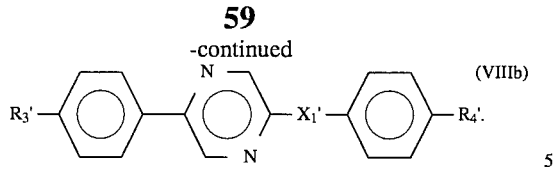

More preferred compounds of the formula (VIIIb) may include those represented by the formulas (VIIIba) to (VIIIbb):

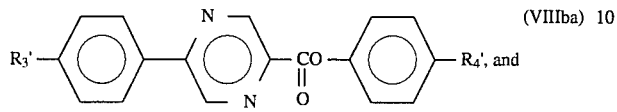

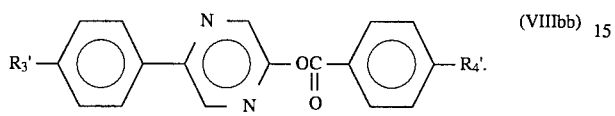

Herein, $R_3'$ and $R_4'$ respectively denote a linear or branched alkyl group having 1–18 carbon atoms capable of including one or non-neighboring two or more methylene groups which can be replaced with —CH halogen- and capable of further including one or two or more non-neighboring methylene groups other than those directly connected to $X_1'$ or $X_2'$ which can be replaced with at least one species of $$-O-, -\underset{\underset{O}{\|}}{C}-, -O\underset{\underset{O}{\|}}{C}-, -\underset{\underset{O}{\|}}{C}O- \quad -\underset{\underset{CN}{|}}{C}H- \text{ and } -\underset{\underset{CH_3}{|}}{C}CH_3-,$$

with proviso that $R_3'$ and $R_4'$ respectively do not connect to a ring structure by a single bond when $R_3'$ and $R_4'$ respectively denote a halogenated alkyl group containing one methylene group replaced with —CH halogen-.

Further, preferred examples of $R_3'$ and $R_4'$ may respectively include those represented by the following groups (i) to (vii):

i) a linear alkyl group having 1–15 carbon atoms;

ii) $+CH_2 \!\!\xrightarrow{}_{\!p}\!\! \underset{\underset{CH_3}{|}}{C}H - C_qH_{2q+1}$ wherein p denotes an integer of 0–5 and q denotes an integer of 2–11 (optically active or inactive);

iii) $+CH_2 \!\!\xrightarrow{}_{\!r}\!\! \underset{\underset{CH_3}{|}}{C}H + CH_2 \!\!\xrightarrow{}_{\!s}\!\! OC_tH_{2t+1}$ wherein r denotes an integer of 0–6, s denotes 0 or 1, and t denotes an integer of 1–14 (optically active or inactive);

iv) $+CH_2 \!\!\xrightarrow{}_{\!u}\!\! \underset{\underset{F}{|}}{C}H - C_vH_{2v+1}$ wherein u denotes an integer of 0 or 1 and v denotes an integer of 1–16 (optically active or inactive);

v) $-\underset{\underset{CH_3}{|}}{C}H\underset{\underset{O}{\|}}{C}OC_wH_{2w+1}$ wherein w denotes an integer of 1–15 (optically active or inactive);

vi) $+CH_2 \!\!\xrightarrow{}_{\!A}\!\! \underset{\underset{CN}{|}}{C}H - C_BH_{2B+1}$ wherein A denotes an integer of 0–2 and B denotes an integer of 1–15 (optically active or inactive); and vii) $+CH_2 \!\!\xrightarrow{}_{\!C}\!\! \underset{\underset{CH_3}{|}}{\overset{\overset{CN}{|}}{C}} - C_DH_{2D+1}$ wherein C denotes an integer of 0–2 and D denotes an integer of 1–15 (optically active or inactive).

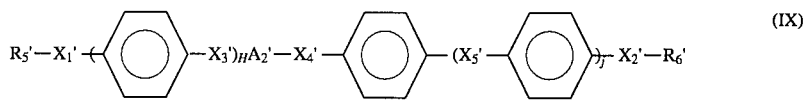

wherein H and J respectively denote 0 or 1 with proviso that H+J=0 or 1; $X_1'$ and $X_2'$ respectively denote a single bond, $$-\underset{\underset{O}{\|}}{C}O-, -O\underset{\underset{O}{\|}}{C}- \text{ or } -O-;$$

$A_2'$ denotes

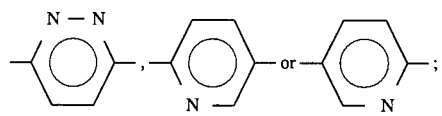

and $X_3'$ and $X_4'$ respectively denote a single bond, $$-\underset{\underset{O}{\|}}{C}O-, -O\underset{\underset{O}{\|}}{C}-, -CH_2O- \text{ or } -OCH_2-.$$

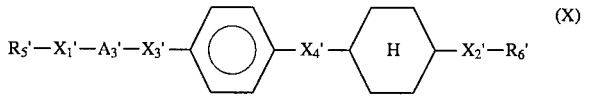

wherein $X_1'$ and $X_2'$ respectively denote a single bond, $$-\underset{\underset{O}{\|}}{C}O-, -O\underset{\underset{O}{\|}}{C}- \text{ or } -O-;$$

$A_3'$ denotes

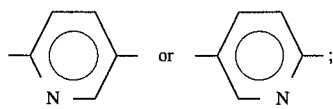

and $X_3'$ and $X_4$ respectively denote a single bond,

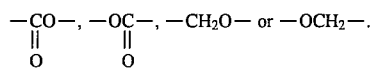

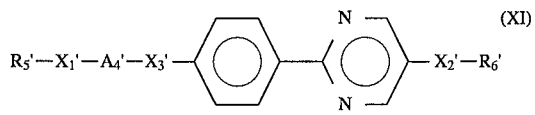 (XI)

wherein $X_1'$ and $X_2'$ respectively denote a single bond,

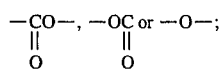

$A_4'$ denotes

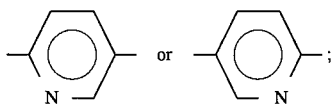

and $X_3'$ respectively denotes a single bond,

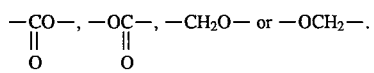

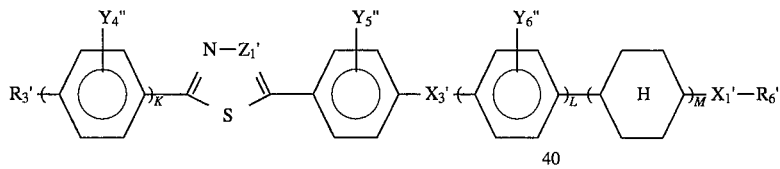 (XII)

wherein K, L and M respectively denote 0 or 1 with the proviso that K+L+M=0 or 1; $X_1'$ denotes a single bond,

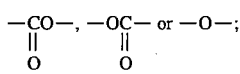

$X_3'$ denotes a single bond,

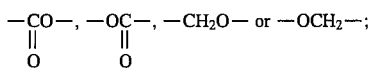

$Y_4''$, $Y_5''$ and $Y_6''$ respectively denote H or F; and $Z_1'$ is CH or N.

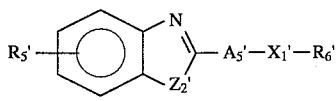 (XIII)

wherein $Z_2'$ denotes —O— or —S—; and $A_5'$ denotes

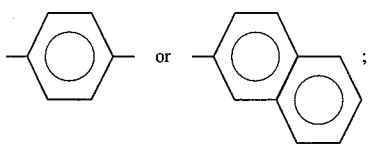

$X_1'$ denotes a single bond,

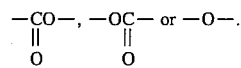

or —O—.

In the above formula (IX), preferred compounds thereof may include those represented by the following formulas (IXa) to (IXc):

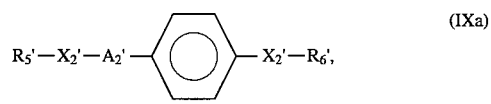 (IXa)

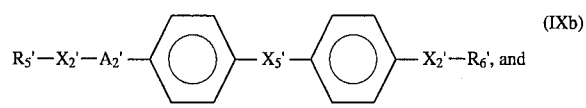 (IXb)

-continued

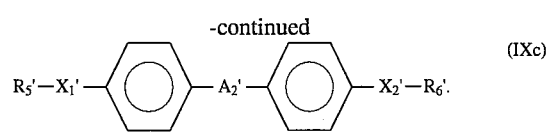 (IXc)

In the above formula (X), preferred compounds thereof may include those represented by the following formulas (Xa) and (Xb):

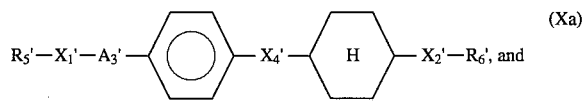 (Xa)

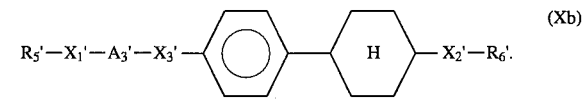 (Xb)

In the above formula (XII), preferred compounds thereof may include those represented by the following formulas (XIIa) and (XIIf):

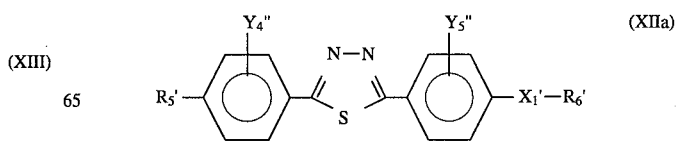 (XIIa)

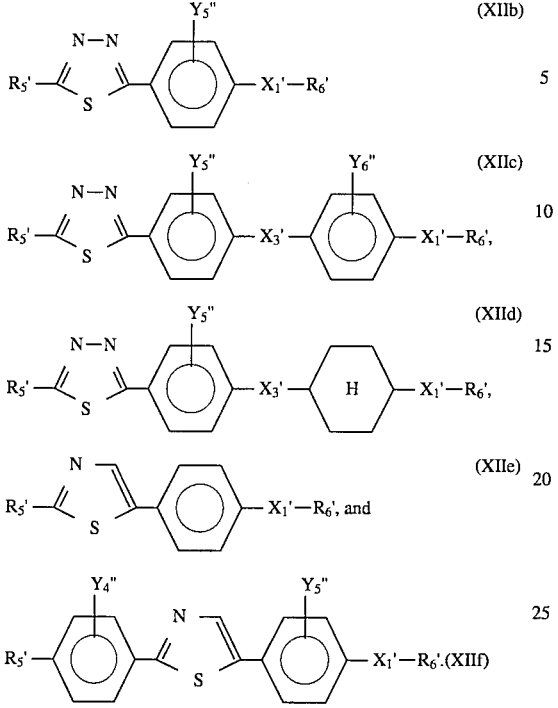

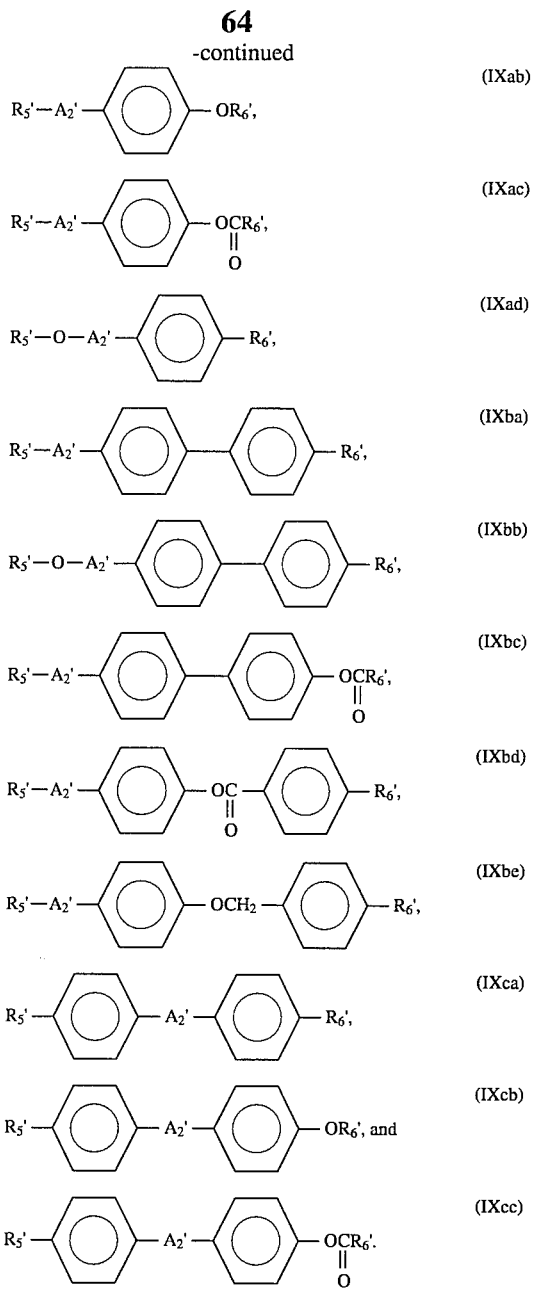

In the above formula (XIII), preferred compounds thereof may include those represented by the following formulas (XIIIa) to (XIIIe):

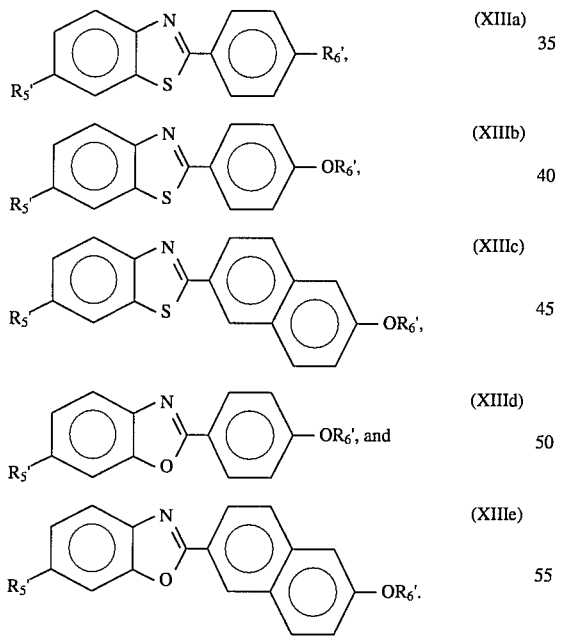

In the above-mentioned formulas (IXa) to (IXc), more preferred compounds thereof may include those represented by the formulas (IXaa) to (IXcc):

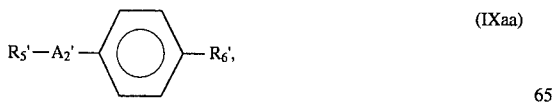

In the above-mentioned formulas (Xa) to (Xb), more preferred compounds thereof may include those represented by the formulas (Xaa) to (Xbb):

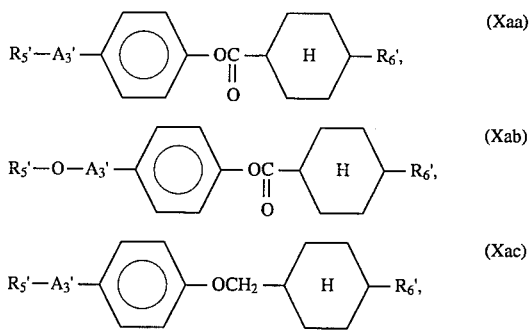

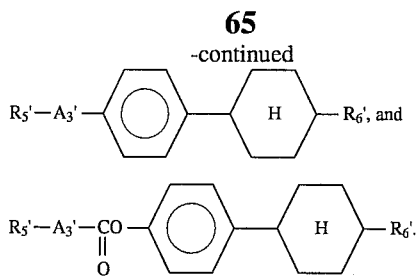

In the above formula (XI), preferred compounds thereof may include those represented by the following formulas (XIa) to (XIg):

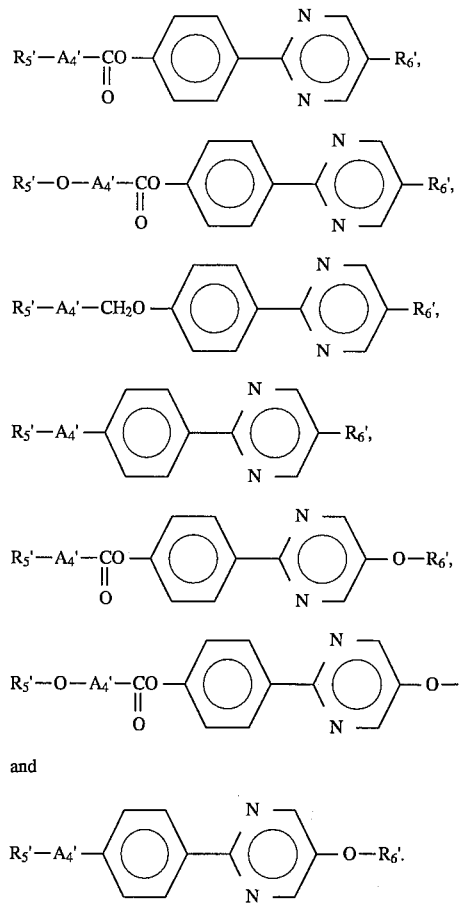

and

In the above-mentioned formulas (XIIa) to (XIIf), more preferred compounds thereof may include those represented by the formula (XIIaa) to (XIIdb):

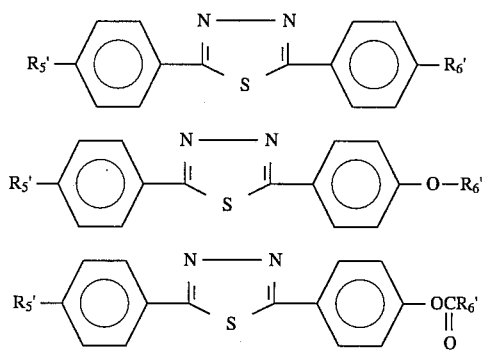

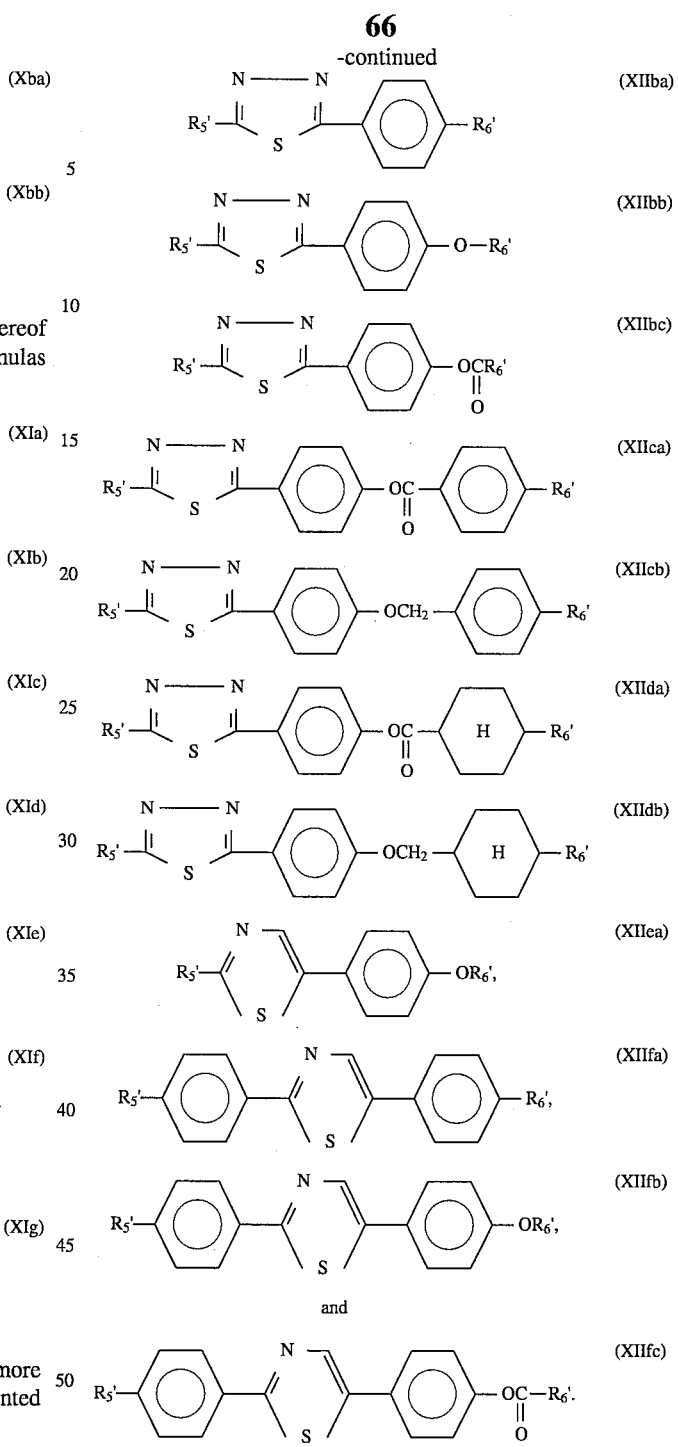

and

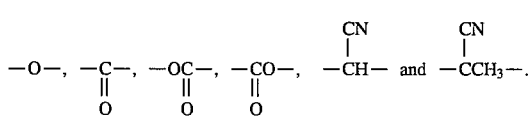

Herein, $R_5'$ and $R_6'$ respectively denote a linear or branched alkyl group having 1–18 carbon atoms capable of including one non-neighboring two or more methylene groups other than those directly connected to $X_1'$ or $X_2'$ which can be replaced with at least one species of $$-O-, \quad -\underset{\underset{O}{\|}}{C}-, \quad -O\underset{\underset{O}{\|}}{C}-, \quad -\underset{\underset{O}{\|}}{C}O-, \quad -\underset{\underset{CN}{|}}{CH}- \quad \text{and} \quad -\underset{\underset{CN}{|}}{CCH_3}-.$$

Further, preferred examples of $R_5'$ and $R_6'$ may respectively include those represented by the following groups (i) to (vi):

i) a linear alkyl group having 1–15 carbon atoms;

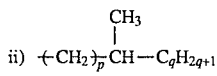

ii) $-(CH_2)_{\overline{p}}CH-C_qH_{2q+1}$ wherein p denotes an integer of 0–5 and q denotes an integer of 2–11 (optically active or inactive);

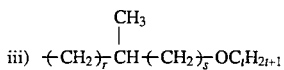

iii) $-(CH_2)_{\overline{r}}CH-(CH_2)_{\overline{s}}OC_tH_{2t+1}$ wherein r denotes an integer of 0–6, s denotes 0 or 1, and t denotes an integer of 1–14 (optically active or inactive);

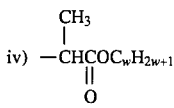

iv) $-CHCOC_wH_{2w+1}$
      $\parallel$
      $O$ wherein w denotes an integer of 1–15 (optically active or inactive);

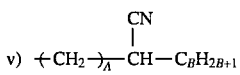

v) $-(CH_2)_{\overline{A}}CH-C_BH_{2B+1}$ wherein A denotes an integer of 0–2 and B denotes an integer of 1–15 (optically active or inactive); and

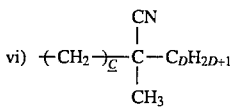

vi) $-(CH_2)_{\overline{C}}C-C_DH_{2D+1}$
         $|$
         $CH_3$ wherein C denotes an integer of 0–2 and D denotes an integer of 1–15 (optically active or inactive).

In formulating the liquid crystal composition according to the present invention, the liquid crystal composition may desirably contain 1–80 wt. %, preferably 1–60 wt. %, more preferably 1–40 wt. % of a mesomorphic compound represented by the formula (I).

Further, when two or more species of the mesomorphic compounds represented by the formula (I) are used, the liquid crystal composition may desirably contain 1–80 wt. %, preferably 1–60 wt. %, more preferably 1–40 wt. %, of the two or more species of the mesomorphic compounds represented by the formula (I).

The liquid crystal device according to the present invention may preferably be prepared by heating the liquid crystal composition prepared as described above into an isotropic liquid under vacuum, filling a blank cell comprising a pair of oppositely spaced electrode plates with the composition, gradually cooling the cell to form a liquid crystal layer and restoring the normal pressure.

FIG. 1 is a schematic sectional view of an embodiment of the liquid crystal device utilizing ferroelectricity prepared as described above for explanation of the structure thereof.

Referring to FIG. 1, the liquid crystal device includes a liquid crystal layer 1 assuming a chiral smectic phase disposed between a pair of glass substrates 2 each having thereon a transparent electrode 3 and an insulating alignment control layer 4. Lead wires 6 are connected to the electrodes so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The insulating alignment control layer 4 may have a thickness of ordinarily 10Å–1 micron, preferably 10–3000Å, further preferably 10–1000Å. The two glass substrates 2 with transparent electrodes 3 (which may be inclusively referred to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a liquid crystal assuming a chiral smectic phase is sealed up to provide a liquid crystal layer 1 in a thickness of generally 0.5 to 20 μm, preferably 1 to 5 μm.

The transparent electrodes 3 are connected to the external power supply 7 through the lead wires 6. Further, outside the glass substrates 2, polarizers 8 are applied. The device shown in FIG. 1 is of a transmission type and is provided with a light source 9.

Figure 2:
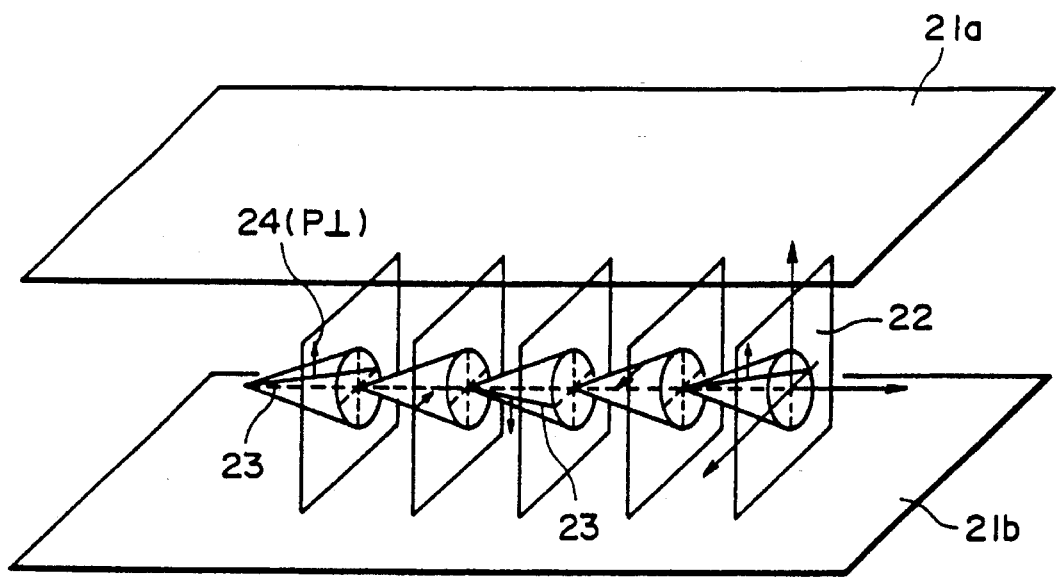
FIGS. 2 and 3 are schematic perspective views an embodiment of a device cell for illustrating the operation principle of a liquid crystal device utilizing ferroelectricity of a liquid crystal composition.

FIG. 2 is a schematic illustration of a liquid crystal cell (device) utilizing ferroelectricity for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment ($P_\perp$) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and $21b$, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
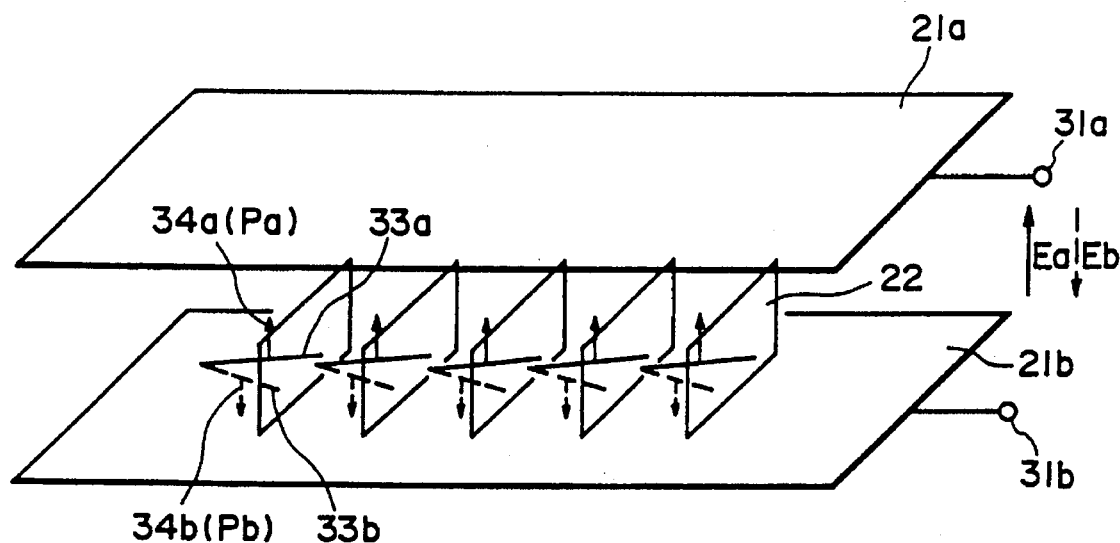

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction $34a$ or Pb in a lower direction $34b$ as shown in FIG. 3, thus providing a bistable condition. When an electric field Ea or Eb higher than a certain threshold level and different from each other in polarity as shown in FIG. 3 is applied to a cell having the above-mentioned characteristics by using voltage application means $31a$ and $31b$, the dipole moment is directed either in the upper direction $34a$ or in the lower direction $34b$ depending on the vector of the electric field Ea or Eb. In correspondence with this, the liquid crystal molecules are oriented in either of a first stable state $33a$ and a second stable state $33b$.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state $33a$. This state is stably retained even if the electric field is removed. On the other hand, when the electric field Eb of which direction is opposite to that of the electric field Ea is applied thereto, the liquid crystal molecules are oriented to the second stable state $33b$, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

Figure 4:
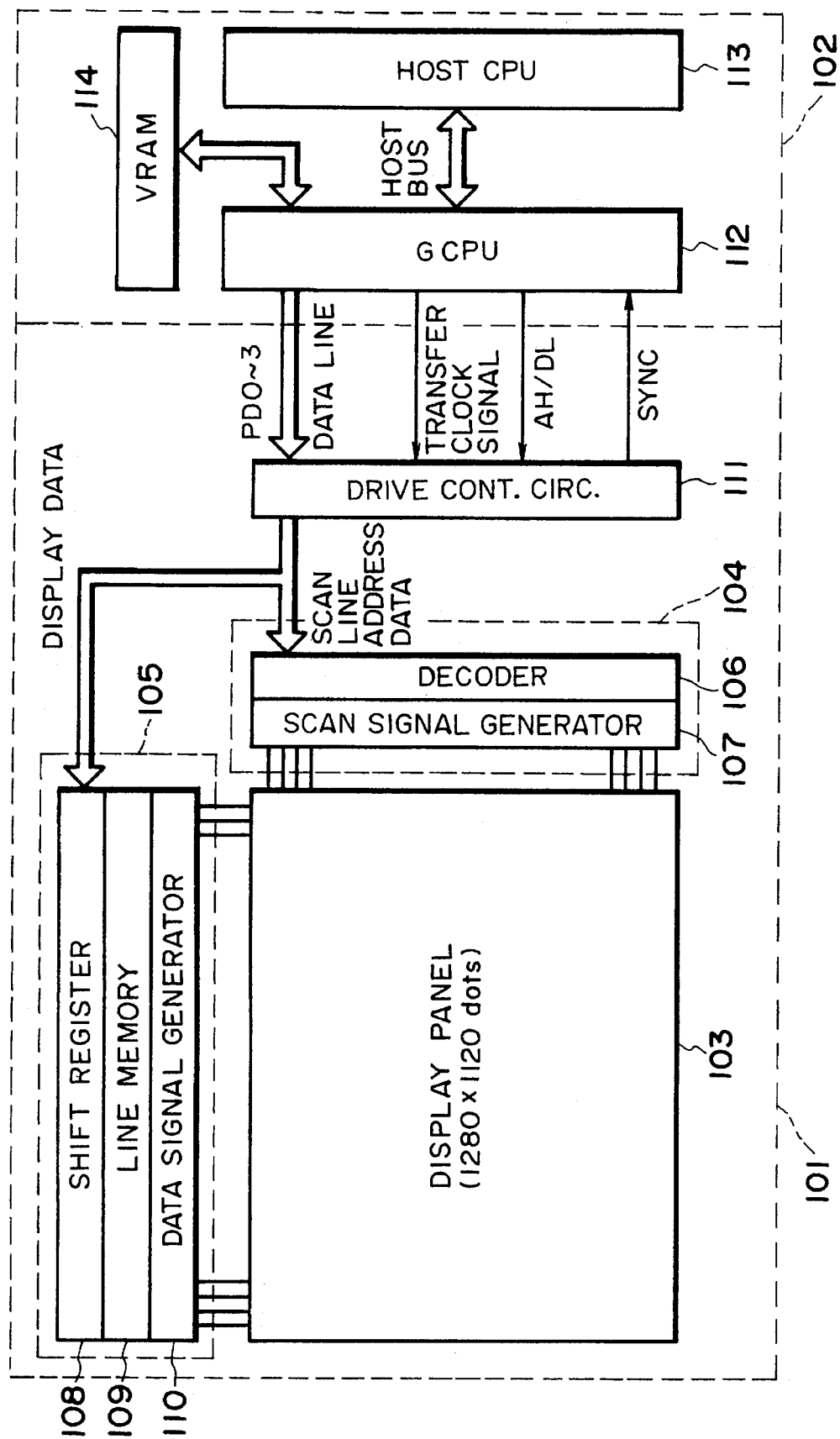
FIG. 4 is a block diagram showing a display apparatus comprising a liquid crystal device utilizing ferroelectricity of a liquid crystal composition and a graphic controller.
Figure 5:
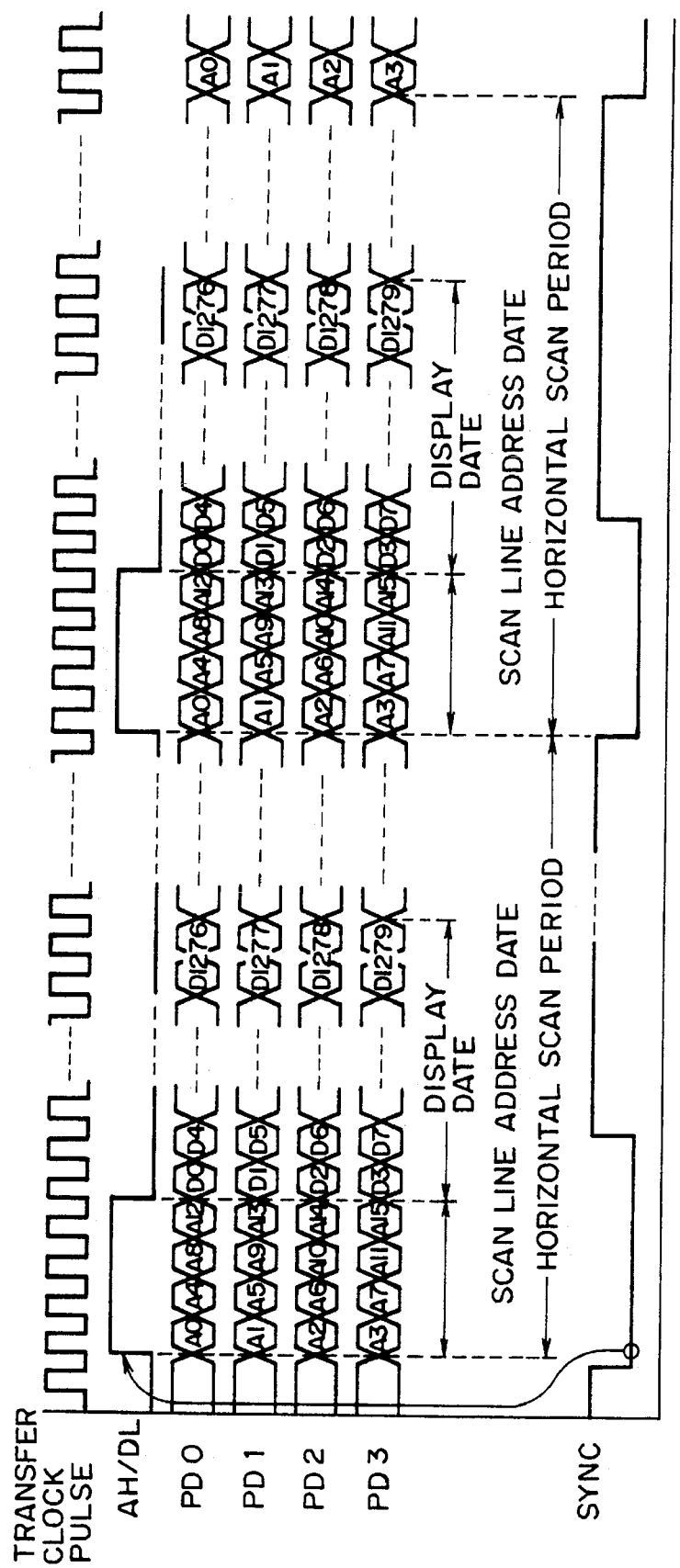
FIG. 5 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 4 and 5, there is provided a liquid crystal display apparatus of the present invention which uses the liquid crystal device according to the present invention as a display panel portion.

Referring to FIG. 4, the ferroelectric liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means shown in FIGS. 4 and 5. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally realized in the graphic controller 102. A light source is disposed at the back of the display panel 103.

Hereinbelow, the present invention will be explained more specifically with reference to examples. It is however to be understood that the present invention is not restricted to these examples.

EXAMPLE 1

Production of 5-dodecyl-2-[4-(4-phenylbutyl)phenyl]pyrimidine (I-2)

The above compound (I-2) was synthesized through the following reaction scheme.

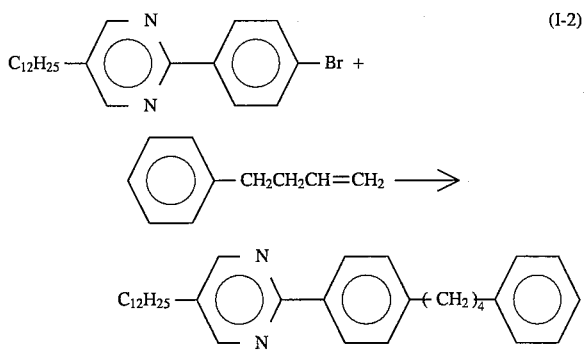

Under nitrogen atmosphere, 0.31 g of

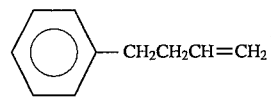

was dissolved in 1.2 ml of dry benzene and cooled on an ice bath at −3° to 1° C. To the solution, 4.7 ml of a solution of 0.5M 9-BBN (9-borabicyclo) 3,3,1(nonane) in THF (teterahydrofuran) was added dropwise, followed by stirring for 1 hour on the ice bath. After the stirring, the reaction temperature was restored to room temperature and then the mixture was further stirred for 2 hours.

Then, 5.8 ml of a solution of 0.92 g of

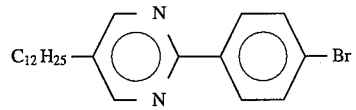

in THF, 3.5 ml of 3M potassium hydroxide aqueous solution, and 0.07 g of (PPh₃)₄Pd (phiphenyl) were added to the above mixture, followed by heat-refluxing for 4.5 hours. After the reaction, the reaction mixture was poured into water and subjected to extraction with ethyl acetate, followed by distilling-off of the organic solvent. The resultant extract was purified by silica gel column chromatography (eluent: toluene/hexane=1/1) and successively recrystallized from a mixture solvent of toluene/methanol and acetone to obtain 0.12 g of an objective product.

EXAMPLE 2

Production of 5-octyl-2-[4-(4-phenylbutyl)phenyl]pyrimidine (I-5)

The above compound (I-5) was synthesized through the following reaction scheme.

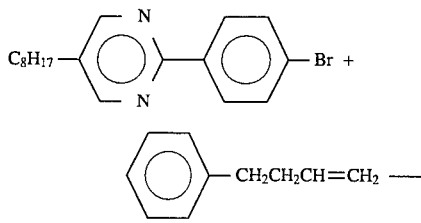  (I-5)

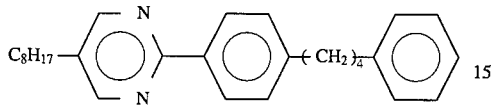

0.29 g of an objective product was prepared in the same manner as in Example 1 except that 0.80 g of

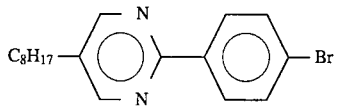

was used instead of 0.92 g of

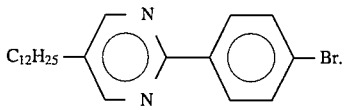

EXAMPLE 3

Production of 5-decyl-2-[4-(4-phenylbutyl)phenyl]pyrimidine (I-4)

The above compound (I-4) was synthesized through the following reaction scheme.

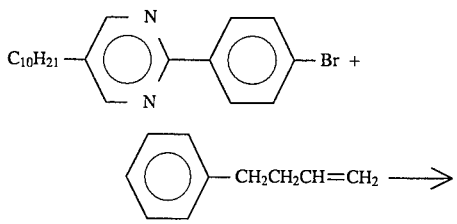  (I-4)

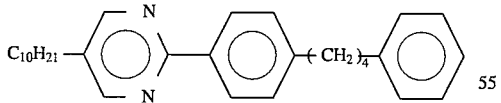

0.58 g of an objective product was prepared in the same manner as in Example 1 except that 0.88 g of

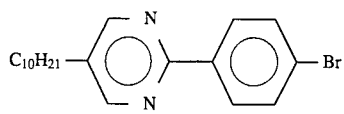

was used instead of 0.92 g of

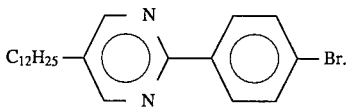

EXAMPLE 4

Production of 5-decyl-2-[4-(4-phenylpentyl)phenyl]pyrimidine (I-135)

The above compound (I-135) was synthesized through the following reaction scheme.

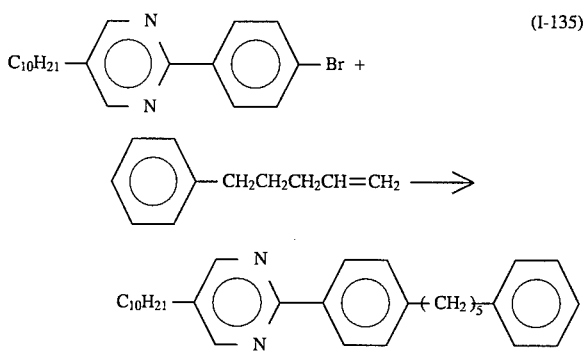  (I-135)

0.56 g of an objective product was prepared in the same manner as in Example 1 except that 0.58 g of

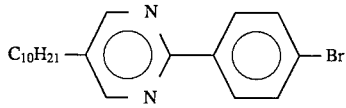

was used instead of 0.92 g of

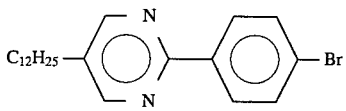

and that 0.34 g of

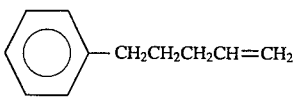

was used instead of 0.31 g of

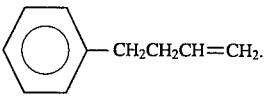

EXAMPLE 5

Production of 5-decyl-2-[4-(4-phenylpentyl)phenyl]pyrimidine (I-136)

The above compound (I-136) was synthesized through the following reaction scheme.

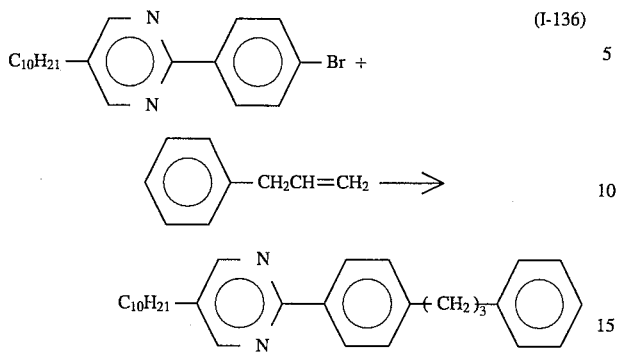

0.53 g of an objective product was prepared in the same manner as in Example 1 except that 0.58 g of

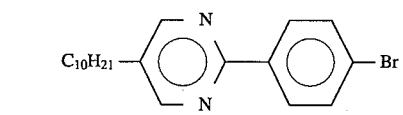

was used instead of 0.92 g of

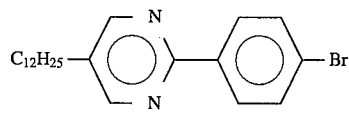

and that 0.28 g of

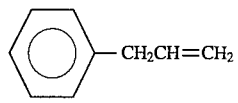

was used instead of 0.31 g of

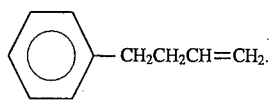

EXAMPLE 6

Production of 5-decyloxy-2-[4-(4-phenylbutyl)phenyl]pyrimidine (I-18)

The above compound (I-18) was synthesized through the following reaction scheme.

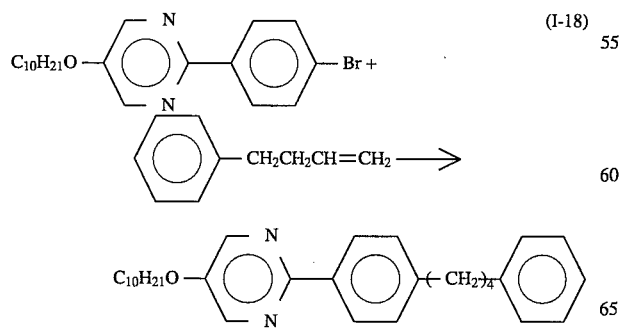

0.18 g of an objective product was prepared in the same manner as in Example 1 except that 0.94 g of

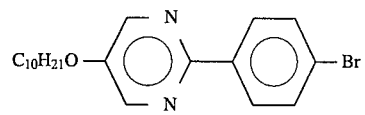

was used instead of 0.92 g of

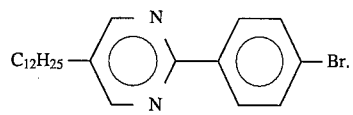

EXAMPLE 7

Production of 2-decyl-5-[4-(5-phenylpentyloxy)phenyl]pyrimidine (I-141)

The above compound (I-141) was synthesized through the following reaction scheme.

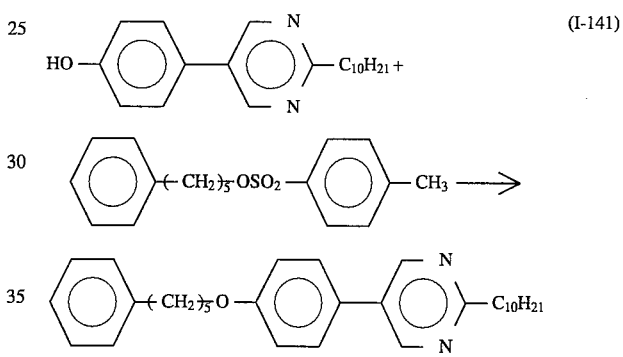

0.13 g of potassium hydroxide was dissolved in 5 ml of butanol. The solution, 0.50 g of

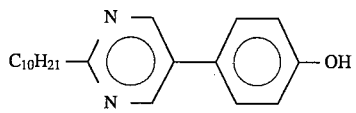

was added, followed by stirring for 30 minutes. To the resultant solution, a solution of 0.53 g of

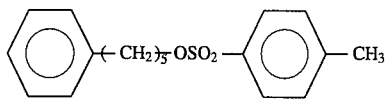

in 2 ml of butanol was added, followed by heat-refluxing for 8 hours at 110° C. After the reaction, the solvent (butanol) was distilled off and the resultant reaction mixture was subjected to extraction with toluene. The resultant organic layer was purified by silica gel column chromatography (eluent: toluene) and recrystallized from a mixture solvent of methanol/toluene to obtain 0.53 g of an objective product.

EXAMPLE 8

Production of 2-(4-decylphenyl-5-(5-phenylpentyloxy)pyrimidine (I-137)

The above compound (I-137) was synthesized through the following reaction scheme.

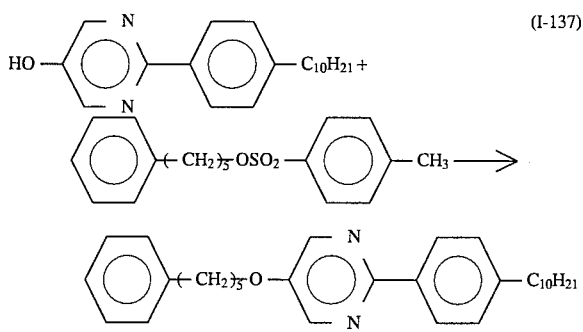

0.48 g of an objective product was prepared in the same manner as in Example 7 except that 0.50 g of

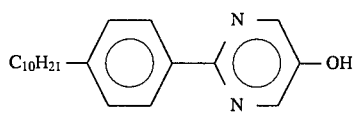

was used instead of 0.50 g of

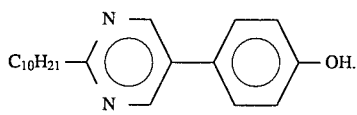

EXAMPLE 9

Production of 5-decyl-2-[4-(4-phenylbutyloxy)phenyl]pyrimidine (I-10)

The above compound (I-10) was synthesized through the following reaction scheme.

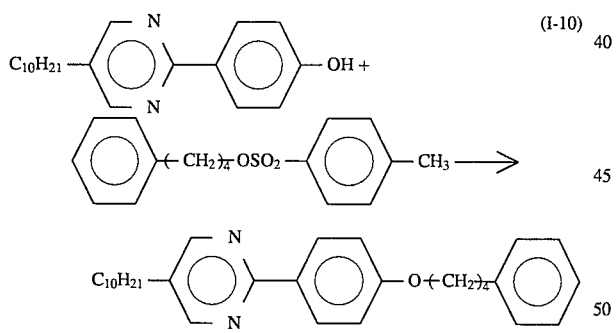

0.52 g of an objective product was prepared in the same manner as in Example 7 except that 0.50 g of

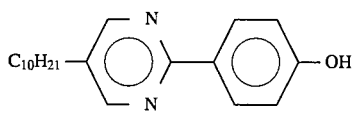

was used instead of 0.50 g of

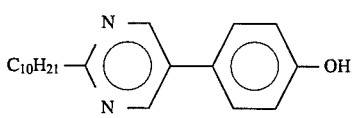

and that 0.76 g of

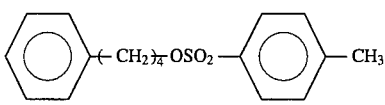

was used instead of 0.53 g of

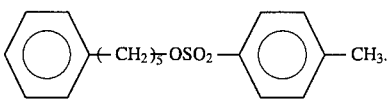

EXAMPLE 10

Production of 5-decyl-2-[4-(4-phenylpentyloxy)phenyl]pyrimidine (I-11)

The above compound (I-11) was synthesized through the following reaction scheme.

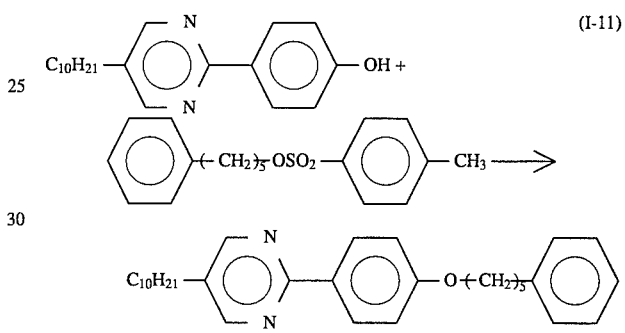

0.71 g of an objective product was prepared in the same manner as in Example 7 except that 0.50 g of

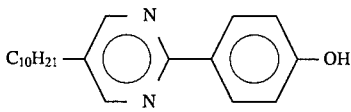

was used instead of 0.50 g of

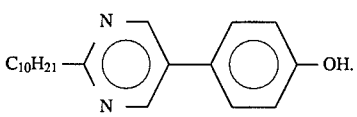

EXAMPLE 11

Production of 2-[4-(4'-heptylbiphenyl)]-5-(4-phenylbutyl)pyrimidine (I-139)

The above compound (I-139) was synthesized through the following steps (i) to (iii).

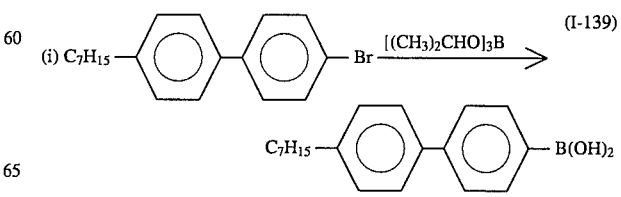

-continued

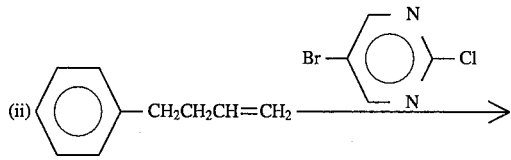

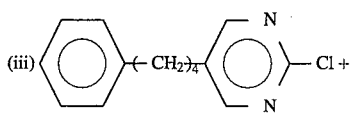

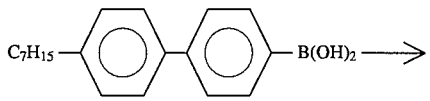

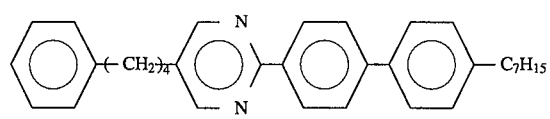

Step (i) Production of

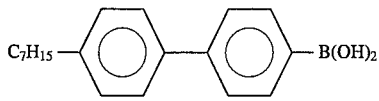

2.00 g of

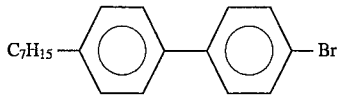

was dissolved in 25 ml of dry THF and cooled to −70° C. on a dry iceacetone bath. Under dry nitrogen atmosphere, 4.5 ml of 1.6M n-butyllithium in hexane was added to the above solution, followed by stirring for 1 hour. After the stirring, a solution of 3 ml of [(CH$_3$)$_2$CHO]$_3$B in 5.6 ml of dry THF was added dropwise to the above mixture, followed by stirring for 2.5 hours at room temperature. After the reaction, the reaction mixture was acidified by 10% -HCl and subjected to extraction with ethyl acetate. The resultant organic layer was dried with anhydrous sodium sulfate, condensed, and cooled on an ice bath to precipitate a crystal. The crystal was recovered by filtration to obtain 1.27 g of an objective product (Yield: 71.5%).

Step (ii) Production of

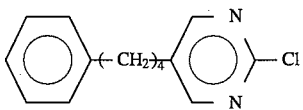

Under nitrogen atmosphere, a solution of 2.0 g of

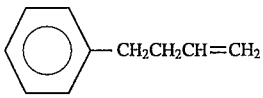

in benzene was cooled on an ice bath at −3° to −1° C. To the solution, 30.3 ml of a solution of 0.5M 9-BBN in THF was added dropwise, followed by stirring for 4.5 hours at room temperature.

Then, a solution of 2.84 g of

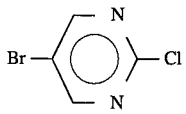

in 25.8 ml of THF, 22.6 ml of 3M potassium hydroxide aqueous solution, and 0.45 g of (PPh$_3$)$_4$Pd were added to the above mixture, followed by heat-refluxing for 1 hour. After the reaction, the reaction mixture was poured into water and subjected to extraction with ethyl acetate, followed by distilling-off of the organic solvent. The resultant extract was purified by silica gel column chromatography (eluent: toluene) to obtain 1.42 g of an oily objective product.

Step (iii) Production of

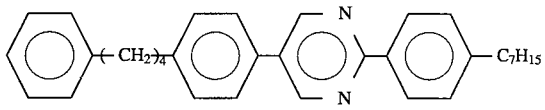

0.37 g of

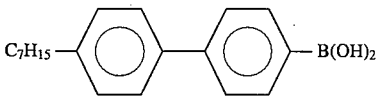

prepared in Step (i), 0.28 g of

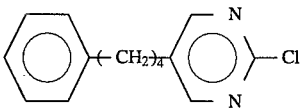

prepared in Step (ii), 0.06 g of (PPh$_3$)$_4$Pd, 1.9 ml of toluene, 1.9 ml of 2M sodium carbonate aqueous solution, and 1 ml of ethanol were mixed under nitrogen atmosphere, followed by refluxing for 2.5 hours under stirring.

After the reaction, the reaction mixture was poured into water and subjected to extraction with a mixture solvent of toluene/ethyl acetate, followed by distilling-off of the organic solvent. The resultant extract was purified by silica gel column chromatography (eluent: toluene) and successively recrystallized from a mixture solvent of toluene/methanol and acetone to obtain 0.20 g of an objective product.

EXAMPLE 12

Production of 4-[2-(5-decyl)pyrimidinyl]phenyl 11-phenylundecanoate (I-145)

The above compound (I-145) was synthesized through the following reaction scheme.

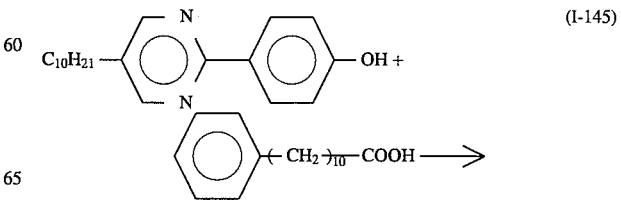

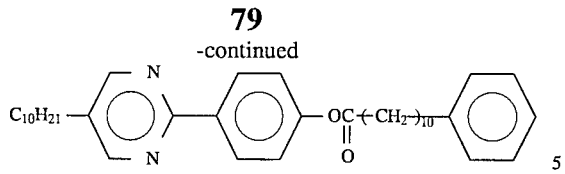

To 50 ml of a solution of 0.50 g of

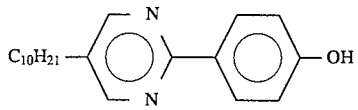

and 0.32 g of

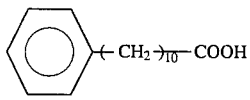

in methylene chloride, 0.35 g of DCC (dicyclohexylcarbodiimide) and 0.03 g of 4-pyrrolidinopyridine were added, followed by stirring overnight at room temperature. After the reaction, the insoluble matter was removed from the reaction mixture by filtration. After distilling-off of the solvent, the resultant reaction mixture was purified by silica gel column chromatography (eluent: toluene) and recrystallized from a mixture solvent of toluene-methanol to obtain 0.1 g of an objective product.

EXAMPLE 13

Production of 2-(4-octylphenyl)-5-(4-phenylbutyl)pyrimidine (I-184)

The above compound (I-184) was synthesized through the following steps (i) and (ii).

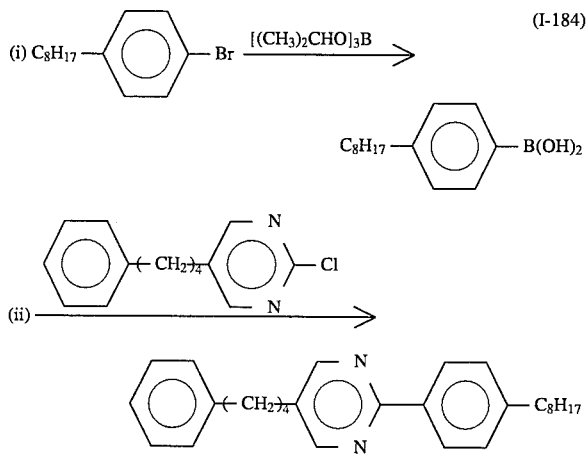

Step (i) Production of

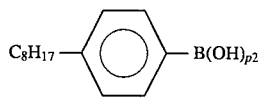

An objective product was prepared in the same manner as in Step (i) of Example 11 except that

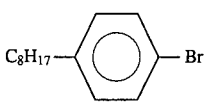

was used instead of

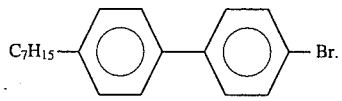

Step (ii) Production of

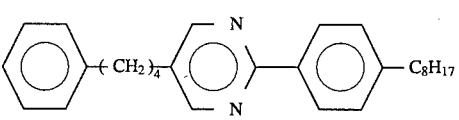

An objective product was prepared in the same manner as in Step (ii) of Example 11 except that

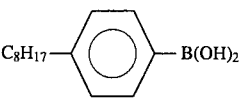

was used instead of

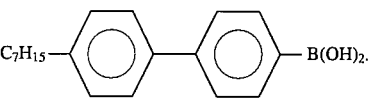

EXAMPLE 14

Production of 2-[4-(4-pentylbiphenyl)]-5-(4-phenylbutyl)pyrimidine (I-186)

The above compound (I-186) was synthesized through the following steps (i) and (ii).

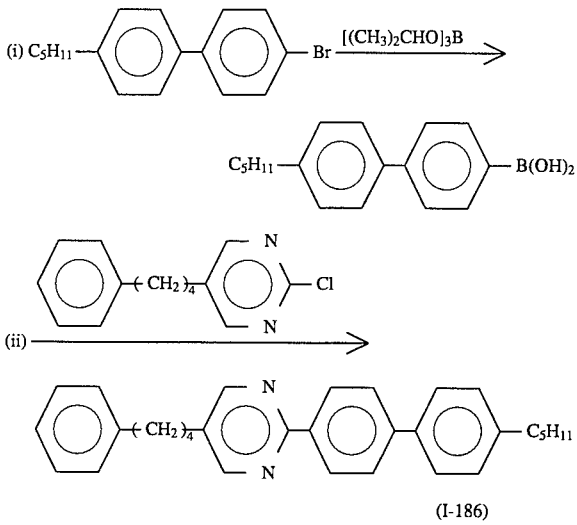

Step (i) Production of

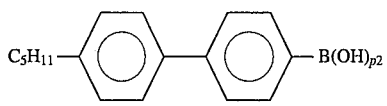

An objective product was prepared in the same manner as in Step (i) of Example 11 except that

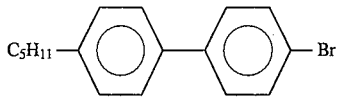

was used instead of

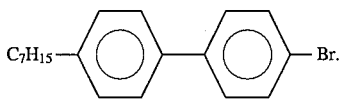

Step (ii) Production of

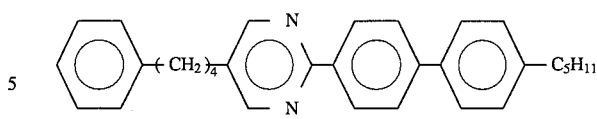

An objective product was prepared in the same manner as in Step (ii) of Example 11 except that

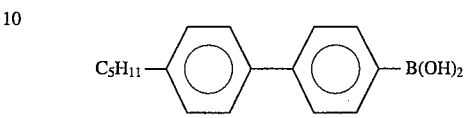

was used instead of

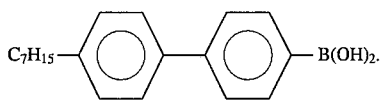

The thus prepared mesomorphic compounds of the formula (I) showed the following phase transition temperatures (° C.).

| Ex. (Ex. Comp. No.) | Structural formula (Phase transition temperature °C.)) |
|---|---|
| 1 (I-2) | $C_{12}H_{25}$—[pyrazine]—[phenyl]—$(CH_2)_4$—[phenyl] <br> (Cryst. $\underset{43}{\overset{55}{\rightleftarrows}}$ $S_A$ $\underset{62}{\overset{63}{\rightleftarrows}}$ Iso) |
| 2 (I-5) | $C_8H_{17}$—[pyrazine]—[phenyl]—$(CH_2)_4$—[phenyl] <br> (Cryst. $\overset{39}{\rightarrow}$ Iso, $\underset{24}{\leftarrow} S_A \overset{36}{\leftarrow}$) |
| 3 (I-4) | $C_{10}H_{21}$—[pyrazine]—[phenyl]—$(CH_2)_4$—[phenyl] <br> (Cryst. $\overset{49}{\rightarrow}$ Iso, $\underset{41}{\leftarrow} S_A \overset{45}{\leftarrow}$) |
| 4 (I-135) | $C_{10}H_{21}$—[pyrazine]—[phenyl]—$(CH_2)_5$—[phenyl] <br> (Cryst. $\overset{24}{\rightarrow}$ Iso, $\underset{-19}{\leftarrow} S_{③} \underset{-10}{\leftarrow} S_{②} \underset{-4}{\leftarrow} S_{①} \overset{14}{\leftarrow}$) |
| 5 (I-136) | $C_{10}H_{21}$—[pyrazine]—[phenyl]—$(CH_2)_3$—[phenyl] <br> (Cryst. $\overset{23}{\rightarrow}$ Iso, $\underset{-27}{\leftarrow} S_{①} \overset{-10}{\leftarrow}$) |

-continued
| Ex. (Ex. Comp. No.) | Structural formula (Phase transition temperature °C.) |
|---|---|
| 6 (I-18) | 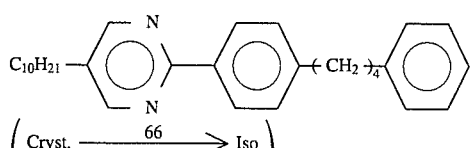 (Cryst. ⇌ 66 ⇌ Iso; 34 S3 59) |
| 7 (I-141) | 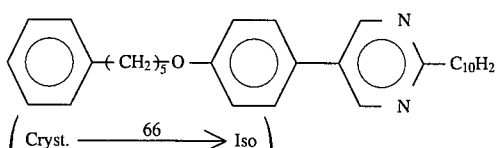 (Cryst. ⇌ 66 ⇌ Iso; 34 S① 59) |
| 8 (I-137) | 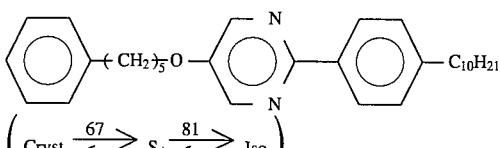 (Cryst. 67/47 ⇌ S_A 81/79 ⇌ Iso) |
| 9 (I-10) | 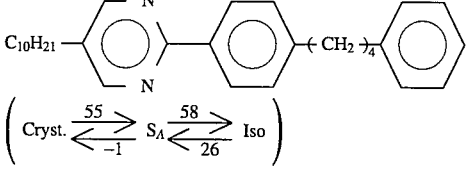 (Cryst. 55/−1 ⇌ S_A 58/26 ⇌ Iso) |
| 10 (I-11) | 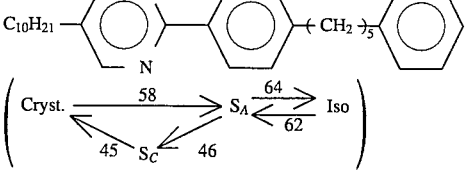 (Cryst. ⇌ 58 ⇌ S_A 64/62 ⇌ Iso; 45 S_C 46) |
| 11 (I-139) | 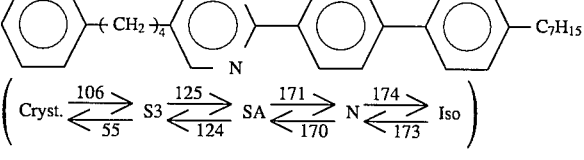 (Cryst. 106/55 ⇌ S3 125/124 ⇌ SA 171/170 ⇌ N 174/173 ⇌ Iso) |
| 12 (I-145) | 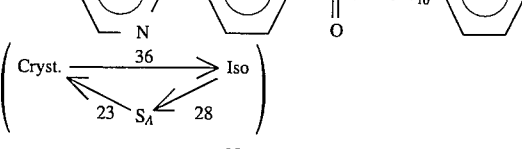 (Cryst. ⇌ 36 ⇌ Iso; 23 S_A 28) |
| 13 (I-184) | 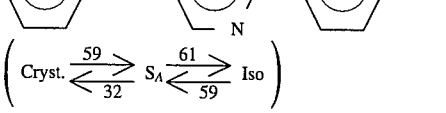 (Cryst. 59/32 ⇌ S_A 61/59 ⇌ Iso) |

| Ex. (Ex. Comp. No.) | Structural formula (Phase transition temperature °C.)) |
|---|---|
| 14 (I-191) | 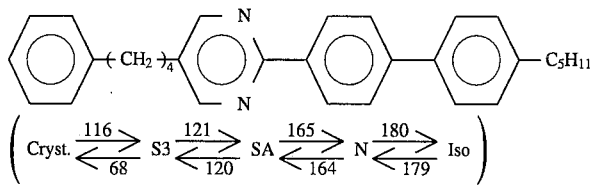 (Cryst. ⇌(116/68) S3 ⇌(121/120) SA ⇌(165/164) N ⇌(180/179) Iso) |

Herein, the respective symbols in phase transition series denote the following phases:

Iso: isotropic phase,
N: nematic phase,
$S_A$ or SmA: smectic A phase,
Sc or SmC: smectic C phase,
$S_3$, Sm3, Sm4: smectic phase other than $S_A$ and Sc (un-identified),
$S_①$ to $S_③$: smectic phase (un-identified), and
Cryst: crystal.

EXAMPLE 15

A liquid crystal composition A was prepared by mixing the following compounds including the compound (Ex. Comp. No. I-4) prepared in Example 3 in the respectively indicated proportions.

| Structural formula | wt. parts |
|---|---|
| C₆H₁₃—(pyrimidine)—(phenyl)—OC₁₂H₂₅ | 4.0 |
| C₈H₁₇—(pyrimidine)—(phenyl)—OC₉H₁₉ | 8.0 |
| C₈H₁₇—(pyrimidine)—(phenyl)—OC₁₀H₂₁ | 8.0 |
| C₉H₁₉—(pyrimidine)—(phenyl)—OC₈H₁₇ | 4.0 |
| C₁₀H₂₁O—(phenyl)—CO—O—(phenyl)—OCH₂CH(CH₃)C₂H₅ | 16.0 |
| C₆H₁₃—(benzothiazole)—(phenyl)—OC₈H₁₇ | 20.0 |
| C₅H₁₁—(phenyl)—N=N—(thiadiazole)—(phenyl)—C₅H₁₁ | 5.0 |
| C₆H₁₃—(phenyl)—N=N—(thiadiazole)—(phenyl)—C₄H₉ | 5.0 |
| C₁₁H₂₃—(pyrimidine)—(phenyl)—OC(O)—(thiophene)—C₄H₉ | 6.7 |
| C₁₁H₂₃—(pyrimidine)—(phenyl,F)—OC(O)—(thiophene)—C₄H₉ | 3.3 |
| C₁₀H₂₁—(pyrimidine)—(phenyl)—OCH₂C*HFC₆H₁₃ | 10.0 |
| Ex. Comp. No. (I-14) C₁₀H₂₁—(pyrimidine)—(phenyl)—(CH₂)₄—(phenyl) | 10.0 |

The liquid crystal composition A showed the following phase transition series.

Phase transition temperature (°C.)

Cry. ⇌(−20) SmC* ⇌(40) SmA ⇌(74) Ch. ⇌(79) Iso.

SmC*: chiral smectic phase
Ch.: cholesteric phase

SmC*: chiral smectic phase
Ch.: cholesteric phase

EXAMPLE 16

Two 0.7 mm-thick glass plates were provided and respectively coated with an ITO film to form an electrode for voltage application, which was further coated with an insulating layer of vapor-deposited $SiO_2$. On the insulating layer, a 0.2%-solution of silane coupling agent (KBM-602, available from Shinetsu Kagaku K. K.) in isopropyl alcohol was applied by spinner coating at a speed of 2000 rpm for 15 second and subjected to hot curing treatment at 120° C. for 20 min.

Further, each glass plate provided with an ITO film and treated in the above described manner was coated with a 1.5%-solution of polyimide resin precursor (SP-510, available from Toray K. K.) in dimethylacetoamide by a spinner coater rotating at 2000 rpm for 15 seconds. Thereafter, the coating film was subjected to heat curing at 300° C. for 60 min. to obtain about 250 Å-thick film. The coating film was rubbed with acetate fiber-planted cloth. The thus treated two glass plates were washed with isopropyl alcohol. After silica beads with an average particle size of 2.0 microns were dispersed on one of the glass plates, the two glass plates were applied to each other with a bonding sealing agent (Lixon Bond, available from Chisso K. K.) so that their rubbed directions were parallel to each other and heated at 100° C. for 60 min. to form a blank cell.

Then, the liquid crystal composition A prepared in Example 15 was heated into an isotropic liquid, and injected into the above prepared cell under vacuum and, after sealing, was gradually cooled to 25° C. at a rate of 20° C./hour to prepare a ferroelectric liquid crystal device. The cell gap was found to be about 2 microns as measured by a Berek compensator.

The ferroelectric liquid crystal device was subjected to measurement of and an optical response time (time from voltage application until the transmittance change reaches 90% of the maximum under the application of a peak-to-peak voltage Vpp of 20 V in combination with right-angle cross-nicol polarizers).

The results are shown below.

|  | 10° C. | 20° C. | 30° C. |
|---|---|---|---|
| Response time (μsec) | 102 | 22 | 10 |

EXAMPLE 17

A liquid crystal composition B was prepared by mixing the following compounds including a compound (Ex. Comp. No. I-11) prepared in Example 10 in the respectively indicated proportions.

| Structural formula | wt. parts |
|---|---|
| $C_6H_{13}$—[N,N-phenyl]—[phenyl]—$OC_{12}H_{25}$ | 2.3 |
| $C_8H_{17}$—[N,N-phenyl]—[phenyl]—$OC_9H_{19}$ | 4.7 |
| $C_8H_{17}$—[N,N-phenyl]—[phenyl]—$OC_{10}H_{21}$ | 4.7 |
| $C_9H_{19}$—[N,N-phenyl]—[phenyl]—$OC_8H_{17}$ | 2.3 |
| $C_{10}H_{21}O$—[phenyl]—CO—[phenyl]—$OCH_2CH(CH_3)C_2H_5$ | 26.0 |
| $C_6H_{13}$—[benzothiazole]—[phenyl]—$OC_8H_{17}$ | 20.0 |
| $C_5H_{11}$—[phenyl]—[thiadiazole]—[phenyl]—$C_5H_{11}$ | 5.0 |
| $C_6H_{13}$—[phenyl]—[thiadiazole]—[phenyl]—$C_4H_9$ | 5.0 |
| $C_{11}H_{23}$—[pyrimidine]—[phenyl]—OC(O)—[thiophene]—$C_4H_9$ | 6.7 |
| $C_{11}H_{23}$—[pyrimidine]—[F-phenyl]—OC(O)—[thiophene]—$C_4H_9$ | 3.3 |
| $C_{10}H_{21}$—[pyrimidine]—[phenyl]—$OCH_2CH(F)C_6H_{13}$* | 10.0 |

Ex. Comp. No. (I-11)

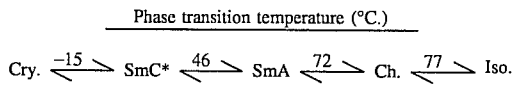

| $C_{10}H_{21}$—[pyrimidine]—[phenyl]—$O(CH_2)_5$—[phenyl] | 10.0 |

The liquid crystal composition B showed the following phase transition series.

Phase transition temperature (°C.)

Cry. $\xrightleftharpoons{-15}$ SmC* $\xrightleftharpoons{46}$ SmA $\xrightleftharpoons{72}$ Ch. $\xrightleftharpoons{77}$ Iso.

EXAMPLE 18

A ferroelectric liquid crystal device was prepared in the same manner as in Example 16 except for using the composition B prepared in Example 17. The ferroelectric liquid crystal device was subjected to measurement of response time in the same manner as in Example 16, whereby the following results were obtained.

|  | 20° C. | 30° C. | 40° C. |
|---|---|---|---|
| Response time (μsec) | 103 | 59 | 33 |

EXAMPLE 19
A liquid crystal composition C was prepared by mixing the following compounds including a compound (I-139) prepared in Example 11 in the respectively indicated proportions.
| Structural formula | wt. parts |
|---|---|
| 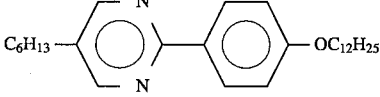 | 4.0 |
| 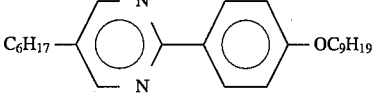 | 8.0 |
| 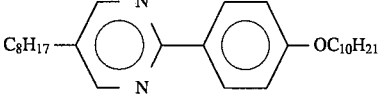 | 8.0 |
| 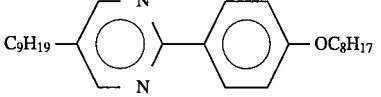 | 4.0 |
| 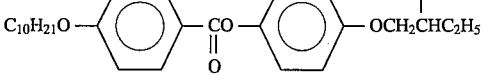 | 26.0 |
| 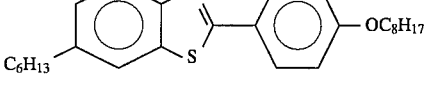 | 10.0 |
| 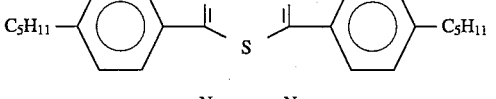 | 5.0 |
| 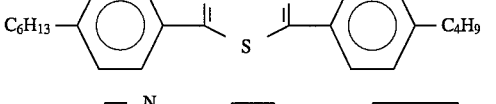 | 5.0 |
| 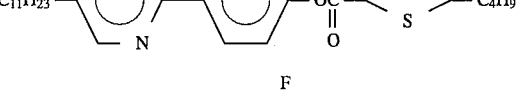 | 6.7 |
| 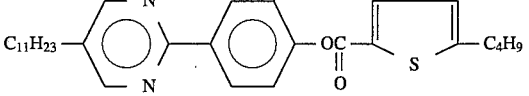 | 3.3 |
| 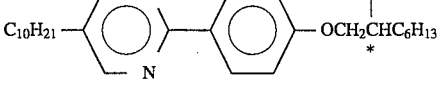 | 10.0 |
| (I-139) | 10.0 |

| Structural formula | wt. parts |
|---|---|
| [phenyl-(CH₂)₄-pyrimidine-phenyl-phenyl-C₇H₁₅] | |

The liquid crystal composition C showed the following phase transition series.

Phase transition temperature (°C.)

Cry. $\xrightarrow{-18}$ SmC* $\xrightarrow{42}$ SmA $\xrightarrow{78}$ Ch. $\xrightarrow{85}$ Iso.

EXAMPLE 20

A ferroelectric liquid crystal device was prepared in the same manner as in Example 16 except for using the composition C prepared in Example 19. The ferroelectric liquid crystal device was subjected to measurement of response time in the same manner as in Example 16, whereby the following results were obtained.

|  | 10° C. | 20° C. | 30° C. |
|---|---|---|---|
| Response time (μsec) | 167 | 81 | 46 |

EXAMPLE 21

A liquid crystal composition D was prepared by mixing the following compounds in the respectively indicated proportions.

| Structural formula | wt. parts |
|---|---|
| $C_7H_{15}$—[pyrimidine]—[phenyl]—$OC_9H_{19}$ | 12 |
| $C_{11}H_{23}$—[pyrimidine]—[phenyl]—$OC_6H_{13}$ | 10 |
| $C_8H_{17}$—[pyrimidine]—[phenyl]—$O\text{-}(CH_2)_5\text{-}^*CHC_2H_5$ with $CH_3$ | 10 |
| $C_{10}H_{21}$—[pyrimidine]—[phenyl]—$O\text{-}(CH_2)_4\text{-}CHOCH_3$ with $CH_3$ | 3 |
| $C_8H_{17}$—[pyrimidine]—[phenyl]—[phenyl]—$C_6H_{13}$ | 8 |
| $C_6H_{13}O$—[phenyl]—OC(=O)—[naphthyl]—$OC_9H_{19}$ | 4 |
| $C_3H_7$—[cyclohexyl H]—C(=O)O—[phenyl]—[pyrimidine]—$C_{11}H_{23}$ | 6 |

-continued

| Structural formula | wt. parts |
|---|---|
| 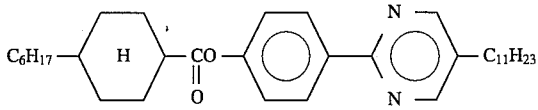 | 2 |
| 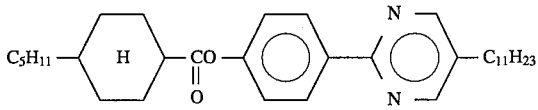 | 8 |
| 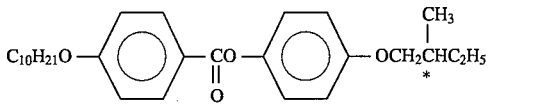 | 15 |
| 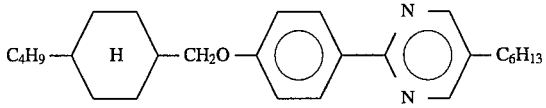 | 7 |
| 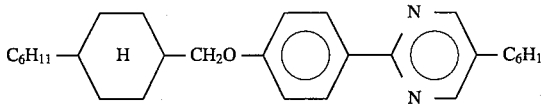 | 7 |
| 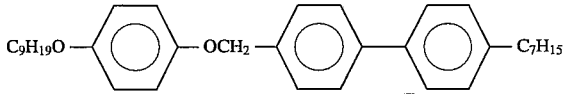 | 4 |
| 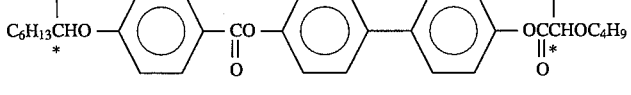 | 2 |
|  | 2 |

The liquid crystal composition D was further mixed with the following compounds in the proportions indicated below to provide a liquid crystal composition E.

A ferroelectric liquid crystal device was prepared and subjected to measurement of response time in the same manner as in Example 16 except for injecting the compo-

| Ex. Comp. No. | Structural Formula | wt. parts |
|---|---|---|
| I-46 | 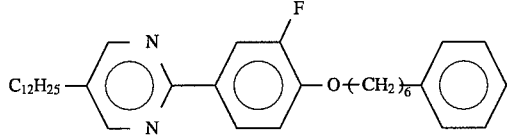 | 4 |
| I-76 | 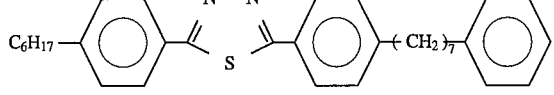 | 2 |
| I-101 | 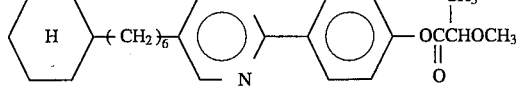 | 2 |
| Composition D | | 92 | sition E alone into the cell and further subjected to observation of switching states, whereby the following results were obtained.

In the device, a monodomain with a good and uniform alignment characteristic was observed.

|                      | 10° C. | 25° C. | 40° C. |
|----------------------|--------|--------|--------|
| Response time (μsec) | 706    | 344    | 188    |

Further, when the device was driven, a clear switching action was observed, and good bistability was shown after the termination of the voltage application.

COMPARATIVE EXAMPLE 1

A ferroelectric liquid crystal device was prepared and subjected to measurement of response time in the same manner as in Example 16 except for injecting the composition D prepared in Example 21 into the cell, whereby the following results were obtained.

|                      | 10° C. | 25° C. | 40° C. |
|----------------------|--------|--------|--------|
| Response time (μsec) | 784    | 373    | 197    |

EXAMPLE 22

A liquid crystal composition F was prepared by mixing the following Example Compounds instead of those of (I-46), (I-76) and (I-101) used in Example 21 in the indicated proportions with the liquid crystal composition D.

| Ex. Comp. No. | Structural Formula | wt. parts |
|---|---|---|
| I-89 | 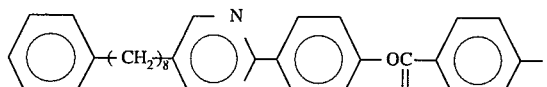 | 2 |
| I-104 | 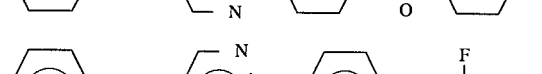 | 3 |
| I-117 | 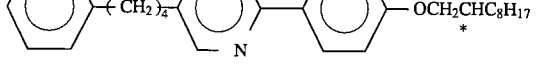 | 3 |
| Composition D | | 92 |

A ferroelectric liquid crystal device was prepared and subjected to measurement of response time in the same manner as in Example 16 except for injecting the composition F alone into the cell and further subjected to observation of switching states, whereby the following results were obtained.

In the device, a monodomain with a good and uniform alignment characteristic was observed.

|                      | 10° C. | 25° C. | 40° C. |
|----------------------|--------|--------|--------|
| Response time (μsec) | 643    | 337    | 186    |

EXAMPLE 23

A liquid crystal composition G was prepared by mixing the following compounds in the indicated proportions.

| Structural formula | wt. parts |
|---|---|
|  | 10 |

-continued
| Structural formula | wt. parts |
|---|---|
| 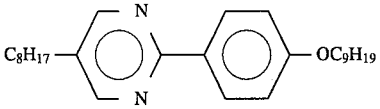 | 5 |
| 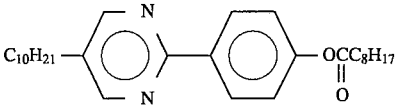 | 7 |
|  | 7 |
| 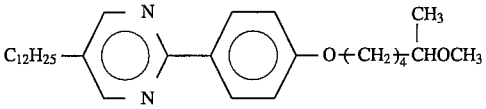 | 6 |
|  | 5 |
| 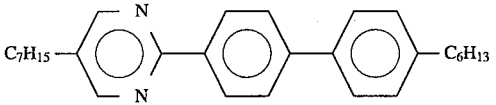 | 5 |
| 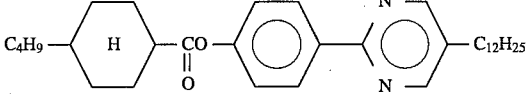 | 8 |
| 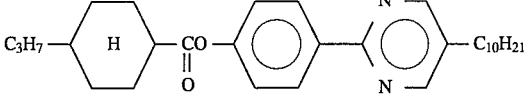 | 8 |
| 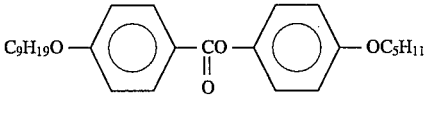 | 20 |
| 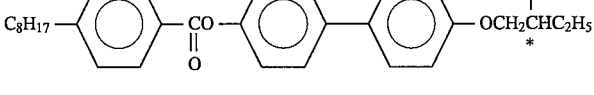 | 5 |
| 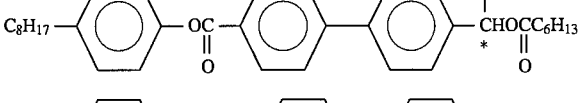 | 5 |
| 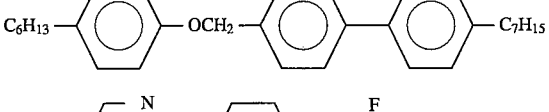 | 6 |
|  | 3 |
The liquid crystal composition G was further mixed with the following compounds in the proportions indicated below to provide a liquid crystal composition H.

| Ex. Comp. No. | Structural Formula | wt. parts |
|---|---|---|
| I-50 |  | 3 |
| I-64 | | 2 |
| I-94 | | 3 |
| | Composition G | 92 |

A ferroelectric liquid crystal device was prepared and subjected to measurement of response time in the same manner as in Example 16 except for injecting the composition H alone into the cell and further subjected to observation of switching states, whereby the following results were obtained.

In the device, a monodomain with a good and uniform alignment characteristic was observed.

| | 10° C. | 25° C. | 40° C. |
|---|---|---|---|
| Response time (μsec) | 653 | 317 | 159 |

EXAMPLE 24

A liquid crystal composition J was prepared by mixing the following Example Compounds instead of those of (I-50), (I-64) and (I-94) used in Example 23 in the indicated proportions with the liquid crystal composition G.

| Ex. Comp. No. | Structural formula | wt. parts |
|---|---|---|
| I-43 |  | 3 |
| I-67 | | 3 |
| I-173 | | 3 |
| | Composition G | 91 |

| | 10° C. | 25° C. | 40° C. |
|---|---|---|---|
| Response time (μsec) | 461 | 235 | 123 |

COMPARATIVE EXAMPLE 2

A ferroelectric liquid crystal device was prepared and subjected to measurement of response time in the same manner as in Example 16 except for injecting the composition G prepared in Example 23 into the cell, whereby the following results were obtained.

A ferroelectric liquid crystal device was prepared and subjected to measurement of response time in the same manner as in Example 16 except for injecting the composition J alone into the cell and further subjected to observation of switching states, whereby the following results were obtained.

In the device, a monodomain with a good and uniform alignment characteristic was observed.

| | 10° C. | 25° C. | 40° C. |
|---|---|---|---|
| Response time (μsec) | 525 | 264 | 138 |

EXAMPLE 25

A liquid crystal composition K was prepared by mixing the following compounds in the indicated proportions.

| Structural formula | wt. parts |
|---|---|
| $C_9H_{19}$—[pyrimidine]—[phenyl]—$OC_9H_{19}$ | 6 |
| $C_{10}H_{21}$—[pyrimidine]—[phenyl]—$OC_8H_{17}$ | 6 |
| $C_8H_{17}O$—[pyridine]—[phenyl]—$O(CH_2)_5^*CH(CH_3)C_2H_5$ | 7 |
| $C_{11}H_{23}O$—[pyrimidine]—[phenyl]—$O(CH_2)_2^*CH(CH_3)C_2H_5$ | 14 |
| $C_{10}H_{21}$—[pyridine]—[phenyl]—$C_6H_{13}$ | 8 |
| $C_6H_{13}$—[pyrimidine]—[phenyl]—[phenyl]—$C_4H_9$ | 4 |
| $C_8H_{17}$—[phenyl]—[pyridine]—[phenyl]—$OC_5H_{11}$ | 2 |
| $C_3H_7$—[cyclohexyl-H]—COO—[phenyl]—[pyrimidine]—$C_{12}H_{25}$ | 10 |
| $C_5H_{11}$—[cyclohexyl-H]—COO—[phenyl]—[pyrimidine]—$C_{12}H_{25}$ | 5 |
| $C_{10}H_{21}O$—[phenyl]—C(=O)S—[phenyl]—$OC_8H_{17}$ | 10 |
| $C_6H_{13}$—[phenyl]—COO—[phenyl]—[phenyl]—$OCH_2CH(CH_3)C_2H_5$ | 7 |
| $C_3H_7$—[cyclohexyl-H]—$CH_2O$—[phenyl]—[pyrimidine]—$C_8H_{17}$ | 7 |
| $C_{10}H_{21}$—[phenyl]—[phenyl]—$OCH_2$—[phenyl]—$C_7H_{15}$ | 5 |

-continued

| Structural formula | wt. parts |
|---|---|
| C₁₂H₂₅—[pyridine]—[phenyl]—OCH₂C*HC₅H₁₁ (F) | 2 |
| C₅H₁₁—[H cyclohexyl]—CO(O)—[phenyl]—OCH₂C*HC₆H₁₃ (F) | 2 |
| C₁₂H₂₅O—[phenyl]—[pyridine]—CO(O)(CH₂)₃C*HC₂H₅ (CH₃) | 2 |
| C₁₂H₂₅O—[phenyl]—[pyridine]—O(CH₂)₃CHOC₃H₇ (CH₃) | 3 |

The liquid crystal composition K was further mixed with the following compounds in the proportions indicated below to provide a liquid crystal composition L.

| Ex. Comp. No. | Structural formula | wt. parts |
|---|---|---|
| I-86 | C₆H₁₃—[H cyclohexyl]—C≡C—[naphthyl]—(CH₂)₆—[phenyl] | 2 |
| I-120 | C₈H₁₇—[phenyl]—[pyridine]—[phenyl]—(CH₂)₄—[phenyl] | 3 |
| I-180 | [phenyl]—(CH₂)₁₀—[pyridine]—[phenyl(F)]—OC(O)—[H cyclohexyl]—C₃H₇ | 3 |
| | Composition K | 92 |

A ferroelectric liquid crystal device was prepared and subjected to measurement of response time in the same manner as in Example 16 except for injecting the composition L alone into the cell and further subjected to observation of switching states, whereby the following results were obtained.

In the device, a monodomain with a good and uniform alignment characteristic was observed.

| | 10° C. | 25° C. | 40° C. |
|---|---|---|---|
| Response time (μsec) | 555 | 295 | 165 |

Comparative Example 3

A ferroelectric liquid crystal device was prepared and subjected to measurement of response time in the same manner as in Example 16 except for injecting the composition K prepared in Example 25 into the cell, whereby the following results were obtained.

| | 10° C. | 25° C. | 40° C. |
|---|---|---|---|
| Response time (μsec) | 668 | 340 | 182 |

EXAMPLE 26

A liquid crystal composition M was prepared by mixing the following Example Compounds instead of those of (I-110), (I-120) and (I-180) used in Example 25 in the indicated proportions with the liquid crystal composition K.

| Ex. Comp. No. | Structural formula | wt. parts |
| --- | --- | --- |
| I-19 | 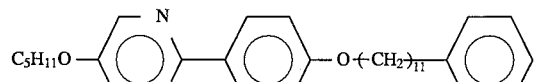 | 5 |
| I-93 |  | 2 |
| I-177 | 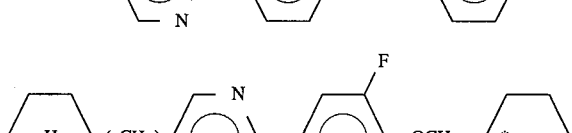 | 2 |
| Composition K | | 91 |

A ferroelectric liquid crystal device was prepared and subjected to measurement of response time in the same manner as in Example 16 except for injecting the composition Malone into the cell and further subjected to observation of switching states, whereby the following results were obtained.

In the device, a monodomain with a good and uniform alignment characteristic was observed.

|  | 10° C. | 25° C. | 40° C. |
| --- | --- | --- | --- |
| Response time (μsec) | 502 | 272 | 153 |

As apparent from the above Examples 16 to 26, the ferroelectric liquid crystal device containing the liquid crystal compositions A, B, C, E, F, H, J, L and M according to the present invention provided improved operation characteristic at a lower temperature, high speed responsiveness and a decreased temperature dependence of response speed.

EXAMPLE 27

A blank cell was prepared in the same manner as in Example 16 by using a 2% aqueous solution of polyvinyl alcohol resin (PVA-117, available from Kuraray K. K.) instead of the 1.5%-solution of polyimide resin precursor in dimethylacetoamide on each electrode plate. A ferroelectric liquid crystal device was prepared by filling the blank cell with the liquid crystal composition F prepared in Example 22. The liquid crystal device was subjected to measurement response time in the same manner as in Example 16. The results are shown below.

|  | 10° C. | 25° C. | 40° C. |
| --- | --- | --- | --- |
| Response time (μsec) | 663 | 340 | 188 |

EXAMPLE 28

A blank cell was prepared in the same manner as in Example 16 except for omitting the SiO₂ layer to form an alignment control layer composed of the polyimide resin layer alone on each electrode plate. A ferroelectric liquid crystal devices were prepared by filling such a blank cell with liquid crystal composition F prepared in Example 22. The liquid crystal device was subjected to measurement of response time in the same manner as in Example 16. The results are shown below.

|  | 10° C. | 25° C. | 40° C. |
| --- | --- | --- | --- |
| Response time (μsec) | 652 | 332 | 181 |

As is apparent from the above Examples 27 and 28, also in the case of a different device structure, the device containing the ferroelectric liquid crystal composition F according to the present invention provided an improved low-temperature operation characteristic and a decreased temperature dependence of response speed similarly as in Example 22.

EXAMPLE 29

Production of 2-(4-methoxyphenyl)-5-(4-phenylbutyl)pyrimidine (I-189)

The above compound (I-189) was synthesized through the following reaction scheme.

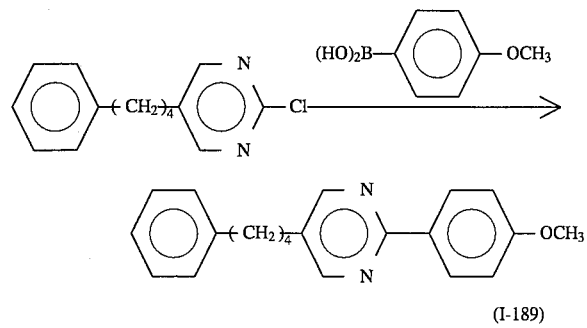

(I-189)

0.17 g of an objective product was prepared in the same manner as in Example 11 except that

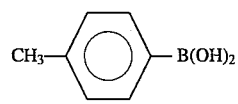

was used instead of

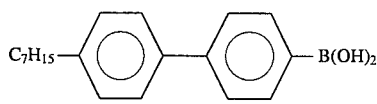

used in Step (iii) of Example 11.

EXAMPLE 30

Production of 5-decyl-2-{4-[4'-(4-phenylbutyl)biphenyl]}pyrimidine (I-187)

The above compound (I-187) was synthesized through the following steps (i) nd (ii).

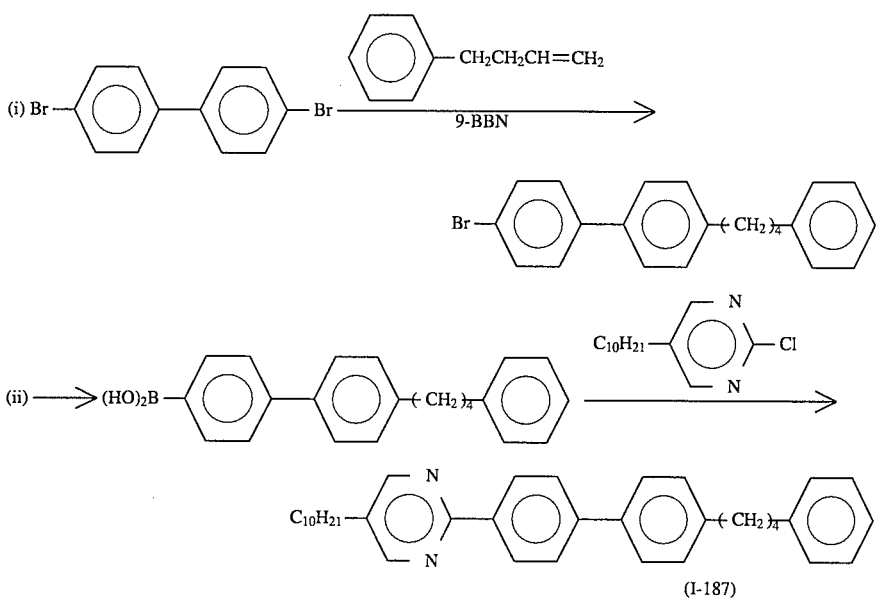

Step (i) Production of

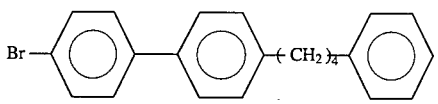

0.32 g of an objective product was prepared in the same manner as in Example 1 except that

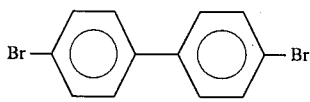

was used instead of

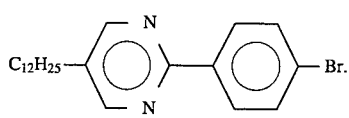

Step (ii) Production of

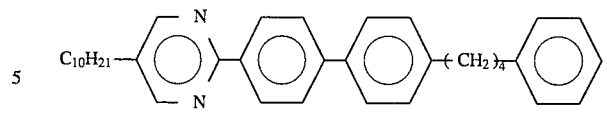

0.13 g of an objective product was prepared in the same manner as in Example 1 except that

was used instead of

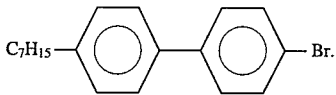

The compounds prepared in Examples 29 and 30 showed the following phase transition temperatures (°C.).

| Ex. (Ex. Comp. No.) | Structural formula (Phase transition temperature (°C.)) |
|---|---|
| 29 (I-189) | 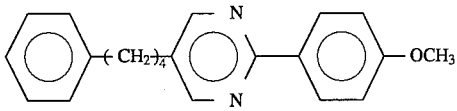 (Cryst. $\underset{43}{\overset{49}{\rightleftarrows}}$ S3 $\underset{75}{\overset{89}{\rightleftarrows}}$ Iso) |
| 30 (I-187) | 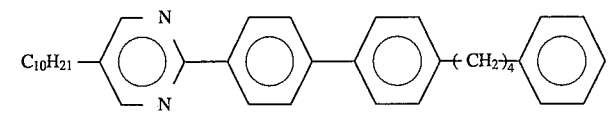 (Cryst. $\underset{37}{\overset{57}{\rightleftarrows}}$ S3 $\underset{123}{\overset{124}{\rightleftarrows}}$ $S_C$ $\underset{127}{\overset{128}{\rightleftarrows}}$ $S_A$ $\underset{153}{\overset{154}{\rightleftarrows}}$ N $\underset{158}{\overset{159}{\rightleftarrows}}$ Iso) |

EXAMPLE 31

A liquid crystal composition N was prepared by mixing the following compounds in the indicated proportions.

| Structural formula | wt. parts |
|---|---|
| 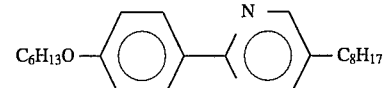 | 46 |
| 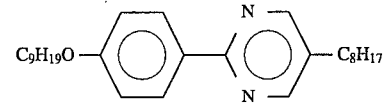 | 23 |
| 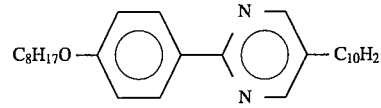 | 11.5 |
| 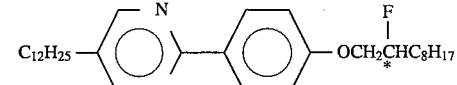 | 2.5 |
| 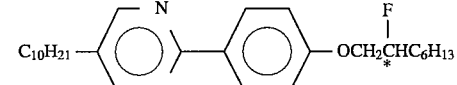 | 2.5 |

The liquid crystal composition N was further mixed with the following compounds in the proportions indicated below to provide a liquid crystal composition P.

| Ex. Comp. No. | Structural formula | wt. parts |
|---|---|---|
| I-2 | 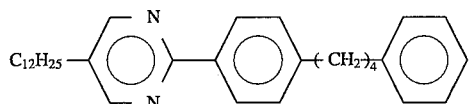 | 6.5 |
| I-60 | 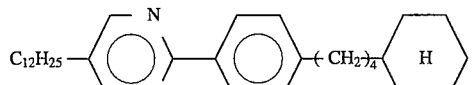 | 4.0 |
| I-112 | 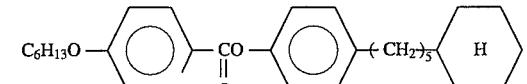 | 4.0 |
| Composition N | | 85.5 |

A ferroelectric liquid crystal device was prepared in the same manner as in Example 16 except that the above liquid crystal composition P was used, and the device was sub jected to measurement of optical response time. The results of the measurement are shown below.

|  | 10° C. | 30° C. | 40° C. |
| --- | --- | --- | --- |
| Response time (μsec) | 468 | 203 | 157 |

Separately, the liquid crystal composition N was further mixed with the following compounds in the proportions indicated below to provide a liquid crystal composition Q.

| Structural formula | wt. parts |
| --- | --- |
| $C_{12}H_{25}$—[pyrimidine]—[phenyl]—$(CH_2)_4$—[phenyl]—$C_6H_{13}$ | 6.5 |
| $C_{12}H_{25}$—[pyrimidine]—[phenyl]—$(CH_2)_4$—[cyclohexyl(H)]—$C_5H_{11}$ | 4.0 |
| $C_6H_{13}$—[pyridine]—$CO\text{-}O$—[phenyl]—$(CH_2)_4$—[cyclohexyl(H)]—$C_5H_{11}$ | 4.0 |
| Composition N | 85.5 |

A ferroelectric liquid crystal device was prepared in the same manner as in Example 16 except that the above liquid crystal composition Q was used, and the device was subjected to measurement of optical response time. The results of the measurement are shown below.

|  | 10° C. | 30° C. | 40° C. |
| --- | --- | --- | --- |
| Response time (μsec) | 785 | 310 | 228 |

EXAMPLE 32

A liquid crystal composition R was prepared by mixing the following compounds in the indicated proportions with the liquid crystal composition N prepared in Example 31.

| Ex. Comp. No. | Structural formula | wt. parts |
| --- | --- | --- |
| I-51 | $C_{10}H_{19}$—[pyrimidine]—[phenyl]—$(CH_2)_6$—$OC(=O)$—[2,3-difluorophenyl] | 4.0 |
| I-80 | $C_{12}H_{25}$—[pyrimidine]—[phenyl]—$(CH_2)_6$—[3-CF$_3$-phenyl] | 4.0 |
| | $C_5H_{11}$—[cyclohexyl(H)]—$CO\text{-}O$—[phenyl]—[pyrimidine]—$C_{11}H_{23}$ | 6.0 |
| Composition N | | 86.0 |

A ferroelectric liquid crystal device was prepared in the same manner as in Example 16 except that the above liquid crystal composition R was used, and the device was subjected to measurement of optical response time. The results of the measurement are shown below.

|                     | 10° C. | 30° C. | 40° C. |
|---------------------|--------|--------|--------|
| Response time (μsec)| 468    | 203    | 157    |

COMPARATIVE EXAMPLE 5

A liquid crystal composition S was prepared by mixing the following Example Compounds instead of those of (I-51) and (I-80) used in Example 32 in the indicated proportions with the liquid crystal composition N.

| Structural formula | wt. parts |
|---|---|

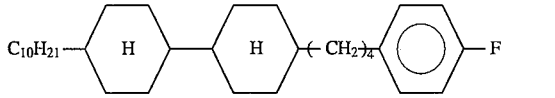

| | 10° C. | 30° C. | 40° C. |
|---|---|---|---|
| Response time (μsec) | 660 | 223 | 176 |

As apparent from the above Examples 31 and 32 and Comparative Example 5, the ferroelectric liquid crystal device using the liquid crystal compositions P and R according to the present invention provided an improved response speed at a lower temperature and a decreased temperature dependence of response speed when compared with those using the liquid crystal compositions Q and S, respectively.

EXAMPLE 33

Production of 2-[4-(4'-pentylcyclohexyl)phenyl]-5-(4-phenylbutyl)pyrimidine (I-186)

The above compound (I-186) was synthesized through the following steps (i) and (ii).

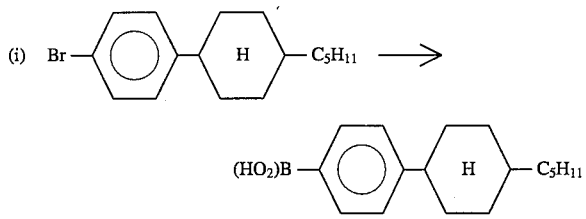

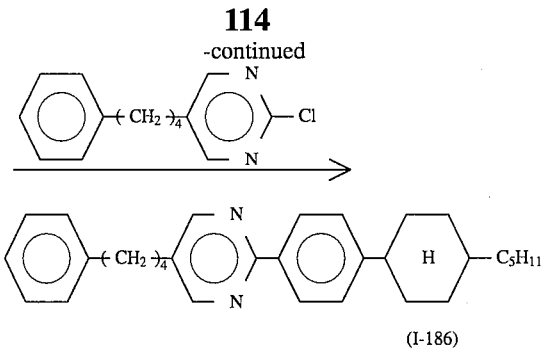

Step (i) Production of

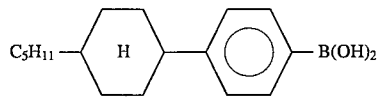

An objective product was prepared in the same manner as in Step (i) of Example 11 except that

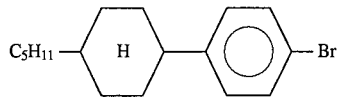

was used instead of

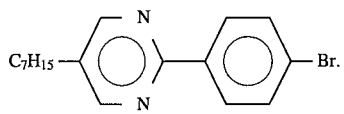

Step (ii) Production of

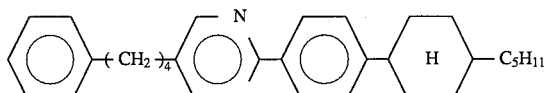

0.13 g of an objective product was prepared in the same manner as in Example 11 except that

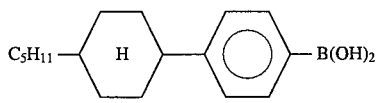

was used instead of

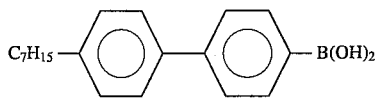

used in Step (iii) of Example 11.

Phase transition temperature (°C.)

$$\text{Cry.} \underset{\underset{81}{\longleftarrow}}{\overset{100}{\longrightarrow}} \text{SmA} \underset{\underset{133}{\longleftarrow}}{\overset{134}{\longrightarrow}} \text{N} \underset{\underset{177}{\longleftarrow}}{\overset{179}{\longrightarrow}} \text{Iso.}$$

EXAMPLE 34

Production of 5-hexyl-2-{4-[4'-(4-phenylbutyl)biphenyl]}pyrimidine (I-117)

The above compound (I-117) was synthesized through the following steps reaction scheme.

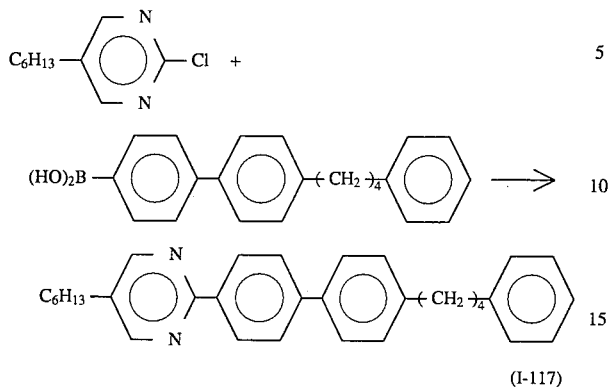

(I-117)

0.40 g of

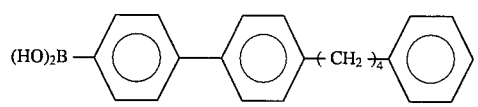

0.25 g of

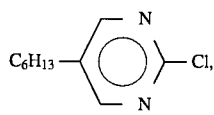

0.07 g of (PPh$_3$)$_4$Pd, 4 ml of toluene, 2 ml of 2M-Na$_2$CO$_3$ aqueous solution, and 1 ml of ethanol were mixed, followed by refluxing for 5 hours under stirring. After the reaction, the reaction mixture was poured into water and subjected to extraction with a mixture solvent of toluene/ethyl acetate, followed by distilling-off of the organic solvent. The resultant extract was purified by silica gel column chromatography (eluent: toluene) and successively recrystallized from a mixture solvent of toluene/methanol and acetone to obtain 0.20 g of an objective product.

EXAMPLE 35

Production of 5-(4-hexylphenyl)-2-[4-phenylbutyl)phenyl]pyrimidine (I-192)

The above compound (I-192) was synthesized through the following reaction scheme.

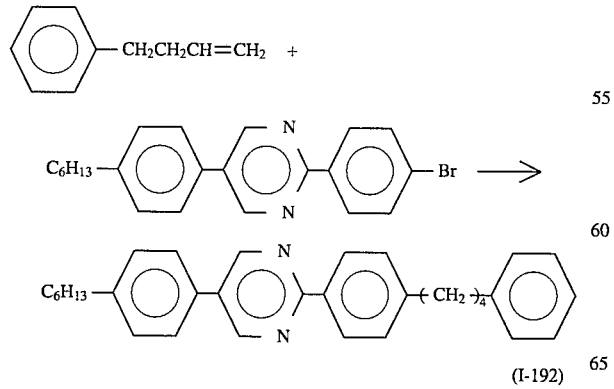

(I-192)

0.25 g of an objective product was prepared in the same manner as in Example 11 except that 0.93 g of

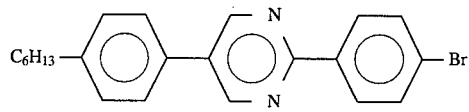

was used instead of 0.92 g of

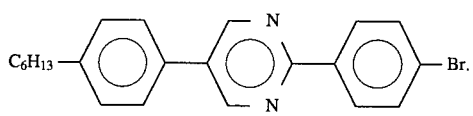

EXAMPLE 36

Production of 5-decyl-2-[4-(8-phenyloctyl)phenyl]pyrimidine (I-200)

The above compound (I-200) was synthesized through the following reaction scheme.

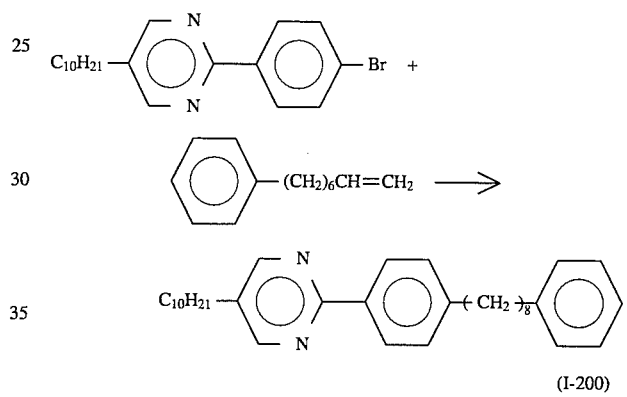

(I-200)

0.24 g of an objective product was prepared in the same manner as in Example 1 except that 0.58 g of

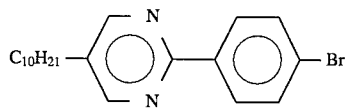

was used instead of 0.92 g of

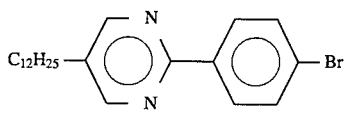

and that 0.39 g of

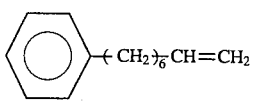

was used instead of 0.31 g of

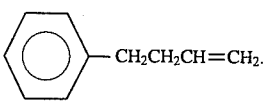

EXAMPLE 37

Production of 5-decyl-2-[7-(4-phenylheptyloxy)phenyl]pyrimidine (I-203)

The above compound (I-203) was synthesized through the following reaction scheme.

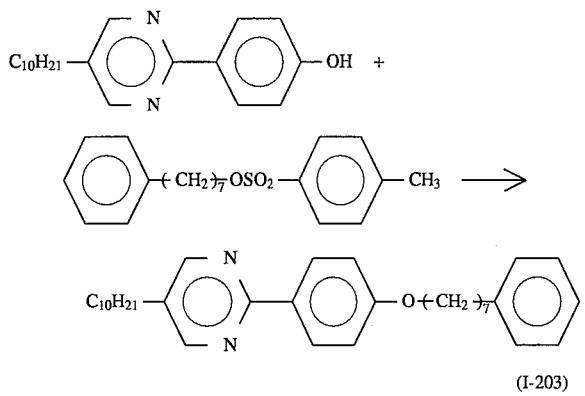

(I-203)

0.32 g of an objective product was prepared in the same manner as in Example 7 except that 0.50 g of

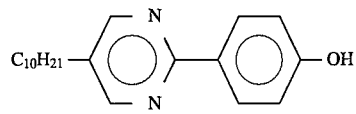

was used instead of 0.50 g of

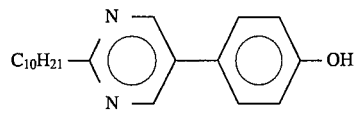

and that 0.58 g of

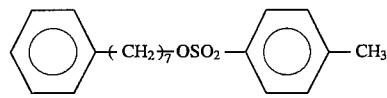

was used instead of 0.53 g of

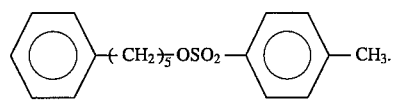

EXAMPLE 38

Production of 5-octyl-2-[7-(4-phenylheptyloxy)phenyl]pyrimidine (I-204)

The above compound (I-204) was synthesized through the following reaction scheme.

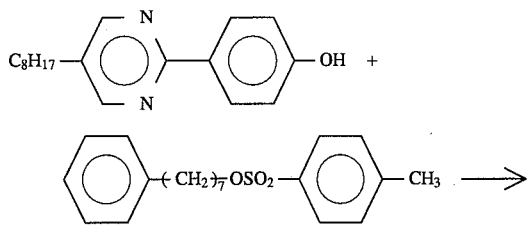

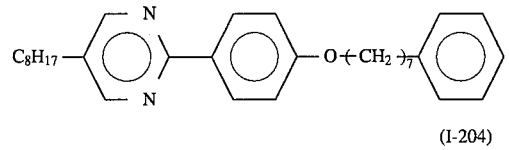

(I-204)

0.42 g of an objective product was prepared in the same manner as in Example 7 except that 0.45 g of

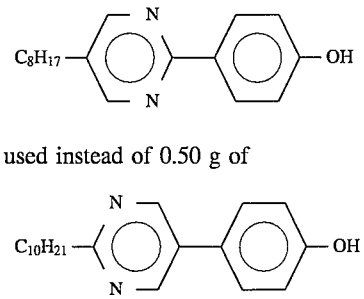

was used instead of 0.50 g of

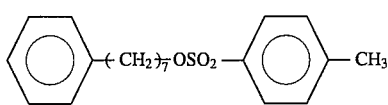

and that 0.58 g of

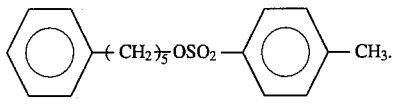

was used instead of 0.53 g of

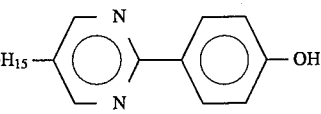

EXAMPLE 39

Production of 5-heptyl-2-[5-(4-phenylpentyloxy)phenyl]pyrimidine (I-208)

The above compound (I-208) was synthesized through the following reaction scheme.

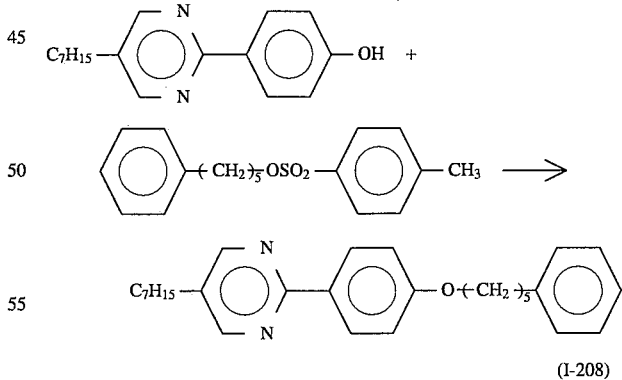

(I-208)

0.32 g of an objective product was prepared in the same manner as in Example 7 except that 0.50 g of was used instead of 0.50 g of

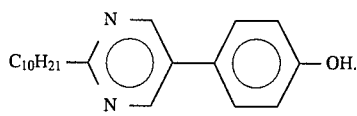

EXAMPLE 40

Production of 5-octyl-2-[5-(4-phenylpentyloxy)phenyl]pyrimidine (I-207)

The above compound (I-207) was synthesized through the following reaction scheme.

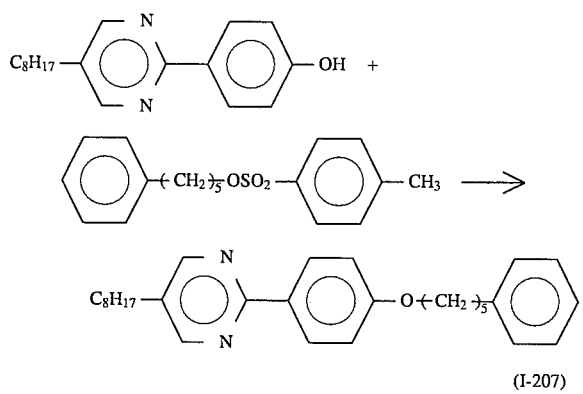

0.41 g of an objective product was prepared in the same manner as in Example 7 except that 0.45 g of

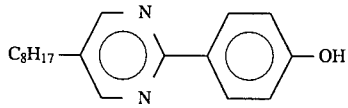

was used instead of 0.50 g of

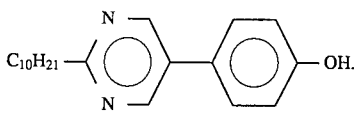

EXAMPLE 41

Production of 5-nonyl-2-[5-(4-phenylpentyloxy)phenyl]pyrimidine (I-206)

The above compound (I-206) was synthesized through the following reaction scheme.

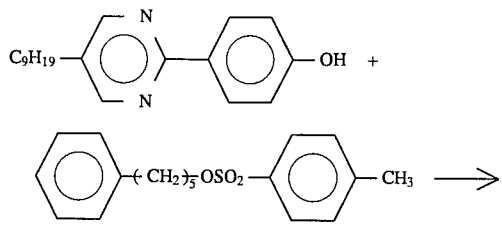

-continued

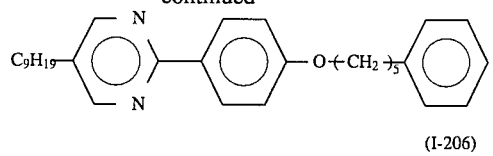

(I-206)

0.54 g of an objective product was prepared in the same manner as in Example 7 except that 0.48 g of

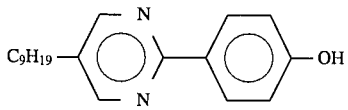

was used instead of 0.50 g of

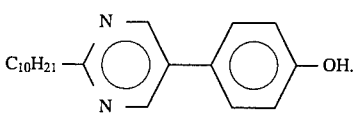

EXAMPLE 42

Production of 5-undecyl-2-[5-(4-phenylpentyloxy)phenyl]pyrimidine (I-205)

The above compound (I-205) was synthesized through the following reaction scheme.

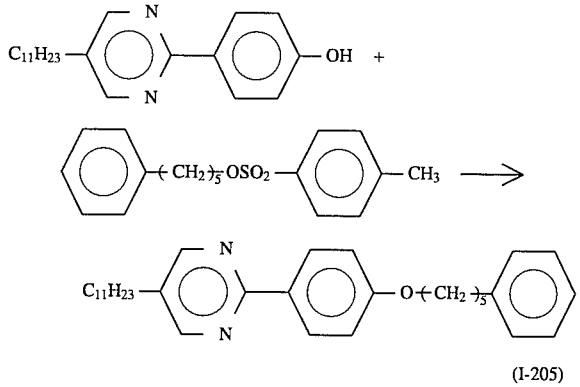

(I-205)

0.58 g of an objective product was prepared in the same manner as in Example 7 except that 0.52 g of

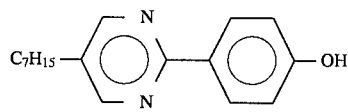

was used instead of 0.50 g of

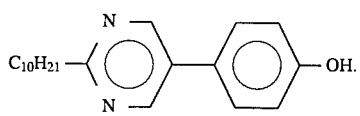

EXAMPLE 43

Production of 2-(4-decylphenyl-5-(7-phenylheptyloxy)pyrimidine (I-216)

The above compound (I-216) was synthesized through the following reaction scheme.

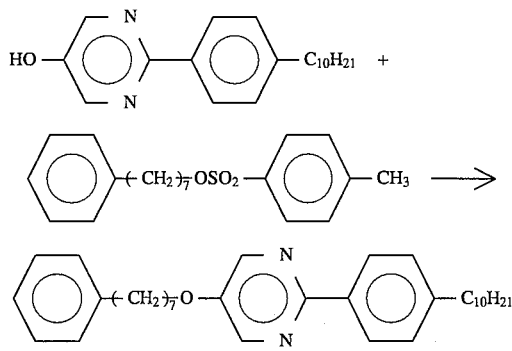
(I-216)

0.66 g of an objective product was prepared in the same manner as in Example 7 except that 0.50 g of

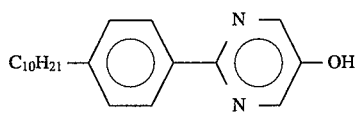

was used instead of 0.50 g of

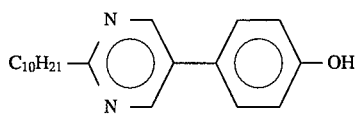

and that 0.54 g of

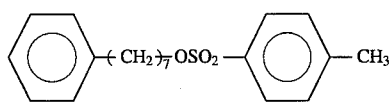

was used instead of 0.53 g of

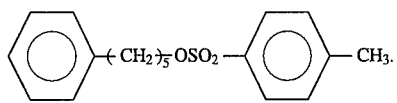

EXAMPLE 44

Production of 2-(4-decylphenyl-5-(7-phenylbutyloxy)pyrimidine (I-150)

The above compound (I-150) was synthesized through the following reaction scheme.

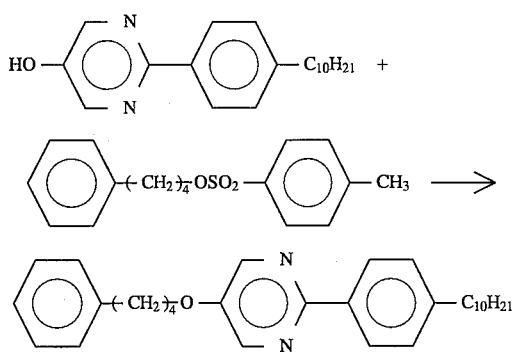
(I-150)

0.54 g of an objective product was prepared in the same manner as in Example 7 except that 0.50 g of

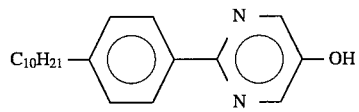

was used instead of 0.50 g of

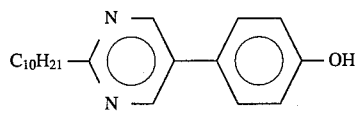

and that 0.52 g of

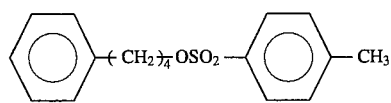

was used instead of 0.53 g of

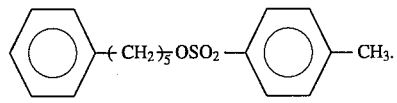

EXAMPLE 45

Production of 5-(4-cyclohexylbutyloxy)-2-(4-decylphenyl)pyrimidine (I-220)

The above compound (I-220) was synthesized through the following reaction scheme.

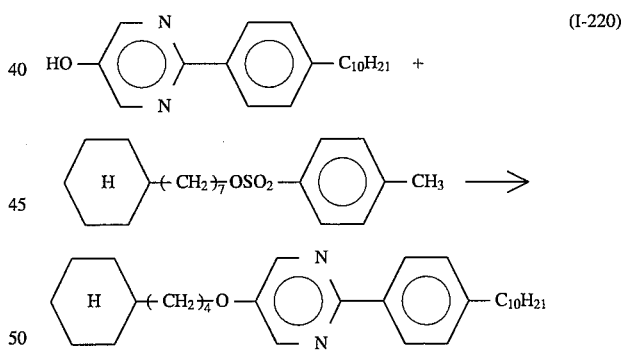
(I-220)

0.44 g of an objective product was prepared in the same manner as in Example 7 except that 0.50 g of

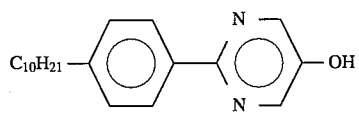

was used instead of 0.50 g of

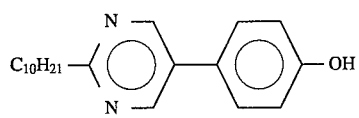

and that 0.50 g of

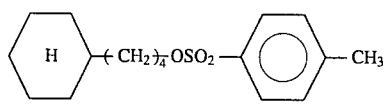

was used instead of 0.53 g of

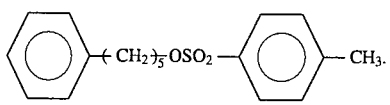

EXAMPLE 46

Production of 2-(4-nonylphenyl-5-(5-phenylpentyloxy)pyrimidine (I-219)

The above compound (I-219) was synthesized through the following reaction scheme.

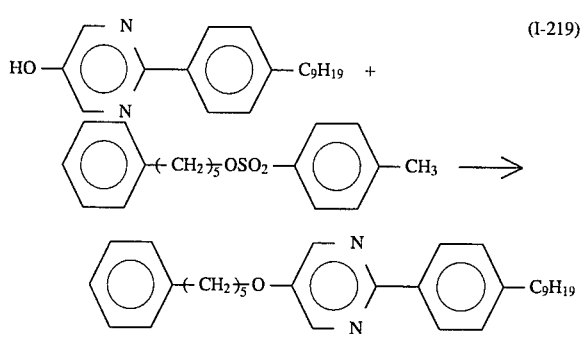

0.61 g of an objective product was prepared in the same manner as in Example 7 except that 0.48 g of

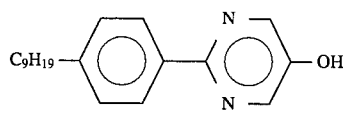

was used instead of 0.50 g of

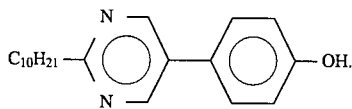

EXAMPLE 47

Production of 4-phenylbutanoic acid 4-(5-decyl-2-pyrimidinyl)phenyl ester (I-31)

The above compound (I-31) was synthesized through the following reaction scheme.

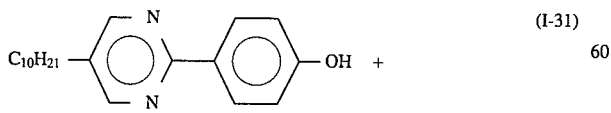

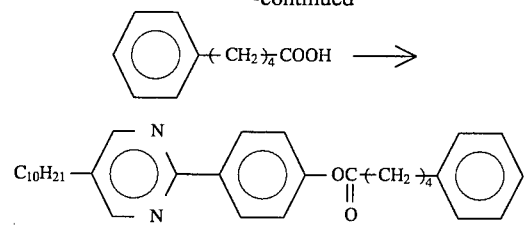

0.46 g of an objective product was prepared in the same manner as in Example 12 except that 0.28 g of

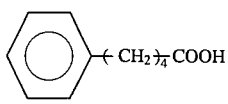

was used instead of 0.32 g of

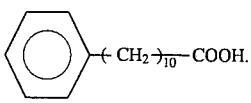

EXAMPLE 48

Production of optically active 2-[4-(2-fluorooctyloxy)phenyl]-5-(4-phenylbutyl)pyrimidine (I-104)

The above compound (I-104) was synthesized through the following steps (i) and (ii).

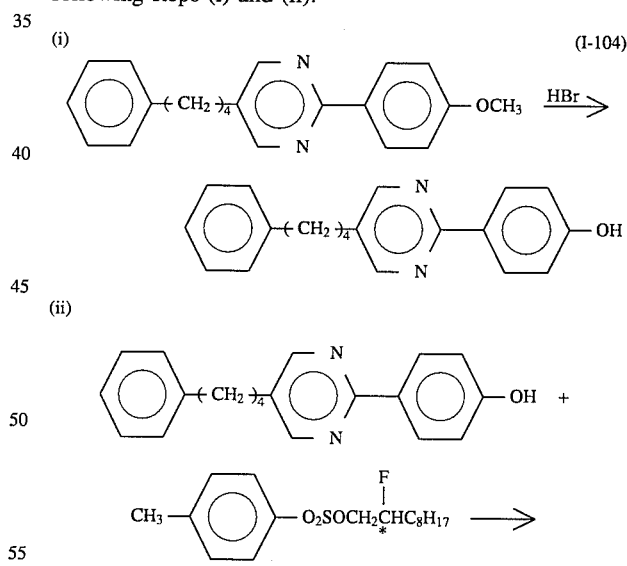

Step (i) Production of

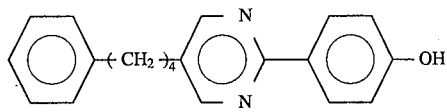

4.8 g of

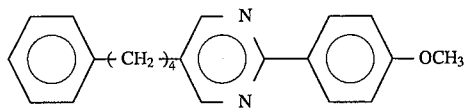

prepared in the same manner as in Example 29, 50 ml of a 25%-solution of hydrogen bromide in acetic acid, and 2.4 ml of a 57%-hydrogen iodide aqueous solution were mixed and stirred for 2 hours at 100° C. After the reaction, the reaction mixture was poured into water to precipitate a crystal. The crystal was recovered by filtration and washed with water. The resultant crystal was dried and recrystallized from hexane to obtain 1.5 g of an objective product.

Step (ii) Production of

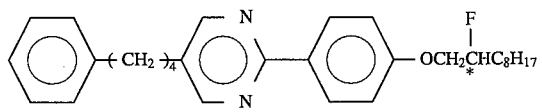

0.45 g of an objective product was prepared in the same manner as in Example 7 except that 0.49 g of

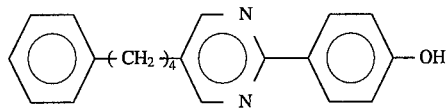

was used instead of 0.50 g of

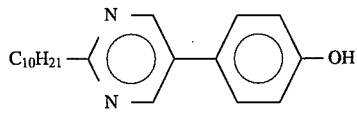

and that 0.55 g of

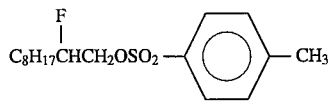

was used instead of 0.53 g of

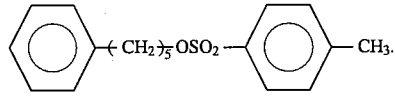

EXAMPLE 49

Production of optically active 2-tetrahydrofurancarboxylic acid 4-[5-(4-phenylbutyl)-2-pyrimidinyl]phenyl ester (I-223)

The above compound (I-223) was synthesized through the following reaction scheme.

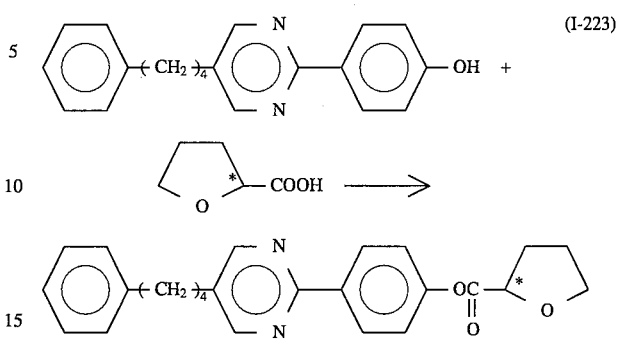

0.35 g of an objective product was prepared in the same manner as in Example 7 except that 0.49 g of

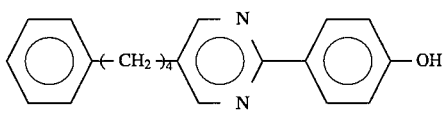

prepared in Step (i) of Example 48 was used instead of 0.50 g of

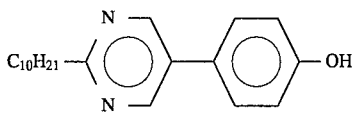

and that 0.16 g of

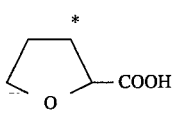

was used instead of 0.32 g of

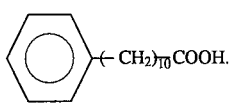

EXAMPLE 50

Production of 2-[4-(4-cyclohexylbutyloxy)phenyl]decylpyrimidine (I-210)

The above compound (I-210) was synthesized through the following reaction scheme.

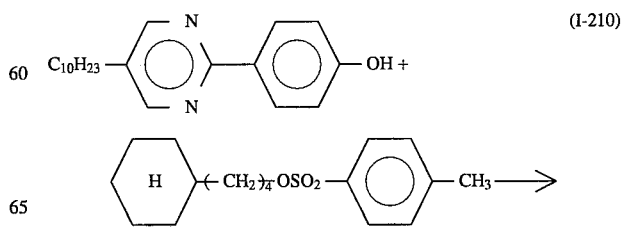

-continued

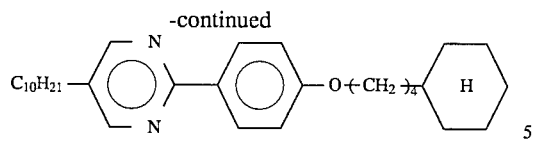

0.57 g of an objective product was prepared in the same manner as in Example 7 except that 0.50 g of

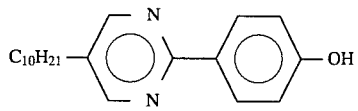

was used instead of 0.50 g of

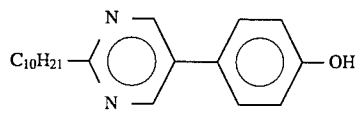

and that 0.50 g of

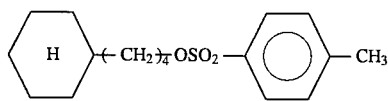

was used instead of 0.53 g of

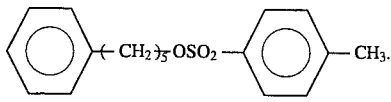

EXAMPLE 51

Production of 2-[4-(4-cyclohexylbutyloxy)phenyl]undecylpyrimidine (I-209)

The above compound (I-209) was synthesized through the following reaction scheme.

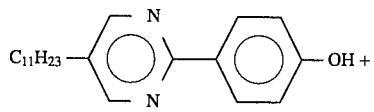 (I-209)

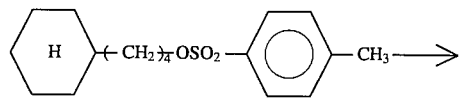

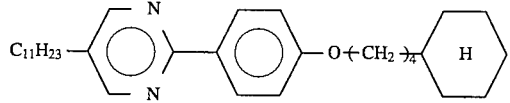

0.45 g of an objective product was prepared in the same manner as in Example 7 except that 0.52 g of

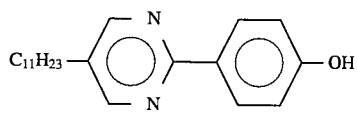

was used instead of 0.50 g of

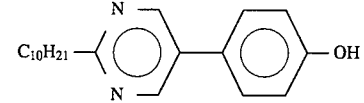

and that 0.50 g of

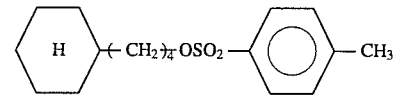

was used instead of 0.53 g of

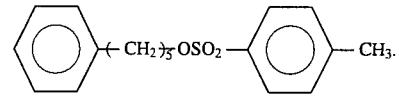

EXAMPLE 52

Production of 2-[4-(4-cyclohexylbutyloxy)phenyl]nonylpyrimidine (I-211)

The above compound (I-211) was synthesized through the following reaction scheme.

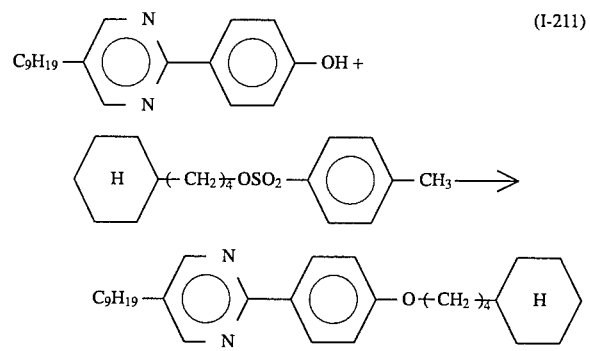 (I-211)

0.40 g of an objective product was prepared in the same manner as in Example 7 except that 0.48 g

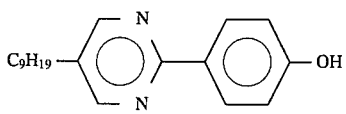

was used instead of 0.50 g of

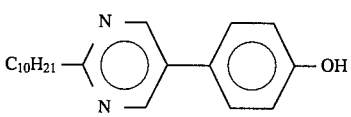

and that 0.50 g of

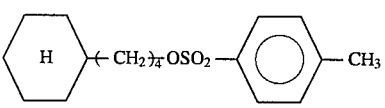

was used instead of 0.53 g of

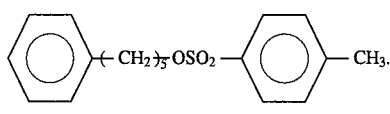

EXAMPLE 53

Production of 2-[4-(4-cyclohexylbutyloxy)phenyl]octylpyrimidine (I-212)

The above compound (I-212) was synthesized through the following reaction scheme.

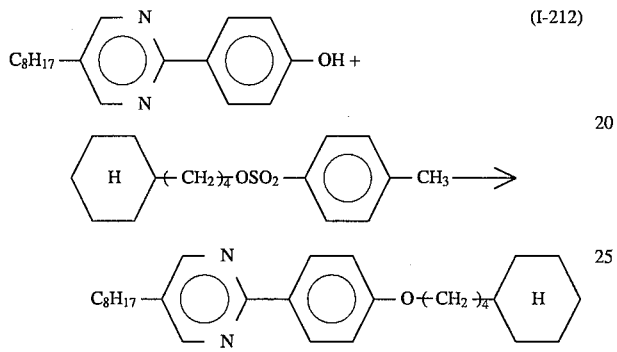

0.26 g of an objective product was prepared in the same manner as in Example 7 except that 0.45 g

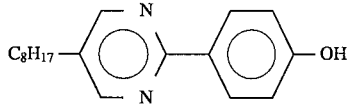

was used instead of 0.50 g of

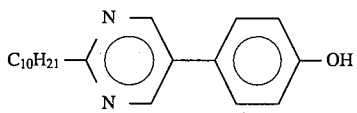

and that 0.50 g of

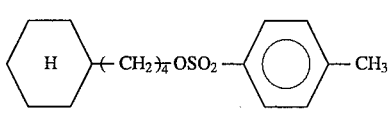

was used instead of 0.53 g of

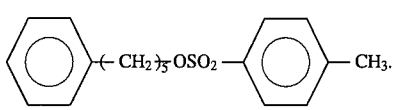

The mesomorphic compounds prepared in Examples 34–53 showed the following phase transition series.

| Ex. | (Ex. Comp. No.) | Structural formula (Phase transition temperature (°C.)) |
|---|---|---|
| 34 | (I-117) | $C_6H_{13}$—pyrimidine—phenyl—phenyl—$(CH_2)_4$—cyclohexyl <br> (Cryst. ⇌94/39 S3 ⇌108/106 $S_C$ ⇌114/113 N ⇌168/167 Iso; S3 ⇌68 S4) |
| 35 | (I-192) | $C_6H_{13}$—phenyl—pyrimidine—phenyl—$(CH_2)_4$—phenyl <br> (Cryst. ⇌95/72 $S_C$ ⇌105/104 $S_A$ ⇌168/166 N ⇌170/168 Iso) |
| 36 | (I-200) | $C_{10}H_{21}$—pyrimidine—phenyl—$(CH_2)_8$—phenyl <br> (Cryst. ⇌64/52 Iso) |
| 37 | (I-203) | $C_{10}H_{12}$—pyrimidine—phenyl—O—$(CH_2)_7$—phenyl |

-continued

| Ex. | (Ex. Comp. No.) | Structural formula (Phase transition temperature (°C.)) |
|---|---|---|
| | | $\left(\text{Cryst.} \xrightleftharpoons[49]{63} S_C \xrightleftharpoons[49]{} S_A \xleftarrow{58} \text{Iso}\right)$ |
| 38 | (I-204) | $C_8H_{17}$—[pyrazine]—[phenyl]—O—$(CH_2)_7$—[phenyl] |
| | | $\left(\text{Cryst.} \xrightleftharpoons[53]{63} N \xleftarrow{58} \text{Iso}\right)$ |
| 39 | (I-208) | $C_7H_{15}$—[pyrazine]—[phenyl]—O—$(CH_2)_5$—[phenyl] |
| | | $\left(\text{Cryst.} \xrightleftharpoons[50]{70} N \xleftarrow{66} \text{Iso}\right)$ |
| 40 | (I-207) | $C_8H_{17}$—[pyrazine]—[phenyl]—O—$(CH_2)_5$—[phenyl] |
| | | $\left(\text{Cryst.} \xrightleftharpoons[46]{57} N \xrightleftharpoons[61]{63} \text{Iso}\right)$ |
| 41 | (I-206) | $C_9H_{19}$—[pyrazine]—[phenyl]—O—$(CH_2)_5$—[phenyl] |
| | | $\left(\text{Cryst.} \xrightarrow{57} S_A \xrightleftharpoons[62]{63} N \xrightleftharpoons[66]{68} \text{Iso}\right.$ ; $\left.\phantom{XX} \xleftarrow{20} S_C \xleftarrow{48}\right)$ |
| 42 | (I-205) | $C_{11}H_{23}$—[pyrazine]—[phenyl]—O—$(CH_2)_5$—[phenyl] |
| | | $\left(\text{Cryst.} \xrightarrow{61} S_A \xrightleftharpoons[70]{71} \text{Iso}\right.$ ; $\left.\phantom{XX} \xleftarrow{44} S_C \xleftarrow{55}\right)$ |
| 43 | (I-216) | [phenyl]—$(CH_2)_7$O—[pyrazine]—[phenyl]—$C_{10}H_{21}$ |
| | | $\left(\text{Cryst.} \xrightleftharpoons[63]{73} S_A \xrightleftharpoons[75]{76} \text{Iso}\right)$ |
| 44 | (I-150) | [phenyl]—$(CH_2)_7$O—[pyrazine]—[phenyl]—$C_{10}H_{21}$ |

| Ex. | (Ex. Comp. No.) | Structural formula (Phase transition temperature (°C.)) |
|---|---|---|
| 45 | (I-220) | $\left(\text{Cryst.} \underset{31}{\overset{42}{\rightleftarrows}} \text{Iso}\right)$<br>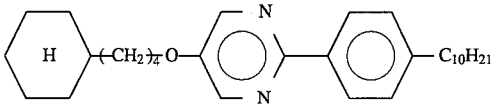 |
| 46 | (I-219) | $\left(\text{Cryst.} \underset{37}{\overset{54}{\rightleftarrows}} S_A \overset{50}{\rightleftarrows} \text{Iso}\right)$<br>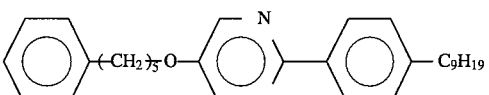 |
| 47 | (I-31) | $\left(\text{Cryst.} \underset{33}{\overset{56}{\rightleftarrows}} S_C \underset{53}{\overset{57}{\rightleftarrows}} S_A \underset{83}{\overset{84}{\rightleftarrows}} \text{Iso}\right)$<br> |
| 48 | (I-104) | $\left(\text{Cryst.} \overset{58}{\longrightarrow} \text{Iso},\ 25\ S_A \underset{43}{\leftarrow} N\ 50\right)$<br>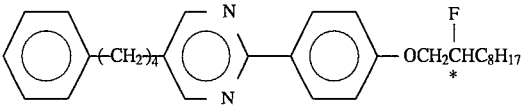 |
| 49 | (I-223) | $\left(\text{Cryst.} \overset{82}{\longrightarrow} \text{Iso},\ 41\ S3 \underset{50}{\leftarrow} S_A\ 81\right)$<br>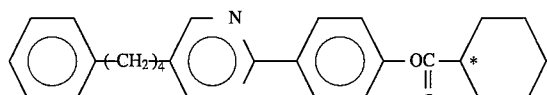 |
| 50 | (I-210) | $\left(\text{Cryst.} \underset{76}{\overset{110}{\rightleftarrows}} \text{Iso}\right)$<br>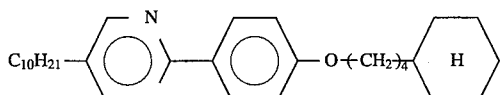 |
| 51 | (I-209) | $\left(\text{Cryst.} \underset{13}{\overset{48}{\rightleftarrows}} S_C \underset{52}{\overset{54}{\rightleftarrows}} \text{Iso}\right)$<br>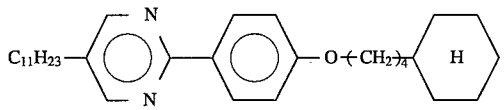 |

| Ex. | (Ex. Comp. No.) | Structural formula (Phase transition temperature (°C.)) |
|---|---|---|
| 52 | (I-211) | $\left(\text{Cryst.} \underset{-17}{\overset{49}{\rightleftarrows}} S_C \underset{57}{\overset{59}{\rightleftarrows}} \text{Iso}\right)$ 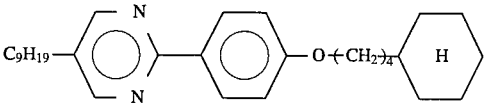 |
| 53 | (I-212) | $\left(\text{Cryst.} \underset{26}{\overset{88}{\rightleftarrows}} S_C \underset{48}{\overset{53}{\rightleftarrows}} S_A \underset{52}{\overset{53}{\rightleftarrows}} N \underset{54}{\overset{56}{\rightleftarrows}} \text{Iso}\right)$ 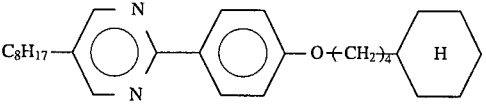 |
|  |  | $\left(\text{Cryst.} \overset{42}{\underset{17}{\rightleftarrows}} \underset{S_C}{\overset{}{\searrow}} \overset{}{\underset{50}{\nearrow}} N \underset{50}{\overset{51}{\rightleftarrows}} \text{Iso}\right)$ |

EXAMPLE 54

A liquid crystal composition T was prepared by mixing the following compounds including a compound (I-104) prepared in Example 48 in the respective indicated proportions.

| Structural Formula | wt. parts |
|---|---|
| 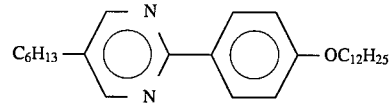 | 4.0 |
| 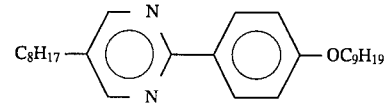 | 8.0 |
| 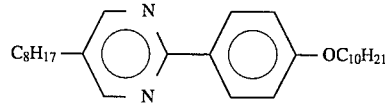 | 8.0 |
| 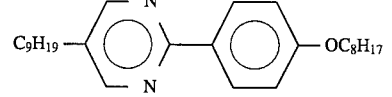 | 4.0 |
| 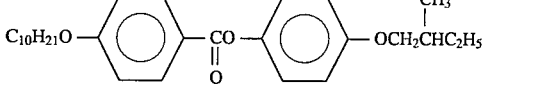 | 26.0 |
| 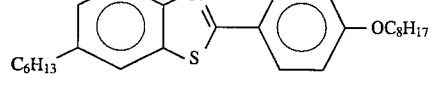 | 20.0 |

-continued

| Structural Formula | wt. parts |
|---|---|
| $C_5H_{11}$—⟨phenyl⟩—(thiadiazole N—N/S)—⟨phenyl⟩—$C_5H_{11}$ | 5.0 |
| $C_6H_{13}$—⟨phenyl⟩—(thiadiazole N—N/S)—⟨phenyl⟩—$C_4H_9$ | 5.0 |
| $C_{11}H_{23}$—⟨pyrimidine N,N⟩—⟨phenyl⟩—O—C(=O)—⟨thiophene S⟩—$C_4H_9$ | 6.7 |
| $C_{11}H_{23}$—⟨pyrimidine N,N⟩—⟨phenyl (F)⟩—O—C(=O)—⟨thiophene S⟩—$C_4H_9$ | 3.3 |
| Ex. Comp. No. (I-104): ⟨phenyl⟩—$(CH_2)_4$—⟨pyrimidine N,N⟩—⟨phenyl (F)⟩—$OCH_2CHC_8H_{17}$* | 10.0 |

A ferroelectric liquid crystal device was prepared and subjected to measurement of response time in the same manner as in Example 16 except for using the composition T and was further subjected to measurement of the magnitude of spontaneous polarization Ps, whereby the following results were obtained.

|  | 25° C. | 30° C. | 35° C. |
|---|---|---|---|
| Response time (μsec) | 90.4 | 66.4 | 44.8 |
| Ps (nC/cm$^2$) | 5.6 | 4.5 | 2.9 |

EXAMPLE 55

A liquid crystal composition U was prepared in the same manner as in Example 54 except that a compound (I-223) prepared in Example 49 was used instead of the compound (I-104).

A ferroelectric liquid crystal device was prepared and subjected to measurement of response time in the same manner as in Example 16 except for using the composition U and was further subjected to measurement of the magnitude of spontaneous polarization Ps, whereby the following results were obtained.

|  | 25° C. | 30° C. |
|---|---|---|
| Response time (μsec) | 66 | 34 |
| Ps (nC/cm$^2$) | 5.3 | 2.8 |

EXAMPLE 56

Production of 2-[4-(5-cyclohexylpentyloxy)phenyl]-5-octylpyrimidine 0.07 g of potassium hydroxide was dissolved in 2.0 ml of butanol. To the solution, 0.32 g of 4-(5-octylpyrimidine-2-yl)phenyl was added, followed by stirring for 30 minutes. To the resultant solution, 0.38 of 5-cyclohexylpentyl p-toluenesulfonate and 1.7 ml of butanol were added, followed by heat-refluxing for 3 hours at 110° C. After the reaction, the reaction mixture was poured into water after distilling-off of the solvent, followed by extraction with toluene. The resultant organic layer was subjected to distilling-off of the solvent and purified by silica gel column chromatography (eluent: toluene), followed by recrystallization from a mixture solvent of methanol-toluene to obtain 0.36 g of an objective product.

EXAMPLE 57

Production of 2-[4-(5-cyclohexylpentyloxy)phenyl]-5-nonylpyrimidine

An objective product was prepared in the same manner as in Example 56 except for using 4-(5-nonylpyrimidine-2-yl)phenol instead of 4-(5-octylpyrimidine-2-yl)phenol.

EXAMPLE 58

Production of 2-[4-(5-cyclohexylpentyloxy)phenyl]-5-decylpyrimidine

An objective product was prepared in the same manner as in Example 56 except for using 4-(5-decylpyrimidine-2-yl)phenyl instead of 4-(5-octylpyrimidine-2-yl)phenol.

EXAMPLE 59

Production of 2-[4-(5-cyclohexylpentyloxy)phenyl]-5-undecylpyrimidine

An objective product was prepared in the same manner as in Example 56 except for using 4-(5-undecylpyrimidine-2-yl)phenol instead of 4-(5-octylpyrimidine-2-yl)phenol.

EXAMPLE 60

Production of 2-[4-(4-cyclohexylbutyloxy)phenyl]-5-decyloxy pyrimidine

An objective product was prepared in the same manner as in Example 56 except for using 4-(5-decyloxypyrimidine-2-yl)phenol instead of 4-(5-octylpyrimidine-2-yl)phenol and also except for using 4-cyclohexylbutyl p-toluenesulfonate instead of 5-cyclohexylpentyl p-toluenesulfonate.

EXAMPLE 61

Production of 2-[4-(4-cyclohexylbutyloxy)phenyl]-5-nonyloxy pyrimidine

An objective product was prepared in the same manner as in Example 56 except for using 4-(5-nonyloxypyrimidine-2-yl)phenol instead of 4-(5-octylpyrimidine-2yl)phenol and also except for using 4-cyclohexylbutyl p-toluenesulfonate instead of 5-cyclohexylpentyl p-toluenesulfonate.

EXAMPLE 62

Production of 2-[4-(4-cyclohexylbutyloxy)phenyl]-5-octyloxy pyrimidine

An objective product was prepared in the same manner as in Example 56 except for using 4-(5-octyloxypyrimidine-2-yl)phenol instead of 4-(5-octylpyrimidine-2-yl)phenol and also except for using 4-cyclohexylbutyl p-toluenesulfonate instead of 5-cyclohexylpentyl p-toluenesulfonate.

EXAMPLE 63

Production of 2-[4-(5-cyclohexylpentyloxy)phenyl]-5-decyloxy pyrimidine

An objective product was prepared in the same manner as in Example 56 except for using 4-(5-decyloxypyrimidine-2-yl)phenol instead of 4-(5-octylpyrimidine-2-yl)phenol.

EXAMPLE 64

Production of 5-decyloxy-2-[4-(5-phenylpentyloxy)phenyl] pyrimidine

An objective product was prepared in the same manner as in Example 56 except for using 4-(5-decyloxypyrimidine-2-yl)phenol instead of 4-(5-octylpyrimidine-2-yl)phenol and also except for using 4-phenylpentyl p-toluenesulfonate instead of 5-cyclohexylpentyl p-toluenesulfonate.

EXAMPLE 65

Production of 2-[4-(4-cyclohexylbutyloxy)phenyl]-5-octyl pyridine

An objective product was prepared in the same manner as in Example 56 except for using 4-(5-octyl pyridine-2-yl)phenol instead of 4-(5-octylpyrimidine-2-yl)phenol and also except for using 4-cyclohexylbutyl p-toluenesulfonate instead of 5-cyclohexylpentyl p-toluenesulfonate.

EXAMPLE 66

Production of 2-[4-(5-cyclohexylpentyloxy)phenyl]-5-(4-phenylbutyl)pyrimidine

An objective product was prepared in the same manner as in Example 56 except for using 4-[5-(4-phenylbutyl)pyrimidine-2-yl]phenol instead of 4-(5-octylpyrimidine-2-yl)phenol.

EXAMPLE 67

Production of 5-(5-cyclohexylpentyloxy)-2-(4-decylphenyl)pyrimidine

An objective product was prepared in the same manner as in Example 56 except for using 2-(4-decylphenyl)-5-hydroxypyrimidine instead of 4-(5-octylpyrimidine-2-yl)phenol.

EXAMPLE 68

Production of 5-(4-cyclohexylbutyloxy)-2-(4-decyloxyphenyl)pyrimidine

An objective product was prepared in the same manner as in Example 56 except for using 2-(4-decyloxyphenyl)-5-hydroxypyrimidine instead of 4-(5-octylpyrimidine-2-yl)phenol and also except for using 4-cyclohexylbutyl p-toluenesulfonate instead of 5-cyclohexylpentyl p-toluenesulfonate.

EXAMPLE 69

Production of 5-(5-cyclohexylpentyloxy)-2-(4-decyloxyphenyl)pyrimidine

An objective product was prepared in the same manner as in Example 56 except for using 2-(4-decyloxyphenyl)-5-hydroxypyrimidine instead of 4-(5-octylpyrimidine-2-yl)phenol.

EXAMPLE 70

Production of 2-(4-octylphenyl)-5-(5-phenylpentyloxy)pyrimidine

An objective product was prepared in the same manner as in Example 56 except for using 5-hydroxy-2-(4-octylphenyl)pyrimidine instead of 4-(5-octylpyrimidine-2-yl)phenol and also except for using 5-phenylpentyl p-toluenesulfonate instead of 5-cyclohexylpentyl p-toluenesulfonate.

EXAMPLE 71

Production of 2-(4-octylphenyl)-5-(7-phenylheptyloxy)pyrimidine

An objective product was prepared in the same manner as in Example 56 except for using 5-hydroxy-2-(4-octylphenyl)pyrimidine instead of 4-(5-octylpyrimidine-2-yl)phenol and also except for using 7-phenylheptyl p-toluenesulfonate instead of 5-cyclohexylpentyl p-toluenesulfonate.

EXAMPLE 72

Production of 2-[4-(4-cyclohexylbutyl)phenyl]-5-decyloxypyrimidine 1.0 g of 4(5-decyloxypyrimidine-2-yl)phenol was dissolved in 1.6 ml of pyridine and cooled on an ice bath. To the solution, 0.6 ml of trifluoromethanesulfonic anhydride was added. The reaction temperature was restored to room temperature. The above mixture was stirred for 1 hour. After the reaction, the reaction mixture was poured into water and subjected to extraction with isopropyl ether to obtain 4-(5-decyloxypyrimidine-2-yl)phenyl trifluoromethanesulfonic ester.

Under nitrogen atmosphere, 0.34 g of 4-cyclohexyl-1-butene was dissolved in 1.2 ml of dry benzene and cooled to −15° to −10° C. To the solution, 4.7 ml of a solution of 0.5M 9-BBN (9-borabicyclo[3,3,1]nonane) in THF was added dropwise, followed by stirring for 1 hour at −10° to 0° C. After the stirring, the reaction temperature was restored to room temperature and then the mixture was further stirred for 2 hours.

Then, a solution of 1.1 g of the above prepared 4-(5-decyloxypyrimidine-2-yl)phenyl trifluoromethanesulfonic ester in 6 ml of dimethylformamide, and 0.05 g of (PPh$_3$)$_4$Pd were added to the above mixture, followed by stirring for 4 hours. After the reaction, the reaction mixture was poured into water and subjected to extraction with ethyl acetate, followed by distilling-off of the organic solvent. The resultant extract was purified by silica gel column chromatography (eluent: toluene/ethyl acetate=10/1) and recrystallized from a mixture solvent of toluene/methanol to obtain 0.59 g of an objective product.

EXAMPLE 73

Production of 2-[4-6-cyclohexyl)phenyl]-5-decyloxypyrimidine

An objective product was prepared in the same manner as in Example 72 except for using 6-cyclohexyl-1-hexene instead of 4-cyclohexyl-1-butene.

EXAMPLE 74

Production of 5-decyloxy-2-[4-(6-phenylhexyl)phenyl]pyrimidine

An objective product was prepared in the same manner as in Example 72 except for using 6-phenyl-1-hexene instead of 4-cyclohexyl-1-butene.

EXAMPLE 75

Production of 4-cyclohexylbutanoic acid 4-(5-decylpyrimidine-2-yl)phenyl ester

To 40 ml of a solution of 0.6 g of 4-(5-decylpyrimidine-2-yl)phenol and 0.3 g of 4-phenylbutanoic acid in methylene chloride, 0.41 g of DCC (dicyclohexyl-carbodiimide) and 0.04 g of 4-pyrrolidinopyridine were added, followed by stirring overnight at room temperature. After the reaction, the insoluble matter was removed from the reaction mixture by filtration. After distilling-off of the solvent, the resultant reaction mixture was purified by silica gel column chromatography (eluent: toluene) and recrystallized from a mixture solvent of toluene-methanol to obtain 0.75 g of an objective product.

The mesomorphic compounds prepared in Examples 56–75 showed the following phase transition series.

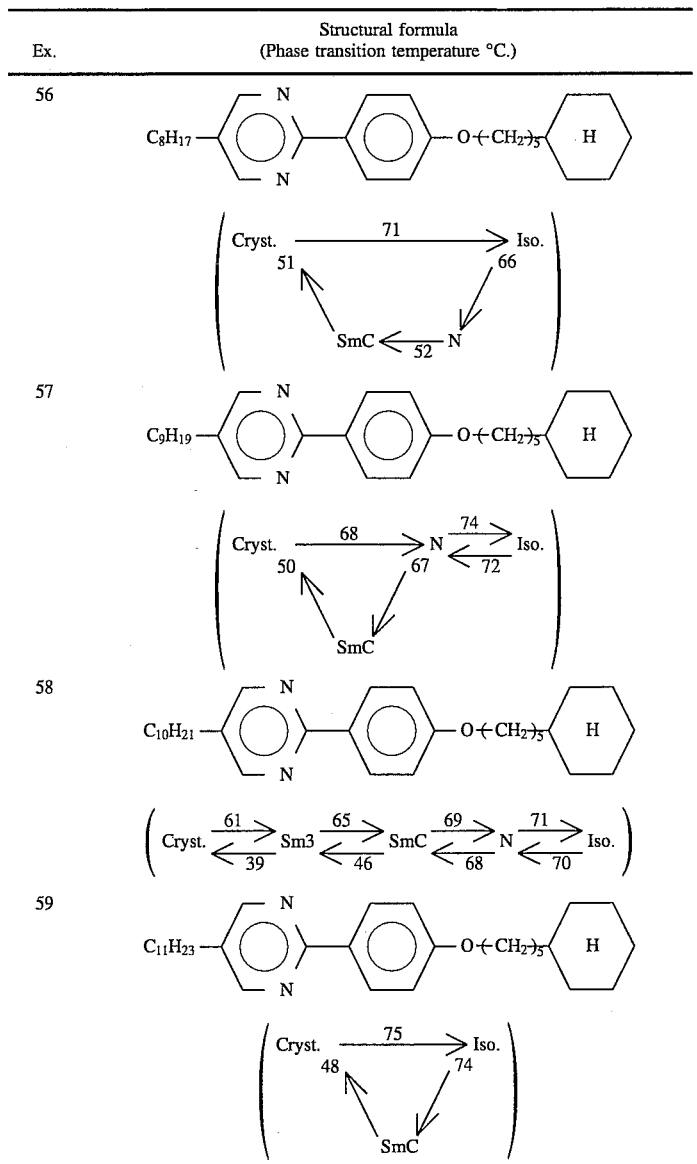

| Ex. | Structural formula (Phase transition temperature °C.) |
|---|---|
| 60 | 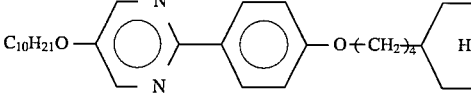 $(\text{Cryst.} \underset{32}{\overset{61}{\rightleftarrows}} \text{SmC} \underset{84}{\overset{86}{\rightleftarrows}} \text{Iso.})$ |
| 61 | 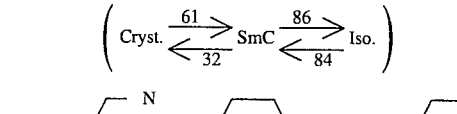 $(\text{Cryst.} \underset{47}{\overset{63}{\rightleftarrows}} \text{SmC} \underset{80}{\overset{81}{\rightleftarrows}} \text{N} \underset{83}{\overset{84}{\rightleftarrows}} \text{Iso.})$ |
| 62 | 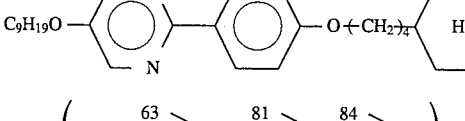 $(\text{Cryst.} \underset{51}{\overset{72}{\rightleftarrows}} \text{SmC} \underset{78}{\overset{79}{\rightleftarrows}} \text{SmA} \underset{81}{\overset{82}{\rightleftarrows}} \text{N} \underset{84}{\overset{85}{\rightleftarrows}} \text{Iso.})$ |
| 63 | 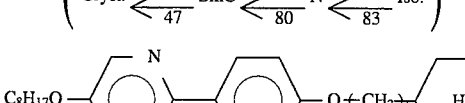 $(\text{Cryst.} \underset{71}{\overset{82}{\rightleftarrows}} \text{SmC} \underset{98}{\overset{100}{\rightleftarrows}} \text{Iso.})$ |
| 64 | 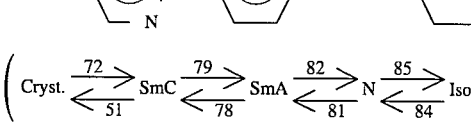 $(\text{Cryst.} \underset{36}{\overset{54}{\rightleftarrows}} \text{SmC} \underset{80}{\overset{81}{\rightleftarrows}} \text{SmA} \underset{93}{\overset{95}{\rightleftarrows}} \text{Iso.})$ |
| 65 | 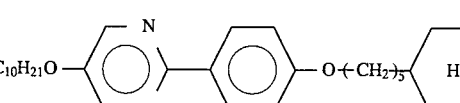 $(\text{Cryst.} \underset{12}{\overset{46}{\rightleftarrows}} \text{SmC} \underset{54}{\overset{56}{\rightleftarrows}} \text{Iso.})$ |
| 66 | 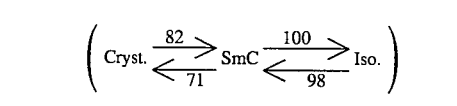 (Cryst. $\xrightarrow{96}$ Iso. $\xrightarrow{80}$ SmA $\xrightarrow{70}$ Cryst.) |
| 67 | 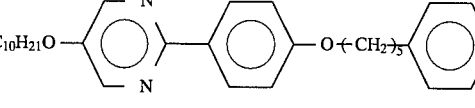 |

| Ex. | Structural formula (Phase transition temperature °C.) |
|---|---|
| | 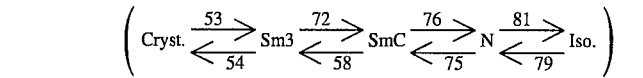 |
| 68 | 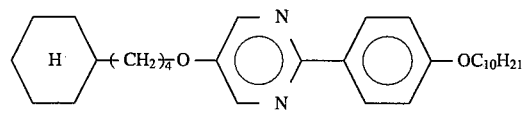 |
| | 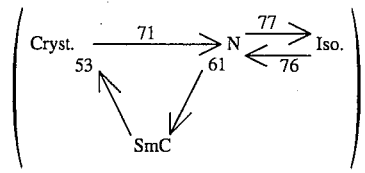 |
| 69 | 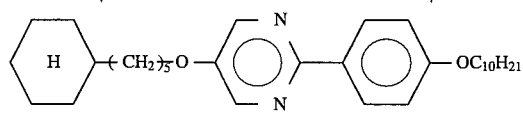 |
| | 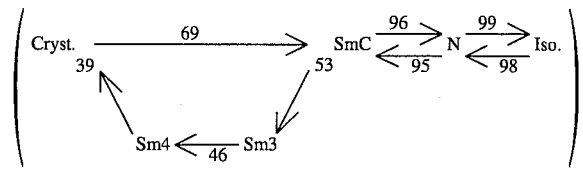 |
| 70 | 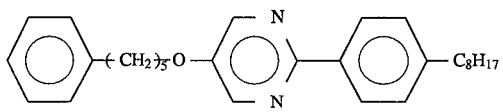 |
| | 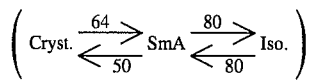 |
| 71 | 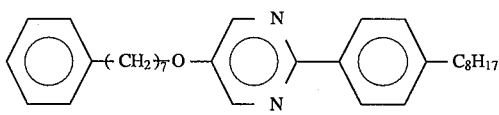 |
| | 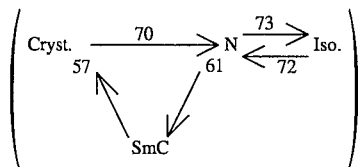 |
| 72 | 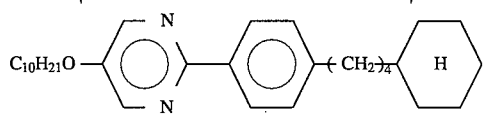 |
| | 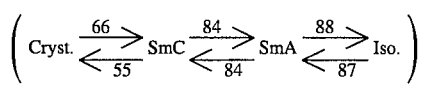 |
| 73 | 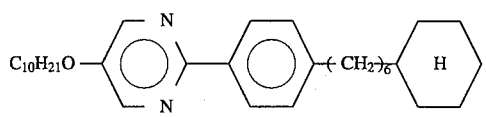 |
| | 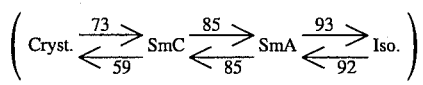 |

| Ex. | Structural formula (Phase transition temperature °C.) |
|---|---|
| 74 | 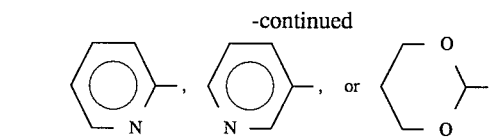<br>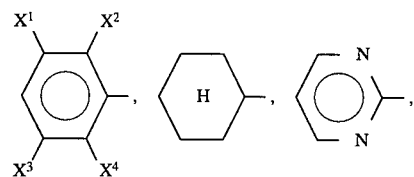 |
| 75 | 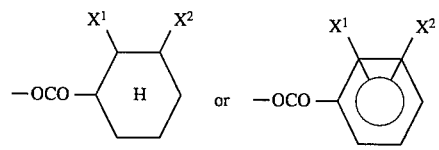<br> |

As described hereinabove, according to the present invention, there is provided a mesomorphic compound of the formula (I) which can effectively be applied to a liquid crystal device utilizing ferroelectricity when the compound per se assumes a chiral smectic phase. Further, there is also provided a liquid crystal composition containing the compound and assuming a chiral smectic phase, whereby a liquid crystal device comprising the composition can be operated by utilizing ferroelectricity of the composition. The present invention provides a liquid crystal device using such a composition which shows a good switching characteristic, an improved low-temperature operation characteristic and a decreased temperature-dependence of response speed.

The present invention further provides a display apparatus and a display method which employ the above-mentioned devices as a display unit (e.g., display panel), whereby good display characteristics can be obtained in combination with a light source, a drive circuit, etc.

What is claimed is:

1. A mesomorphic compound represented by the following formula (I):

$$R^1—A—R^2$$

wherein $R^1$ and $R^2$ independently denote Q—$Y^1$—(CH$_2$—)$_m$$Y^2$— or $R^3$, at least one of $R^1$ and $R^2$ being Q—$Y^1$—(CH$_2$—)$_m$$Y^2$— wherein Q denotes

-continued where $X^1$, $X^2$, $X^3$, $X^4$ independently denote H, F, CH$_3$ or CF$_3$; $Y^1$ denotes a single bond, —OCH$_2$—, —COO— or —OCO—; $Y^2$ denotes a single bond, —CH$_2$O—, —COO— or —OCO—; m is an integer of 3–16; and $R^3$ is H, F, CF$_3$, a linear or branched alkyl group having 1–18 carbon atoms capable of including at least one —CH$_2$— group which can be replaced with —O—, —S—, —CO—, —CH=CH—, —C≡C—, or $$-\overset{\underset{|}{CN}}{CH}-$$

provided that heteroatoms are not adjacent to each other, and capable of including at least one H which can be replaced with F; or a cyclized alkyl group having 1–11 carbon atoms capable of including at least one —CH$_2$— group which can be replaced with —O—, —S—, —CO—, or —CH=CH—, provided that heteroatoms are not adjacent to each other and capable of including at least one H which can be replaced with F; and A denotes —$A^1$—Z—$A^2$— or —$A^1$—$A^2$—Z—$A^3$— wherein $A^1$, $A^2$, and $A^3$ independently denote

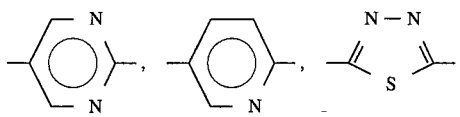 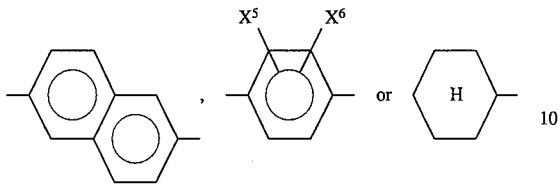

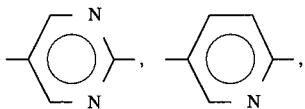

where $X^5$ and $X^6$ independently denote H, F, $CH_3$ or $CF_3$, at least one of $A^1$, $A^2$ and $A^3$ being any one of

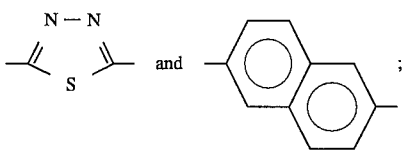

and Z denotes a single bond, —C≡C—, —CH=CH—, —COO—, —OCO—, —COS— or —$CH_2O$—.

2. A compound according to claim 1, wherein $R^3$ is any one of the following groups (i) to (ix):

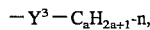 (i)

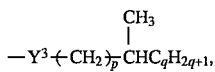 (ii)

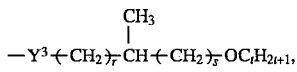 (iii)

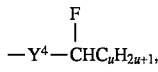 (iv)

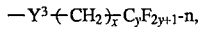 (v)

—F, (vi)
—H, (vii)

 (viii)

 (ix)

wherein $Y^3$ denotes a single bond, —O—, —OCO—, —COO—; a is an integer of 1–18; p is an integer of 0–9; q is an integer of 1–9; r is an integer of 0–7; s is 0 or 1; t is an integer of 1–14; u is an integer of 1–16; $Y^4$ denotes —$OCH_2$— or —OCO—; X is an integer of 0–7, y is an integer of 1–7; $Y^5$ denotes —O—, —COO—, —$OCH_2CH_2$—, —$OCOCH_2$— or —$COOCH_2CH_2$—; and b is an integer of 1–10.

3. A compound according to claim 1, wherein Q—$Y^1$—($CH_2$)$_m$$Y^2$— is any one of the following groups (x) to (xv):

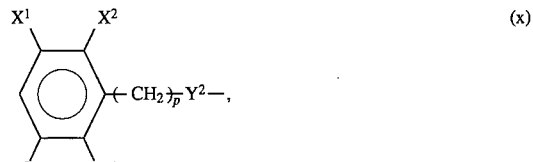 (x)

 (xi)

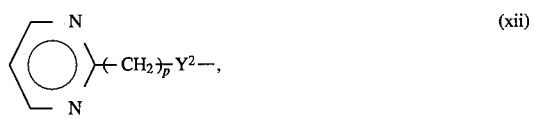 (xii)

 (xiii)

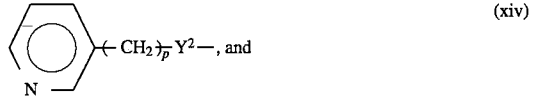 (xiv)

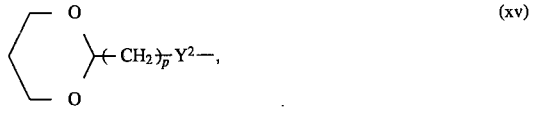 (xv)

wherein $X^1$, $X^2$, $X^3$, $X^4$ and $Y^2$ have the same meanings as defined above; and p is an integer of 3–12.

4. A compound according to claim 1, which is represented by any one of the following formulae (Ia) to (Iz):

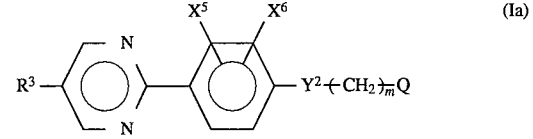 (Ia)

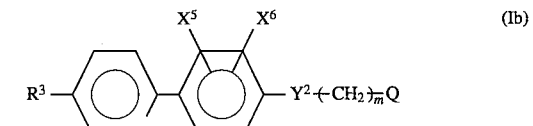 (Ib)

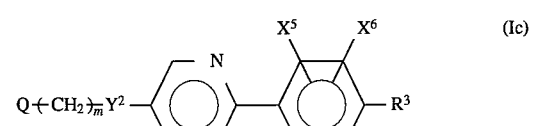 (Ic)

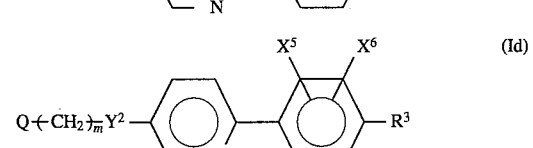 (Id)

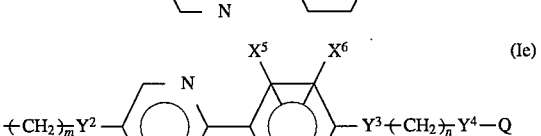 (Ie)

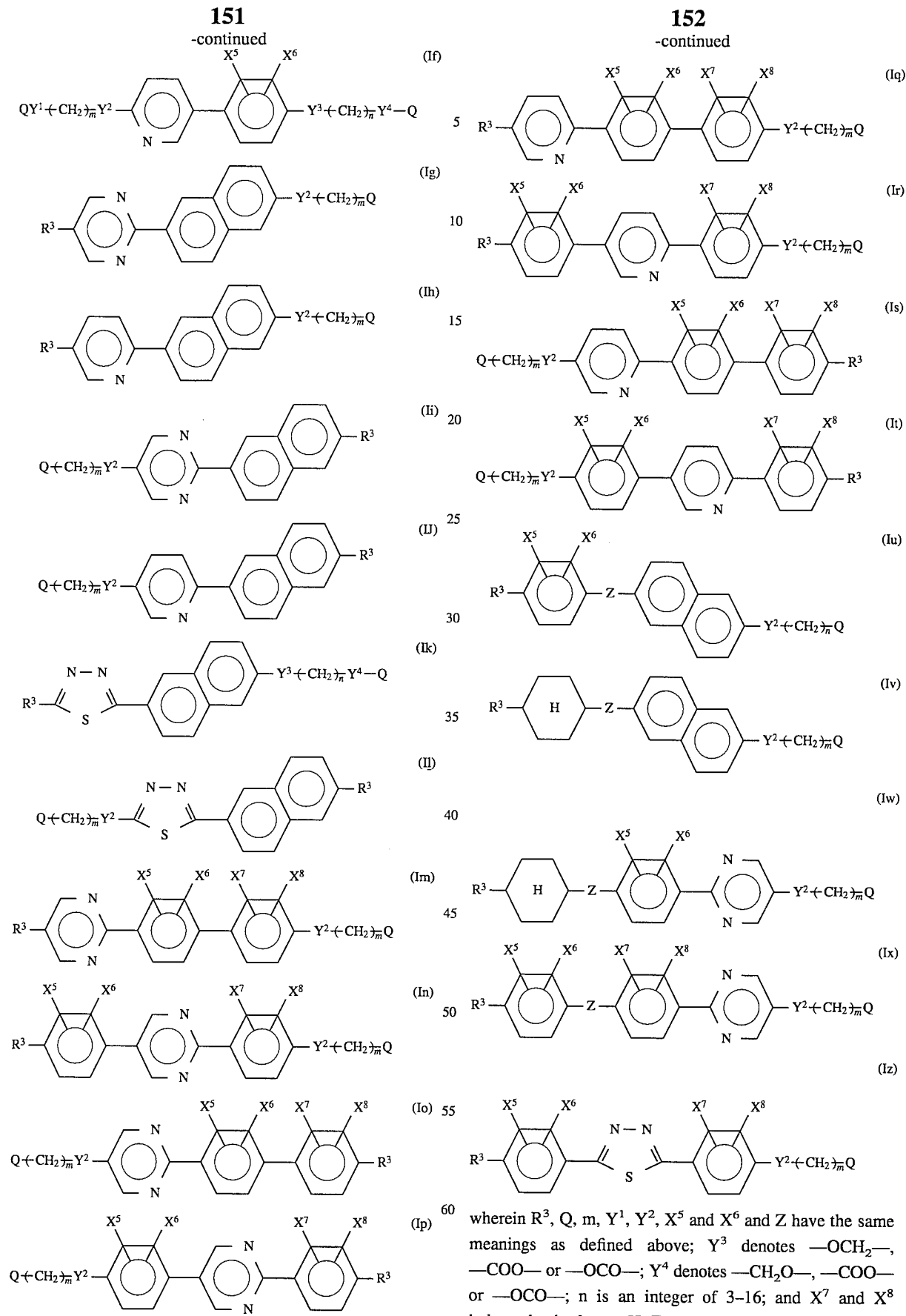
wherein $R^3$, Q, m, $Y^1$, $Y^2$, $X^5$ and $X^6$ and Z have the same meanings as defined above; $Y^3$ denotes —OCH$_2$—, —COO— or —OCO—; $Y^4$ denotes —CH$_2$O—, —COO— or —OCO—; n is an integer of 3–16; and $X^7$ and $X^8$ independently denote H, F or CH$_3$.

5. A compound according to claim 1, which is represented by any one of the following formulae (Iaa) to (Ipb):

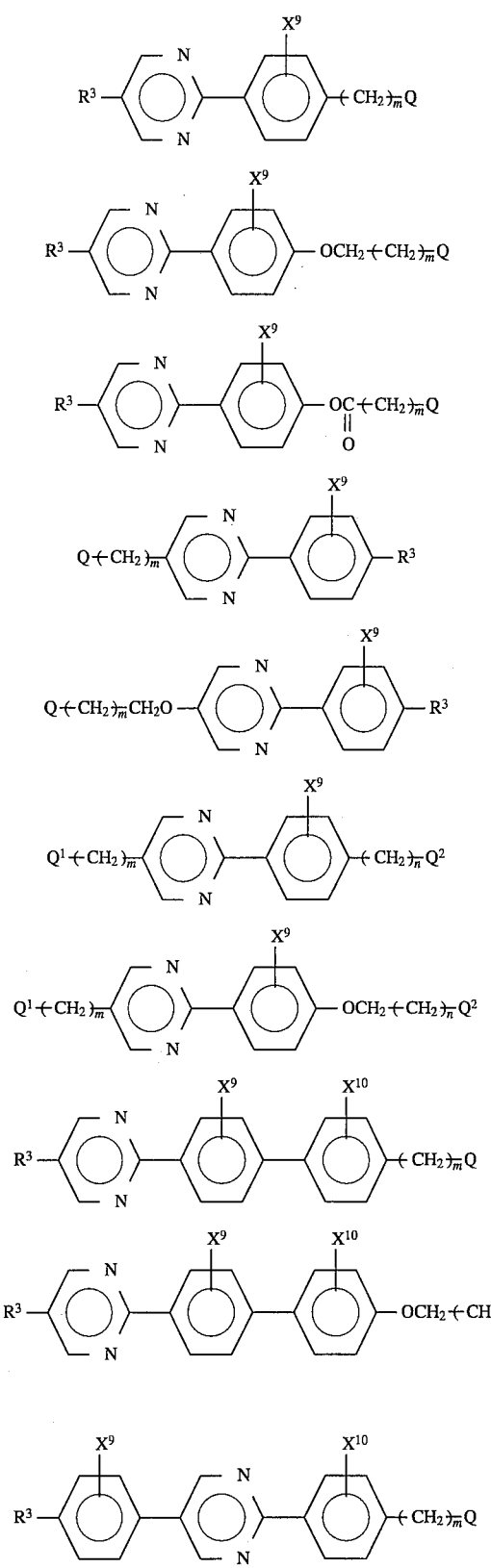
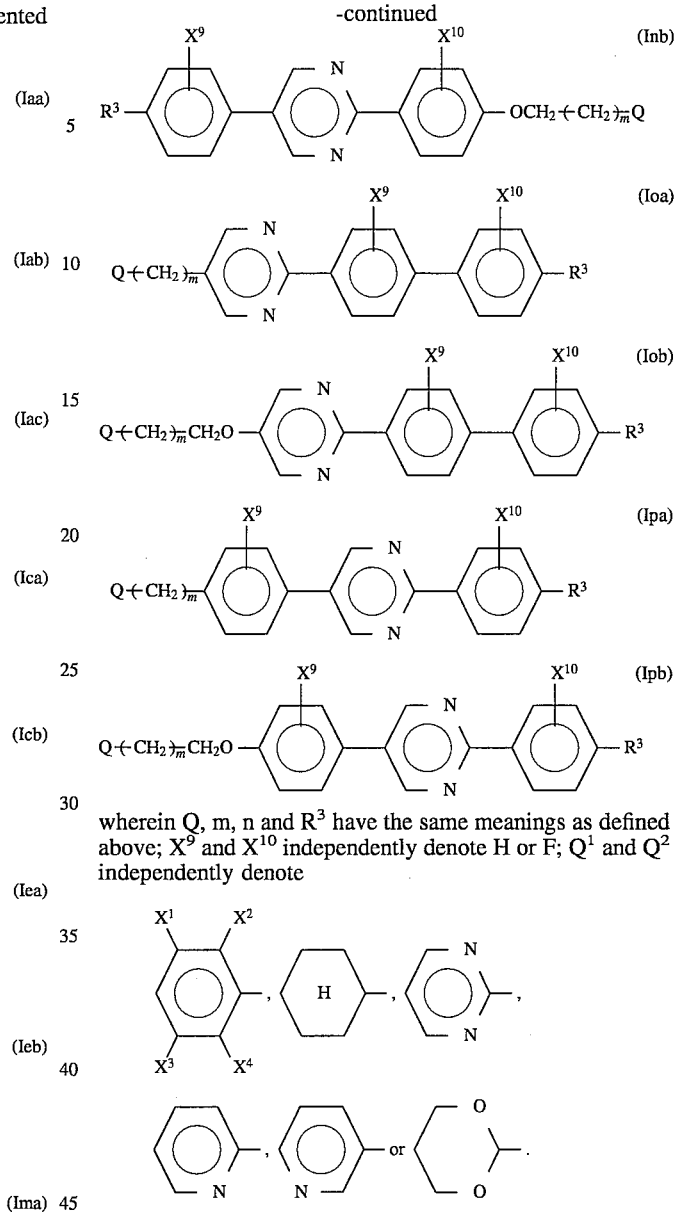

wherein Q, m, n and $R^3$ have the same meanings as defined above; $X^9$ and $X^{10}$ independently denote H or F; $Q^1$ and $Q^2$ independently denote

6. A liquid crystal composition comprising at least two compounds, at least one of which is a mesomorphic compound of the formula (I) according to claim 1.

7. A liquid crystal composition according to claim 6, which comprises 1–80 wt. % of a mesomorphic compound of the formula (I).

8. A liquid crystal composition according to claim 6, which comprises 1–60 wt. % of a mesomorphic compound of the formula (I).

9. A liquid crystal composition according to claim 6, which comprises 1–40 wt. % of a mesomorphic compound of the formula (I).

10. A liquid crystal composition according to claim 6, which has a chiral smectic phase.

11. A liquid crystal device, comprising a pair of electrode plates and a liquid crystal composition according to claim 6 disposed between the electrode plates.

12. A liquid crystal device according to claim 11, which further comprises an alignment control layer.

13. A liquid crystal device according to claim 12, wherein the alignment control layer has been subjected to rubbing.

14. A liquid crystal device according to claim 11, wherein the liquid crystal composition is disposed in a thickness suppressing formation of a helical structure of liquid crystal molecules between the electrode plates.

15. A display apparatus comprising a liquid crystal device according to claim 11, and voltage application means for driving the liquid crystal device.

16. A display apparatus according to claim 15, which further comprises a drive circuit.

17. A display apparatus according to claim 15, which further comprises a light source.

18. A display method, comprising:

providing a liquid crystal composition comprising at least two compounds, at least one of which is a mesomorphic compound of the formula (I) according to claim 1; and switching the alignment direction of liquid crystal molecules by applying voltages to the liquid crystal composition to effect display.

19. A method according to claim 18, wherein $Y^1$ is a single bond.

20. A display method, comprising:

providing a liquid crystal composition comprising at least two compounds, at least one of which is a mesomorphic compound of the formula (I) according to claim 2; and switching the alignment direction of liquid crystal molecules by applying voltages to the liquid crystal composition to effect display.

21. A display method, comprising:

providing a liquid crystal composition comprising at least two compounds, at least one of which is a mesomorphic compound of the formula (I) according to claim 4; and switching the alignment direction of liquid crystal molecules by applying voltages to the liquid crystal composition to effect display.

22. A display method, comprising:

providing a liquid crystal composition comprising at least two compounds, at least one of which is a mesomorphic compound of the formula (I) according to claim 5; and switching the alignment direction of liquid crystal molecules by applying voltages to the liquid crystal composition to effect display.

23. A method according to claim 18, wherein the liquid crystal composition comprises 1–80 wt. % of a mesomorphic compound of the formula (I).

24. A method according to claim 18, wherein the liquid crystal composition comprises 1–60 wt. % of a mesomorphic compound of the formula (I).

25. A method according to claim 18, wherein the liquid crystal composition comprises 1–40 wt. % of a mesomorphic compound of the formula (I).

26. A display method according to claim 18, wherein the liquid crystal composition has a chiral smectic phase.

27. A display method, comprising:

providing a liquid crystal device comprising a pair of electrode plates and a liquid crystal composition disposed therebetween comprising at least two compounds, at least one of which is a mesomorphic compound of the formula (I) according to claim 1; and switching the alignment direction of liquid crystal molecules by applying voltages to the liquid crystal composition disposed between the electrode plates to effect display.

28. A method according to claim 27, which further comprises an alignment control layer.

29. A method according to claim 28, wherein the insulating alignment control layer has been subjected to rubbing.

* * * * *

UNITED STATES PATENT AND TRADEMARK OFFICE
CERTIFICATE OF CORRECTION

PATENT NO. : 5,589,103
DATED : December 31, 1996
INVENTOR(S) : YOKO YAMADA ET AL.

Page 1 of 3

It is certified that error appears in the above-identified patent and that said Letters Patent is hereby corrected as shown below:

AT [57] ABSTRACT

Line 4, "decreased" should read --decreased temperature dependance of response speed --.

Line 8, "group" should read --group of--.

COLUMN 3

Line 46, "$Q-Y^1\text{-}(CH_2\text{-}$" should read --$Q-Y^1\text{-}(CH_2\text{)}_m Y^2\text{-}$ --.

Line 47, "$)_m Y^2\text{-}$" should be deleted, and
"$Q-Y^1\text{-}$" should read --$Q-Y^1\text{-}(CH_2\text{)}_m Y^2\text{-}$ --.

Line 48, "$\text{-}(CH_2\text{)}_m Y^2\text{-}$" should be deleted.

Line 50, " 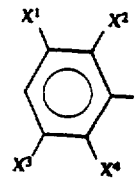 " should read -- 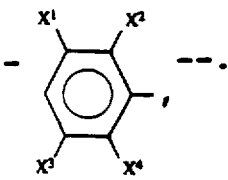 --.

COLUMN 5

Line 61, "views" should read --views of--.

COLUMN 11

Line 6, " 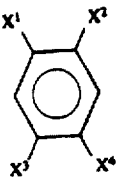 " should read -- 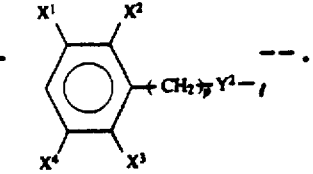 --.

UNITED STATES PATENT AND TRADEMARK OFFICE
CERTIFICATE OF CORRECTION

PATENT NO. : 5,589,103
DATED : December 31, 1996
INVENTOR(S) : YOKO YAMADA ET AL.

Page 2 of 3

It is certified that error appears in the above-identified patent and that said Letters Patent is hereby corrected as shown below:

COLUMN 66

Line 56, "one" should read --one or--.

COLUMN 70

Line 42, "teter-" should read --tetra- --.

COLUMN 105

Line 66, "A ferroelectric" should read --Ferroelectric--.

COLUMN 107

Line 13, "nd" should read --and--.

COLUMN 138

Line 54, "yl)phenyl" should read --yl)phenol--.

COLUMN 147

Line 56, "$Q-Y^1(CH_2-$" should read --$Q-Y_1(CH_2)_mY^2-$ --.
Line 57, "$)_mY^2$-or $R^3$," should read --or $R^3$,-- and "$Q-Y^1-$" should read --$Q-Y^1(CH2)_mY^2-$ --.
Line 58, "$(CH_2)_mY^2-$" should be deleted.

UNITED STATES PATENT AND TRADEMARK OFFICE
CERTIFICATE OF CORRECTION

PATENT NO. : 5,589,103
DATED : December 31, 1996
INVENTOR(S) : YOKO YAMADA ET AL.

It is certified that error appears in the above-identified patent and that said Letters Patent is hereby corrected as shown below:

COLUMN 150

Line 1, "$Q-Y^1-$" should read --$Q-Y^1(CH_2)_m Y^2-$ --.
Line 2, "$(CH_2)_m Y^2-$" should be deleted.

Signed and Sealed this

Seventh Day of October, 1997

BRUCE LEHMAN

Attest:

Attesting Officer

Commissioner of Patents and Trademarks